US010302952B2

(12) United States Patent
Mayama et al.

(10) Patent No.: US 10,302,952 B2
(45) Date of Patent: May 28, 2019

(54) CONTROL DEVICE, CONTROL METHOD, AND PROGRAM

(71) Applicant: SONY CORPORATION, Tokyo (JP)

(72) Inventors: Ichiro Mayama, Tokyo (JP); Hidenori Kikuchi, Kanagawa (JP); Kayoko Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 15/501,245

(22) PCT Filed: Sep. 8, 2015

(86) PCT No.: PCT/JP2015/075392
§ 371 (c)(1),
(2) Date: Feb. 2, 2017

(87) PCT Pub. No.: WO2016/052090
PCT Pub. Date: Apr. 7, 2016

(65) Prior Publication Data
US 2017/0219833 A1    Aug. 3, 2017

(30) Foreign Application Priority Data

Sep. 30, 2014   (JP) ................................. 2014-199678

(51) Int. Cl.
*G02B 27/14* (2006.01)
*G09G 5/00* (2006.01)
(Continued)

(52) U.S. Cl.
CPC ..... *G02B 27/0179* (2013.01); *G02B 27/0093* (2013.01); *G02B 27/017* (2013.01);
(Continued)

(58) Field of Classification Search
CPC ...... G02B 2027/014; G02B 2027/0163; G02B 2027/0178; G02B 2027/0187; G02B 27/01; G02B 27/017
(Continued)

(56) References Cited

U.S. PATENT DOCUMENTS

2007/0177058 A1 * 8/2007 Jang .................... G09G 3/20
                                                          348/607

FOREIGN PATENT DOCUMENTS

JP      03-057953       6/1991
JP      2002-091400     3/2002
(Continued)

*Primary Examiner* — William Choi
(74) *Attorney, Agent, or Firm* — Paratus Law Group, PLLC

(57) ABSTRACT

Provided is a configuration for executing display information output control with improved visibility of a user wearable or portable display unit. A controller configured to execute display information output control on a user wearable or portable display unit is included. The controller sets a turning on (ON) period and a turning off (OFF) period and controls switching between afterimage consideration pulse display having the turning off period being set to be within an afterimage recognition period and normal pulse display having the turning off period being set to be longer than or equal to the afterimage recognition period, the turning on (ON) period being an output period of display information to the display unit, the turning off (OFF) period being a non-output period of display information to the display unit. The controller executes the switching control between the afterimage consideration pulse display and the normal pulse display depending on eye velocity of a user. The controller executes the afterimage consideration pulse display in a case where eye velocity of the user is less than a threshold and executes the normal pulse display in a case where the eye velocity is more than or equal to the threshold.

20 Claims, 31 Drawing Sheets

(51) Int. Cl.
  *G02B 27/01* (2006.01)
  *G09G 3/20* (2006.01)
  *G09G 3/34* (2006.01)
  *H04N 5/64* (2006.01)
  *H04N 5/66* (2006.01)
  *G09G 3/00* (2006.01)
  *G06F 3/01* (2006.01)
  *G02B 27/00* (2006.01)
  *G09G 3/3233* (2016.01)

(52) U.S. Cl.
  CPC ......... *G02B 27/0172* (2013.01); *G06F 3/013* (2013.01); *G09G 3/001* (2013.01); *G09G 3/20* (2013.01); *G09G 3/2014* (2013.01); *G09G 3/2018* (2013.01); *G09G 3/3233* (2013.01); *G09G 3/34* (2013.01); *G09G 5/00* (2013.01); *G09G 5/003* (2013.01); *H04N 5/64* (2013.01); *H04N 5/66* (2013.01); *G02B 2027/012* (2013.01); *G02B 2027/014* (2013.01); *G02B 2027/0118* (2013.01); *G02B 2027/0178* (2013.01); *G02B 2027/0187* (2013.01); *G02B 2027/0198* (2013.01); *G09G 2230/00* (2013.01); *G09G 2320/0257* (2013.01); *G09G 2320/0261* (2013.01); *G09G 2340/0435* (2013.01)

(58) Field of Classification Search
  USPC .......................................... 359/630; 345/7–9
  See application file for complete search history.

(56) References Cited

FOREIGN PATENT DOCUMENTS

| | | | |
|---|---|---|---|
| JP | 2002-229021 | | 8/2002 |
| JP | 2002229021 A | * | 8/2002 |
| JP | 2009-069544 | | 4/2009 |
| JP | 2011-145488 | | 7/2011 |
| JP | 2013-073177 | | 4/2013 |

* cited by examiner

FIG. 8
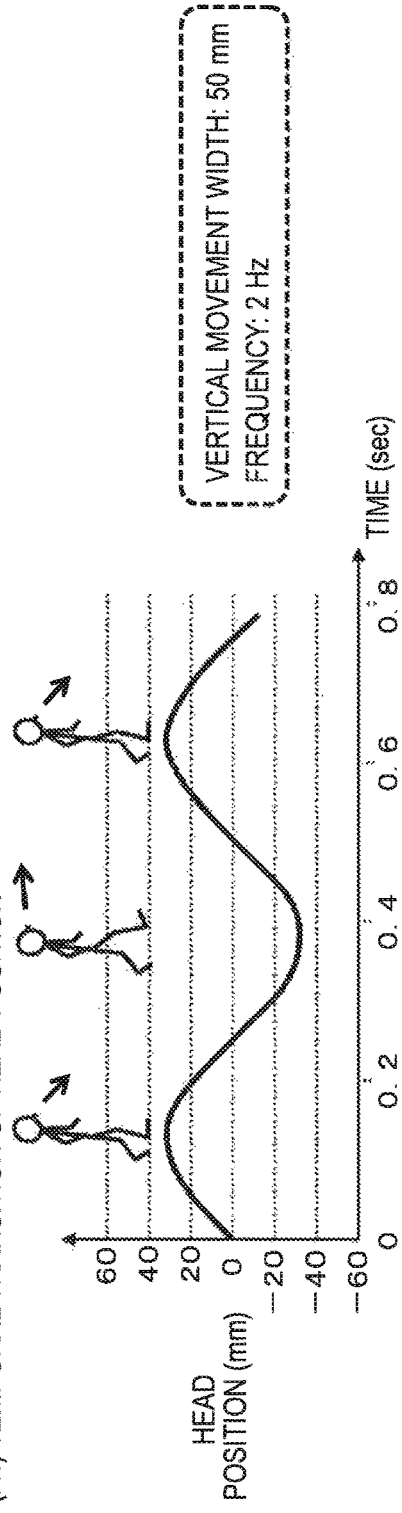
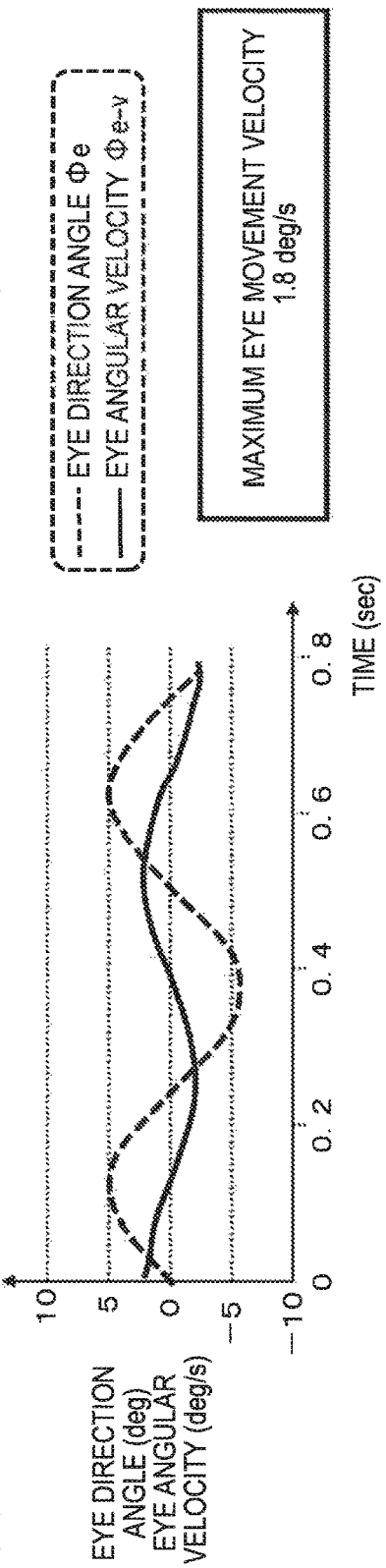

FIG. 9
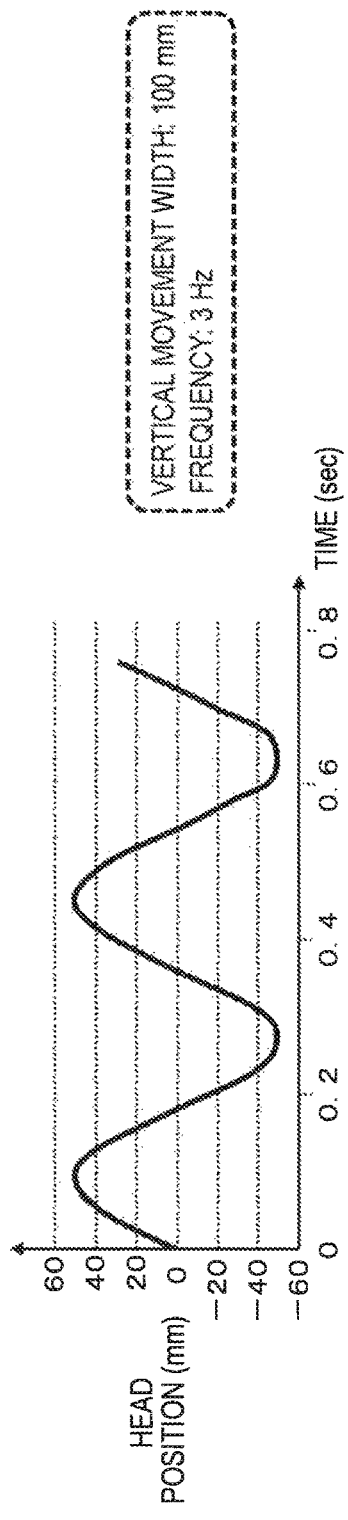
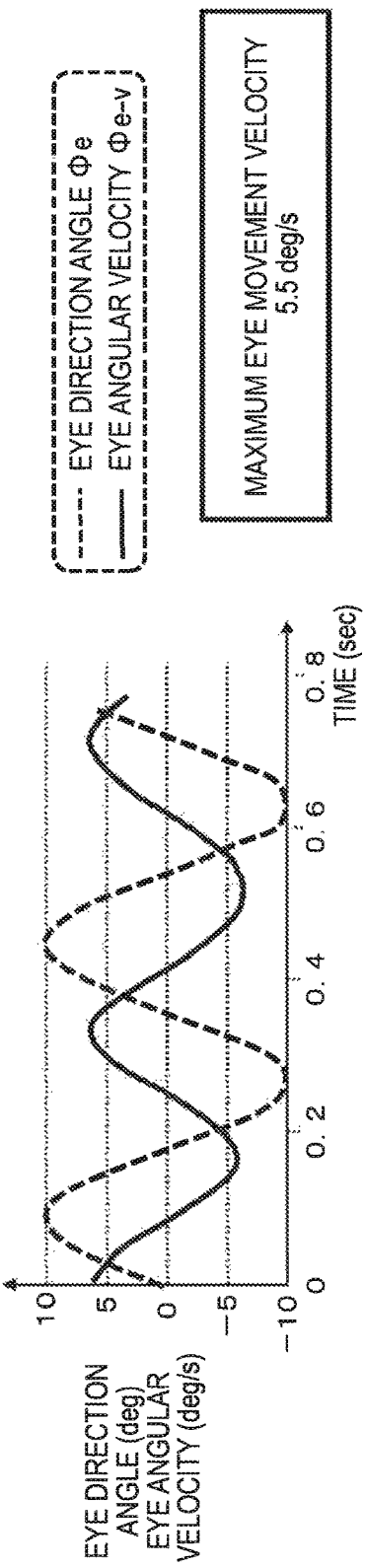

FIG. 10
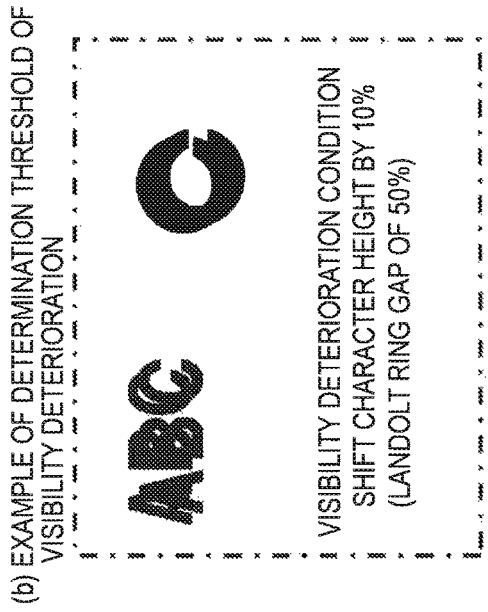
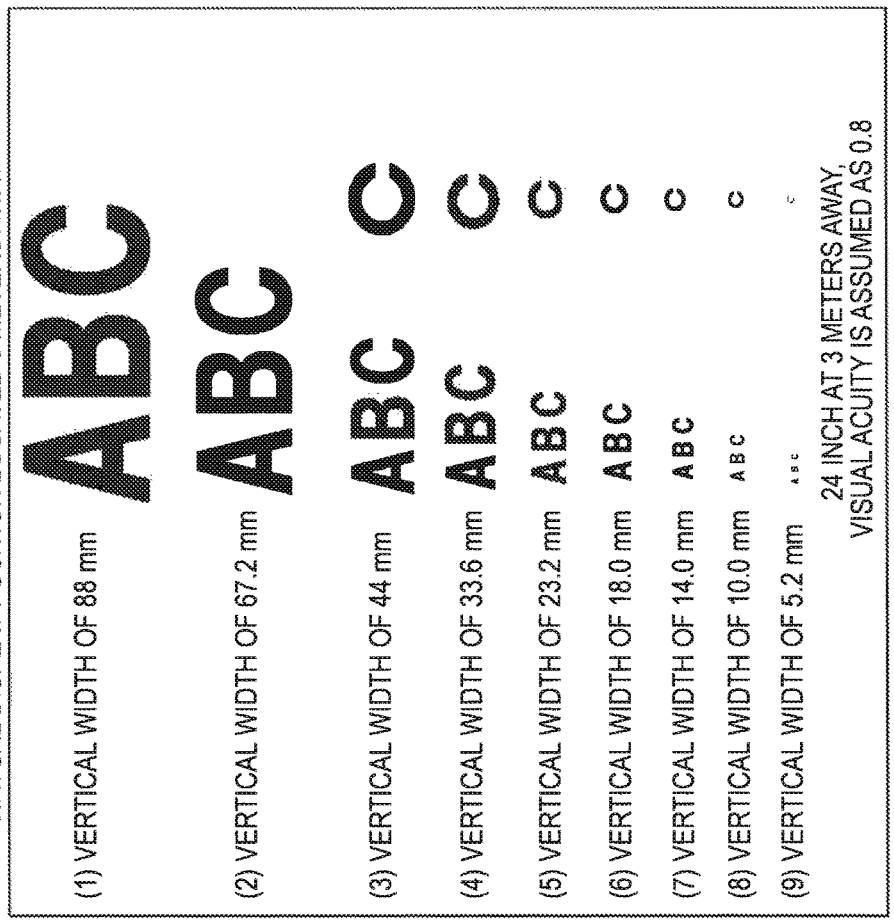

FIG. 11

| DISPLAY TIME (ms) | EYE MOVEMENT VELOCITY (deg/s) | | | | | |
|---|---|---|---|---|---|---|
| | 2deg/s (WALKING) | | 5deg/s (LOW SPEED RUNNING) | | 10deg/s (HIGH SPEED RUNNING) | |
| | SHIFT AMOUNT (mm) | RECOGNIZABLE CHARACTER SIZE (mm) | SHIFT AMOUNT (mm) | RECOGNIZABLE CHARACTER SIZE (mm) | SHIFT AMOUNT (mm) | RECOGNIZABLE CHARACTER SIZE (mm) |
| 1 | 0.10 | 1.00 | 0.21 | 2.10 | 0.52 | 5.20 |
| 2 | 0.21 | 2.10 | 0.42 | 4.20 | 1.05 | 10.50 |
| 3 | 0.31 | 3.10 | 0.63 | 6.30 | 1.57 | 15.70 |
| 5 | 0.52 | 5.20 | 1.05 | 10.50 | 2.62 | 26.20 |
| 10 | 1.05 | 10.50 | 2.09 | 20.90 | 5.24 | 52.40 |
| 16 | 1.68 | 16.80 | 3.35 | 33.50 | 8.38 | 83.80 |

FIG. 12

| | | (ANALYSIS RESULT 1) RECOGNIZABLE CHARACTER SIZE AND UNRECOGNIZABLE CHARACTER SIZE IN CONTINUOUS DISPLAY (HOLD DISPLAY = 16 ms) AMONG CHARACTERS SHOWN IN PORTION (a) OF FIG. 10 | (ANALYSIS RESULT 2) DISPLAY TIME OF PULSE DISPLAY IN WHICH CHARACTER HAVING MINIMUM CHARACTER VERTICAL WIDTH OF 5.2 mm SHOWN IN PORTION (a) OF FIG. 10 IS RECOGNIZABLE |
|---|---|---|---|
| (A) | WALKING (EYE MOVEMENT VELOCITY = 2 deg/s) | RECOGNIZABLE: (1) VERTICAL WIDTH OF 88 mm TO (6) VERTICAL WIDTH OF 18.0 mm UNRECOGNIZABLE: (7) VERTICAL WIDTH OF 14.0 mm TO (9) VERTICAL WIDTH OF 5.2 mm | PULSE DISPLAY WITH DISPLAY TIME OF 5 ms OR SHORTER |
| (B) | LOW SPEED RUNNING (EYE MOVEMENT VELOCITY = 5 deg/s) | RECOGNIZABLE: (1) VERTICAL WIDTH OF 88 mm TO (3) VERTICAL WIDTH OF 44 mm UNRECOGNIZABLE: (4) VERTICAL WIDTH OF 33.6 mm TO (9) VERTICAL WIDTH OF 5.2 mm | PULSE DISPLAY WITH DISPLAY TIME OF 2 ms OR SHORTER |
| (C) | HIGH SPEED RUNNING (EYE MOVEMENT VELOCITY = 10 deg/s) | RECOGNIZABLE: ONLY (1) VERTICAL WIDTH OF 88 mm UNRECOGNIZABLE: (2) VERTICAL WIDTH OF 67.2 mm TO (9) VERTICAL WIDTH OF 5.2 mm | PULSE DISPLAY WITH DISPLAY TIME OF 1 ms OR SHORTER |

FIG. 13

| | | (1) | (2) | (3) | (4) | (5) |
|---|---|---|---|---|---|---|
| | | STATIONARY (STAY) | WALKING (WALK) | LOW SPEED RUNNING (JOG) | HIGH SPEED RUNNING (RUN) | BICYCLING (BIKE) |
| (a) | EXERCISE VIBRATION CYCLE (Sec) | ∞ | 0.5 SECONDS | 0.3 SECONDS | 0.2 SECONDS | NON-PERIODIC |
| (b) | HEAD MOVEMENT WIDTH (mm) | 0 | 50mm | 100mm | 100 mm OR MORE | VARY DEPENDING ON VELOCITY AND ROAD SURFACE CONDITION |
| (c) | EYE VELOCITY (deg/s) | 0 | 2.0deg/s | 5.0deg/s | 10.0deg/s | VARY DEPENDING ON VELOCITY AND ROAD SURFACE CONDITION |
| (d) | OPTIMUM DISPLAY MODE | ←—— HOLD DISPLAY ——→ * TURN OFF DISPLAY TEMPORARILY IN DETECTING INTENSE BODY MOVEMENT IN WHICH EYE MOVES AT HIGH SPEED OR SHOCK (TURNING OFF) | | | ←—— PULSE DISPLAY ——→ * PULSE DISPLAY IN WHICH DISPLAY PERIOD IS SET TO EYE STABILIZATION TIMING OBTAINED FROM EXERCISE CYCLE RESULT * PULSE DISPLAY WITH FIXED PERIOD FOR NON-PERIODIC EXERCISE | |
| (e) | OPTIMUM DISPLAY TIME | ←—— DISPLAY TIME =∞ ——→ | | | ←—— TURNING ON TIME ADJUSTED TO 2~10 ms, AND TURNING OFF TIME ADJUSTED TO 50-200 ms ——→ DISPLAY CONTROL CONSIDERING ACTIVITY SITUATION AND EXTERNAL ILLUMINANCE | |
| (f) | INFORMATION DEPTH | FULL DISPLAY | —— CURRENT LOCATION, SIMPLE MAP, NAVIGATION —— | | —— SIMPLE INSTRUCTION, DANGER AVOIDANCE INFORMATION —— | |

FIG. 15
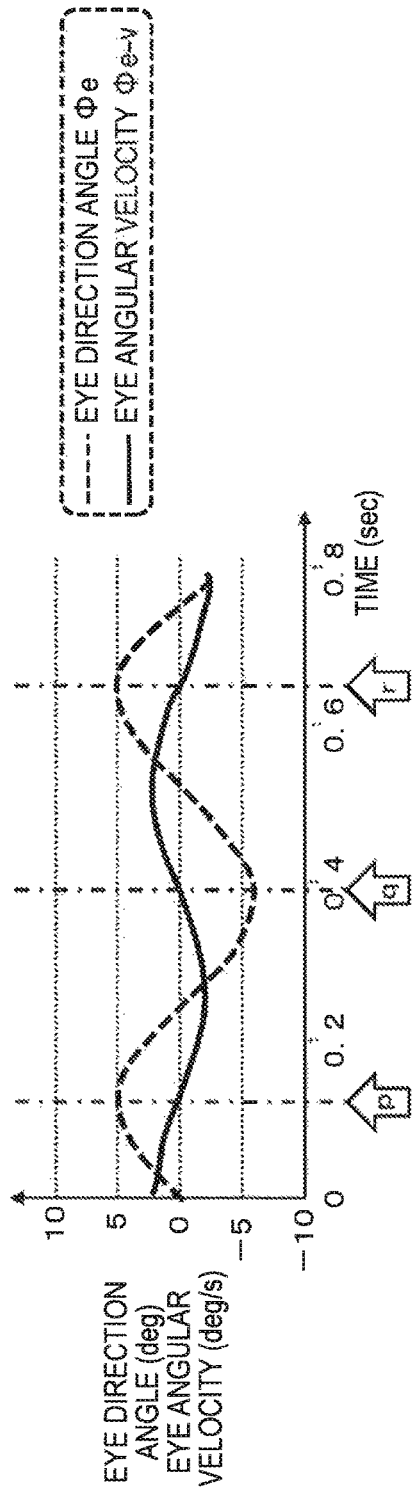
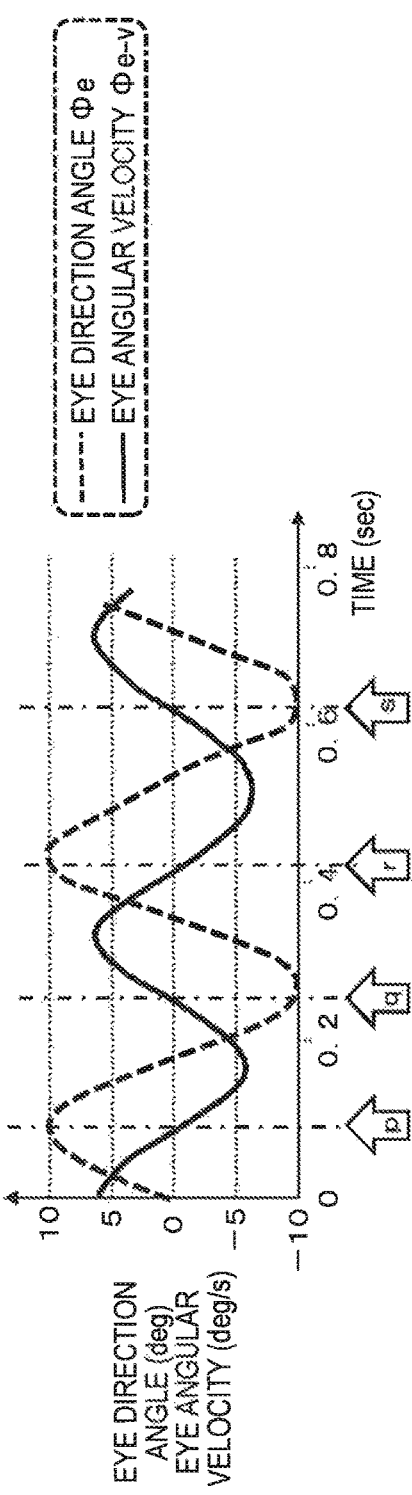

CONTROL DEVICE, CONTROL METHOD, AND PROGRAM

CROSS REFERENCE TO PRIOR APPLICATION

This application is a National Stage Patent Application of PCT International Patent Application No. PCT/JP2015/075392 (filed on Sep. 8, 2015) under 35 U.S.C. § 371, which claims priority to Japanese Patent Application No. 2014-199678 (filed on Sep. 30, 2014), which are all hereby incorporated by reference in their entirety.

TECHNICAL FIELD

The present disclosure relates to control devices, control methods, and programs. In particular, the present disclosure relates to a control device, control method, and program for executing display control of a display device attached to the user's body or carried by the user such as head-mounted display that is a display worn by the user on the head.

BACKGROUND ART

Portable displays or wearable displays worn by the user on the head such as head-mounted display (HMD) have been recently widespread, and many users are using these portable or wearable display devices during moving or exercising. However, these portable or wearable display devices vibrate with the movement of the user, and thus it is difficult to recognize information displayed on a display unit disadvantageously. The difficulty in recognizing such displayed information causes accidents due to distraction of attention to the surroundings and induction of eye fatigue, which may cause the occurrence of dangerous situations.

In particular, the display device displaying a video viewed by the user while being worn on the head, that is, the head-mounted display (HMD) is not necessary to be carried by the user, and the user can enjoy a favorite video or music while exercising such as walking or running. On the other hand, it is disadvantageously difficult to prevent vibration caused by the exercise such as walking or running, which lead to increased difficulty in recognizing information displayed on a display unit.

Moreover, the head-mounted display (HMD) has a display unit that is observable by the user with either one or both the eyes, and is configured to be able to control visual and auditory sensation in combination with a headphone. An example of the related art that has described the structure and principle of the head-mounted display includes Patent Literature 1 (JP 2011-145488A).

As described above, in using a portable or wearable display device, the displayed information can be recognized in a relatively stable state if the user is stationary. However, if the user performs an action such as walking or running, it is disadvantageously difficult for the user to recognize the display information.

CITATION LIST

Patent Literature

Patent Literature 1: JP 2011-145488A

DISCLOSURE OF INVENTION

Technical Problem

The present disclosure is made in view of the above problems, and an object thereof is to provide a control device, control method, and program, capable of allowing a display device with movement including vibration to control its display, thereby preventing a decrease in recognition rate. An example of the display device includes a wearable type that is worn on the user's body, e.g., a head-mounted display, or a portable type that is carried by the user.

Solution to Problem

According to a first aspect of the present disclosure, there is provided a control device including: a controller configured to execute display information output control on a user wearable or portable display unit. The controller sets a turning on (ON) period and a turning off (OFF) period and controls switching between afterimage consideration pulse display having the turning off period being set to be within an afterimage recognition period and normal pulse display having the turning off period being set to be longer than or equal to the afterimage recognition period, the turning on (ON) period being an output period of display information to the display unit, the turning off (OFF) period being a non-output period of display information to the display unit.

According to an embodiment of the control device of the present disclosure, the controller executes the switching control between the afterimage consideration pulse display and the normal pulse display depending on eye velocity of a user holding the display unit.

According to an embodiment of the control device of the present disclosure, the controller executes the afterimage consideration pulse display in a case where eye velocity of a user holding the display unit is less than a threshold and executes the normal pulse display in a case where the eye velocity is more than or equal to the threshold.

According to an embodiment of the control device of the present disclosure, the controller calculates eye velocity of a user based on movement information of the user inputted from sensor information and executes the switching control between the afterimage consideration pulse display and the normal pulse display depending on the calculated eye velocity.

According to an embodiment of the control device of the present disclosure, the control device includes an accelerometer, and the controller calculates eye velocity of a user using detection information of the accelerometer and executes the switching control between the afterimage consideration pulse display and the normal pulse display depending on the calculated eye velocity.

According to an embodiment of the control device of the present disclosure, the display unit is a head wearable display unit that is worn on a head of a user, and controller calculates eye movement velocity during eye movement generated depending on vertical movement of the head of the user and executes the switching control between the afterimage consideration pulse display and the normal pulse display depending on the calculated eye movement velocity.

According to an embodiment of the control device of the present disclosure, the controller executes pulse display in which one turning on (ON) period is set to be less than or equal to 10 ms.

According to an embodiment of the control device of the present disclosure, the display unit is a display unit having a lens for setting a virtual observation position at a position farther away from an eye of a user than a display surface.

According to a second aspect of the present disclosure, there is provided a control device including: a controller configured to execute display information output control on a user wearable or portable display unit. The controller controls switching between hold display in which display information output to the display unit is continuously executed and pulse display serving as intermittent display in which a turning on (ON) period and a turning off (OFF) period are repeated, the turning on (ON) period being an output period of display information to the display unit, the turning off (OFF) period being a non-output period of display information to the display unit.

According to the control device of the present disclosure, the controller executes the switching control between the hold display and the pulse display depending on eye velocity of a user holding the display unit.

According to the control device of the present disclosure, the controller executes the hold display in a case where eye velocity of a user holding the display unit is less than a threshold and executes the pulse display in a case where the eye velocity is more than or equal to the threshold.

According to the control device of the present disclosure, the controller calculates eye velocity of a user based on movement information of the user inputted from sensor information and executes the switching control between the hold display and the pulse display depending on the calculated eye velocity.

According to the control device of the present disclosure, the control device includes an accelerometer, and the controller calculates eye velocity of a user using detection information of the accelerometer and executes the switching control between the hold display and the pulse display depending on the calculated eye velocity.

According to the control device of the present disclosure, the display unit is a head wearable display unit that is worn on a head of a user, and controller calculates eye movement velocity during eye movement generated depending on vertical movement of the head of the user and executes the switching control between the hold display and the pulse display depending on the calculated eye movement velocity.

According to the control device of the present disclosure, the controller executes the pulse display in which one turning on (ON) period is set to be less than or equal to 10 ms in executing the pulse display.

According to the control device of the present disclosure, the display unit is a display unit having a lens for setting a virtual observation position at a position farther away from an eye of a user than a display surface.

According to a third aspect of the present disclosure, there is provided a control method executed by a control device for a user wearable or portable display unit, the method including: setting, by a controller, a turning on (ON) period and a turning off (OFF) period and controlling, by the controller, switching between afterimage consideration pulse display having the turning off period being set to be within an afterimage recognition period and normal pulse display having the turning off period being set to be longer than or equal to the afterimage recognition period, the turning on (ON) period being an output period of display information to the display unit, the turning off (OFF) period being a non-output period of display information to the display unit.

According to a fourth aspect of the present disclosure, there is provided a control method executed by a control device for a user wearable or portable display unit, the method including: controlling, by a controller, switching between hold display in which display information output to the display unit is continuously executed and pulse display serving as intermittent display in which a turning on (ON) period and a turning off (OFF) period are repeated, the turning on (ON) period being an output period of display information to the display unit, the turning off (OFF) period being a non-output period of display information to the display unit.

According to a fifth aspect of the present disclosure, there is provided a program for causing a control device to control a user wearable or portable display unit, the program causing the control device to set a turning on (ON) period and a turning off (OFF) period and to control switching between afterimage consideration pulse display having the turning off period being set to be within an afterimage recognition period and normal pulse display having the turning off period being set to be longer than or equal to the afterimage recognition period, the turning on (ON) period being an output period of display information to the display unit, the turning off (OFF) period being a non-output period of display information to the display unit.

According to a sixth aspect of the present disclosure, there is provided a program for causing a control device to control a user wearable or portable display unit, the program causing the control device to control switching between hold display in which display information output to the display unit is continuously executed and pulse display serving as intermittent display in which a turning on (ON) period and a turning off (OFF) period are repeated, the turning on (ON) period being an output period of display information to the display unit, the turning off (OFF) period being a non-output period of display information to the display unit.

Note that the program according to the present disclosure is a program that can be provided in a storage medium or communication medium that is provided in a computer-readable form for an image processing device or a computer system that is capable of executing various types of program code, for example. Providing this sort of program in a computer-readable form makes it possible to implement the processing according to the program in the information processing device or the computer system.

The objects, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

Advantageous Effects of Invention

According to the configuration of one embodiment of the present disclosure, the display information output control with improved visibility of the user wearable or portable display unit is implemented.

More specifically, a controller that executes display information output control on a user wearable or portable display unit is included. The controller sets a turning on (ON) period that is an output period of display information to the display unit as display information output to the display unit, and a turning off (OFF) period that is a non-output period of display information. The controller controls switching between the afterimage consideration pulse display in which the turning off period is set within the afterimage recognition period and the normal pulse display in which the turning off period is set to be longer than or equal to the afterimage recognition period. The controller executes the switching control between the afterimage consideration puke display and the normal pulse display depending on the eye movement velocity of the user. The afterimage consideration pulse display is performed if the eye velocity of the user is less than the threshold, but the normal pulse display is performed if it is more than or equal to the threshold.

In addition, the effects described in the present specification are not limiting but are merely examples, and there may be additional effects.

BRIEF DESCRIPTION OF DRAWINGS

FIG. 8 is a diagram illustrated to describe an example of calculation processing of eye movement velocity (angular velocity) during walking.

FIG. 9 is a diagram illustrated to describe an example of calculation processing of eye movement velocity (angular velocity) during running.

FIG. 10 is a diagram illustrated to describe a correspondence relationship between eye movement velocity and visibility deterioration level.

FIG. 11 is a diagram illustrated to describe the amount of character shift occurring depending on the eye movement velocity and information display time during execution of three types of exercises, walking, low speed running, and high speed running, and to describe results obtained by analyzing the recognizable character size.

FIG. 12 is a diagram summarizing two analysis results obtained from the results shown in FIG. 11.

FIG. 13 is a diagram illustrated to describe an example of display control depending on various exercise states of a user who wears or carries a human-wearable or portable display device such as a head-mounted display.

FIG. 15 is a diagram illustrating the eye position (direction angle), movement velocity (angular velocity), and eye velocity of zero during walking and running.

MODE(S) FOR CARRYING OUT THE INVENTION

The control device, control method, and program according to an embodiment of the present disclosure will be described in detail with reference to drawings. The description is made in the order of the following items.

1. Exemplary Configuration of Head-mounted Display
2. Factors and Examination of Visibility Deterioration of Display Information
3. Consideration on Prevention of Visibility Deterioration
4. Consideration on Visibility Deterioration due to Afterimage and Pursuit Eye Movement (Retinal slippage)
5. Prevention of Visibility Deterioration by Pulse Display
6. Principle of Visibility Improvement by Pulse Display
7. Configuration for Executing Control depending on Movement of User
8. Control of Display Timing in Pulse Display 9. Control of Luminance of Display Unit
10. Processing Procedure of Display Control
10-1. Basic Procedure of Switching Control between Hold Display and Pulse Display
10-2. Exercise Situation Determination Processing Procedure
10-3. Display Control Procedure in Stationary or in executing Low Periodic Exercise
10-4. Display Control Procedure in executing High Periodic Exercise
10-5. Display Control Procedure in executing Non-periodic Exercise
11. Exemplary Switching Processing between Normal Display and Afterimage Consideration Pulse Display in which Non-display Period is set within Afterimage Recognition Period
12. Exemplary Hardware Configuration of Control Device
13. Brief Summary of Configuration of present Disclosure

[1. Exemplary Configuration of Head-mounted Display]

Figure 1:
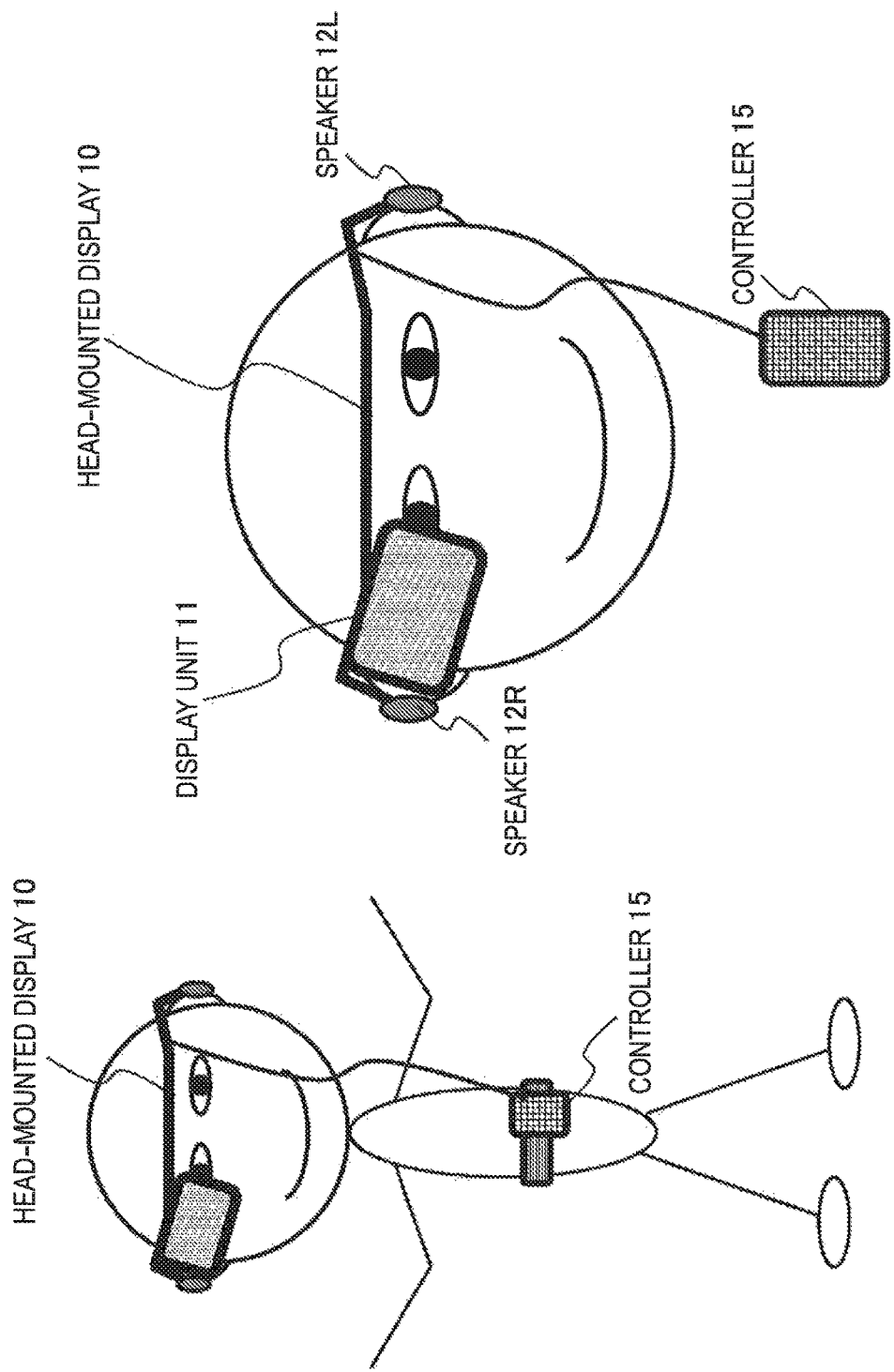
FIG. 1 is a diagram illustrated to describe an exemplary configuration of a head-mounted display.

An exemplary configuration of a head-mounted display (HMD) that is an example of a display device according to an embodiment of the present disclosure is described. FIG. 1 is a diagram illustrating a user wearing a head-mounted display (HMD) 10. The head-mounted display 10 has a configuration that can be worn on the user's head. The head-mounted display 10 shown in the figure is provided with a display unit 11 on the right eye side of the user, but no display is provided on the left eye side. The display unit 11 has a configuration that does not cover the front surface of the eye. Such configuration allows the user to observe the frontal outside world in a normal condition, not through the display unit 11.

Thus, the user can walk (walking), run (running), or riding a bicycle or motorcycle, in one example, while wearing the head-mounted display 10. The user can check the information displayed on the display unit 11 by moving the line of sight to the display unit 11 temporarily while performing these exercises or the like. In other words, the display information can be checked by moving the line of sight sometimes while performing actions such as walking or running.

Moreover, an example of the display information includes map information indicating the current location, information on temperature and humidity, and information on the user's heart rate. The head-mounted display 10 is provided with various types of sensors used to acquire these pieces of information, and the display information is generated based on information sensed by sensors and display processing is performed under the control of a controller 15.

Furthermore, the head-mounted display 10 is provided with speakers 12L and 12R at the respective positions of the left and right ears, in addition to the display unit 11, and these speakers output sound corresponding to the information displayed on the display unit 11. The control of information to be displayed on the display unit 11 and the control of sound to be outputted from the speakers 12L and 12R are executed in the controller 15.

[2. Factors and Examination of Visibility Deterioration of Display Information]

In a case where the user views the information displayed on the portable or wearable display device such as the head-mounted display 10 illustrated in FIG. 1, it is possible for the user to check the display information in a relatively stable state if the user is stationary. However, in a case where the user views the display unit while performing actions such as walking or running, the display information fails to be recognized immediately, that is, the display information is difficult to be recognized disadvantageously.

Factors that make it difficult to recognize the information displayed on the head-mounted display (HMD) or the like during exercise are roughly classified into two factors as follows:

(1) Shaking of the main unit of the head-mounted display (HMD)
(2) Human eye movement The visibility deterioration due to "(1) shaking of the main unit of the head-mounted display (HMD)" is the deterioration of visibility caused by display moving physically out of the field of view due to positional misalignment of the eyes relative to the display unit of the head-mounted display (HMD) or vibration, or caused by a fact that its vibration velocity is fast.

Furthermore, the visibility deterioration due to "(2) human eye movement" is specifically based on a plurality of biological reactions as described below. In other words, the visibility deterioration is caused by "vestibular eye motion" in which the eye is moved reflectively in response to the movement of the body part unconsciously performed by a human, "saccadic eye movement" in which the eye is moved to acquire information on the peripheral field of view, and "focusing" or "pursuit eye movement" performed for perception or recognition of an object.

Examples of the existing countermeasures against the visibility deterioration based on such factors include as follows. For "(1) Shaking of the main unit of the head-mounted display (HMD)", there are effective physical countermeasures in which the display device is firmly fixed to the head and a collimated light lens is used. Such measures work effectively for a sufficiently lightweight display unit, or for small application of "force" from the outside. However, if a large "force" such as acceleration larger than or equal to a predetermined value is applied from the outside, the shaking amplitude increases and the shaking is not kept in a fixed direction, in one example, twisting occurs, and thus shaking in a plurality of directions occurs. In such a case, the retinal slippage or the like occurs and thus a decrease in recognition rate fails to be prevented disadvantageously.

On the other hand, for effective countermeasures against "(2) human eye movement", no particular disclosures have been found. Thus, the visibility deterioration caused by "(2) Human eye movement" is examined.

Figure 2:
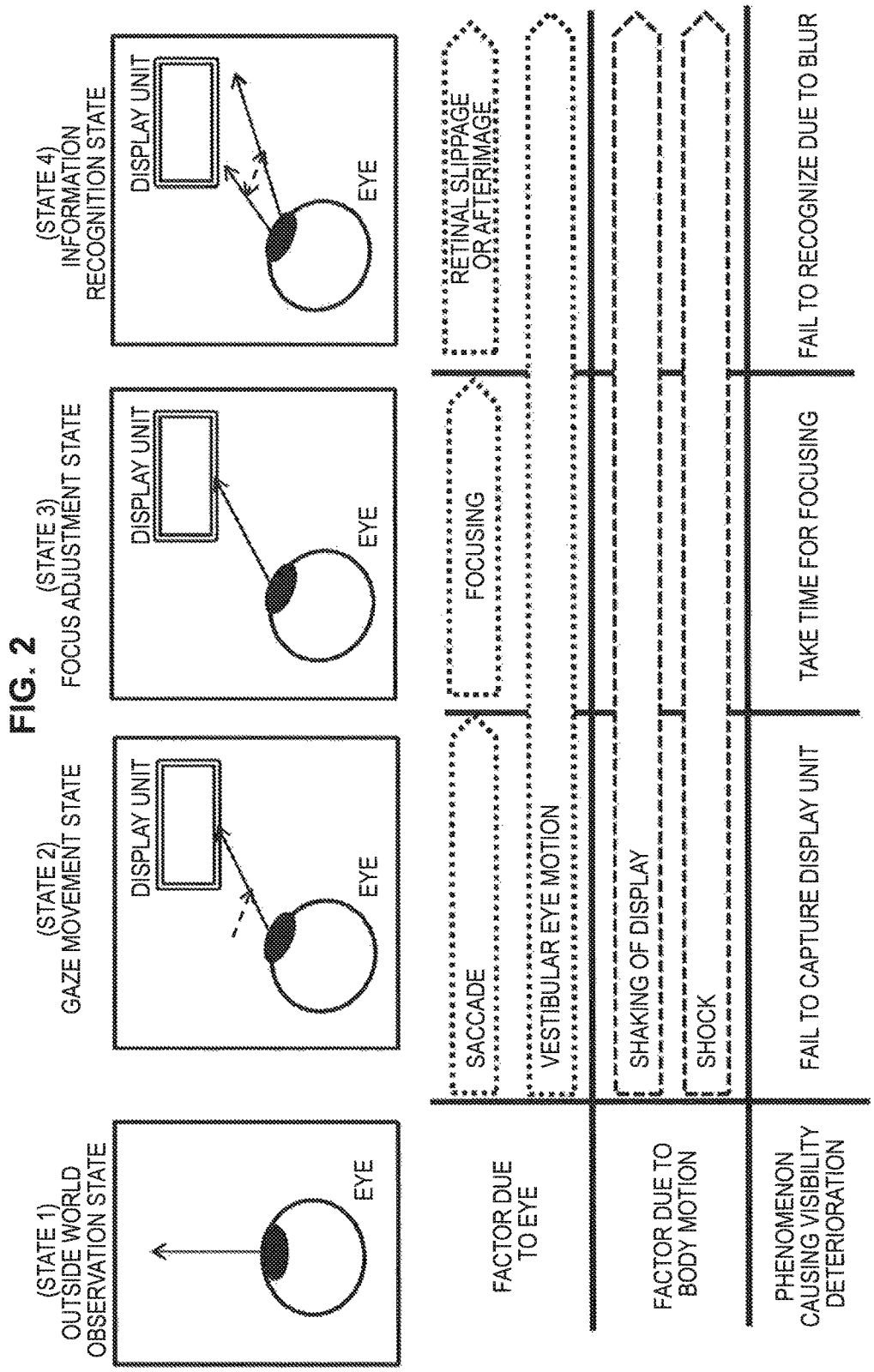
FIG. 2 is a diagram illustrated to describe factors causing visibility deterioration of a display device.

FIG. 2 is a diagram illustrated to describe the state transition until the user who wears a head-mounted display and views the outside world (front) while exercising such as walking, running, and cycling recognizes display information by moving the line of sight to the display unit of the head-mounted display, in one example. In addition, FIG. 2 is a diagram illustrated to describe a phenomenon that causes the visibility deterioration, which occurs in the respective states.

During the period from viewing the display unit of the head-mounted display to recognizing information displayed on the display unit, there are following transitions for four states as illustrated in FIG. 2.

(State 1) External observation state in which far points (front of outside world) outside the display unit is viewed
(State 2) Gaze movement state in which the line of sight is moved to the display unit
(State 3) Focus adjustment state in which the focus on the display unit is adjusted
(State 4) Display information recognition state in which information displayed on the display unit is recognized.

The external observation state in which far points (front of outside world) outside the display unit is viewed (State 1) is a state in which the user is exercising facing the front, in one example. It is a state in which the frontal outside world is viewed while walking, running, bicycling, or the like is performed facing the traveling direction.

The gaze movement state in which the line of sight is moved to the display unit (State 2) is a state in which the user is moving the line of sight to view the display unit of the head-mounted display, for example, the display unit positioned at the end portion of the right eye. In this case, the user performs a fine eye movement called saccadic eye movement and attempts to capture the position of the display unit (display device) at the center of the eye. However, in this gaze movement phase, if the display unit (display device) shakes, the display unit fails to be captured in a short time. If the display unit fails to be captured in a short time, the eye movement of finding another place or returning the line of sight to the front occurs.

The achievement of an accurate and rapid gaze movement is necessary to minimize the shake of the display unit. A decrease in the shake of the display unit makes it possible to help in capturing using the saccadic eye movement.

The focus adjustment state in which the focus on the display unit is adjusted (State 3) is a process to be performed after capturing the display unit and is a state in which the eye is focused on a display surface of the display unit. Although there are individual differences in time to achieve focusing, the time necessary to achieve focusing is typically 400 ms, which is a standard time. If it takes a time to achieve focusing, the main unit of the display unit or the body part shakes during that time and thus the focusing is not going well.

To prevent the visibility deterioration in this focusing process, even if the eye slightly shifts with respect to the display unit, a setting process for allowing the same image to be viewed is effective as long as such shift is within the range in which the eye is able to move. Furthermore, when the information displayed on the display unit is controlled so that the information is observed as a virtual image as if it is far away, it becomes nearly unnecessary for the user who is observing far away to achieve focusing even if the viewpoint is moved to the information displayed on the display unit. Thus, the time necessary to achieve focusing can be shortened.

Moreover, the setting of optical system in the display unit makes it possible to allow the information displayed on the display unit to be observed far away. Specifically, the lens in the optical system may be set so that the information displayed on the display unit is observed by the retina using the setting close to collimated light. An example of such lens setting will be described later.

The display information recognition state in which information displayed on the display unit is recognized (State 4) is a state in which a process of recognizing the display information after focusing. The process of recognizing the display information has a problem that it is influenced by the afterimage effect of human eye and the pursuit eye movement (retinal slippage).

Briefly speaking, the afterimage effect is a phenomenon in which what viewed by the human vision remains for a short time. As an example of a phenomenon in which viewing is difficult due to the afterimage effect, in a liquid crystal television provided with a backlight that is constantly turned on, "motion blur" felt when a screen showing rapid movement such as sport is viewed is well known. This problem occurs because, in a case where a moving image composed of frames such as sport displayed on the display unit is viewed, the transition from the first frame to the second frame overlaps an image of the second frame onto the afterimage of the first frame.

The pursuit eye movement (retinal slippage) is to predict motion and to move the eye accordingly, for continuous following of a moving object in capturing it at the center of the field of view. In a case where there is a shift between the predicted position and the actual display position, there occurs a process of supplementing what is not viewed actually, but as if it is viewed by the brain, or an erroneous recognition such as it is erased. This also causes occurrence of motion blur.

[3. Consideration on Prevention of Visibility Deterioration]

As described with reference to FIG. 2, there are various factors causing the visibility deterioration until the user who is viewing the outside world moves the line of sight to the display unit of the head-mounted display and recognizes the display information.

As illustrated in FIG. 2, factors causing the visibility deterioration can be classified into two categories, that is, a factor due to the eye and a factor due to body motion. As countermeasures against shaking and impact of the display caused by the factor due to body motion, countermeasures including miniaturization and weight reduction of the head-mounted display itself and provision of a vibration-absorbing member such as a head pad and a cushion are considered to be effective. Furthermore, the "saccade" that is one of factors due to eye is also greatly influenced by the shaking of the display. Thus, countermeasures including miniaturization and weight reduction of the head-mounted display itself and provision of a vibration-absorbing member such as a head pad and a cushion are considered to be effective, which is similar to the above, as a way for reducing the shaking of the head-mounted display.

Furthermore, the visibility deterioration by "focusing" that is one of factors due to eye is caused by the gap between a focal position in which the eyes focus on a long distance in the outside observation state before the user moves the line of sight to the display unit and a focal position in which the eyes are necessary to focus on a short distance to view the display information on the display unit.

Figure 3:
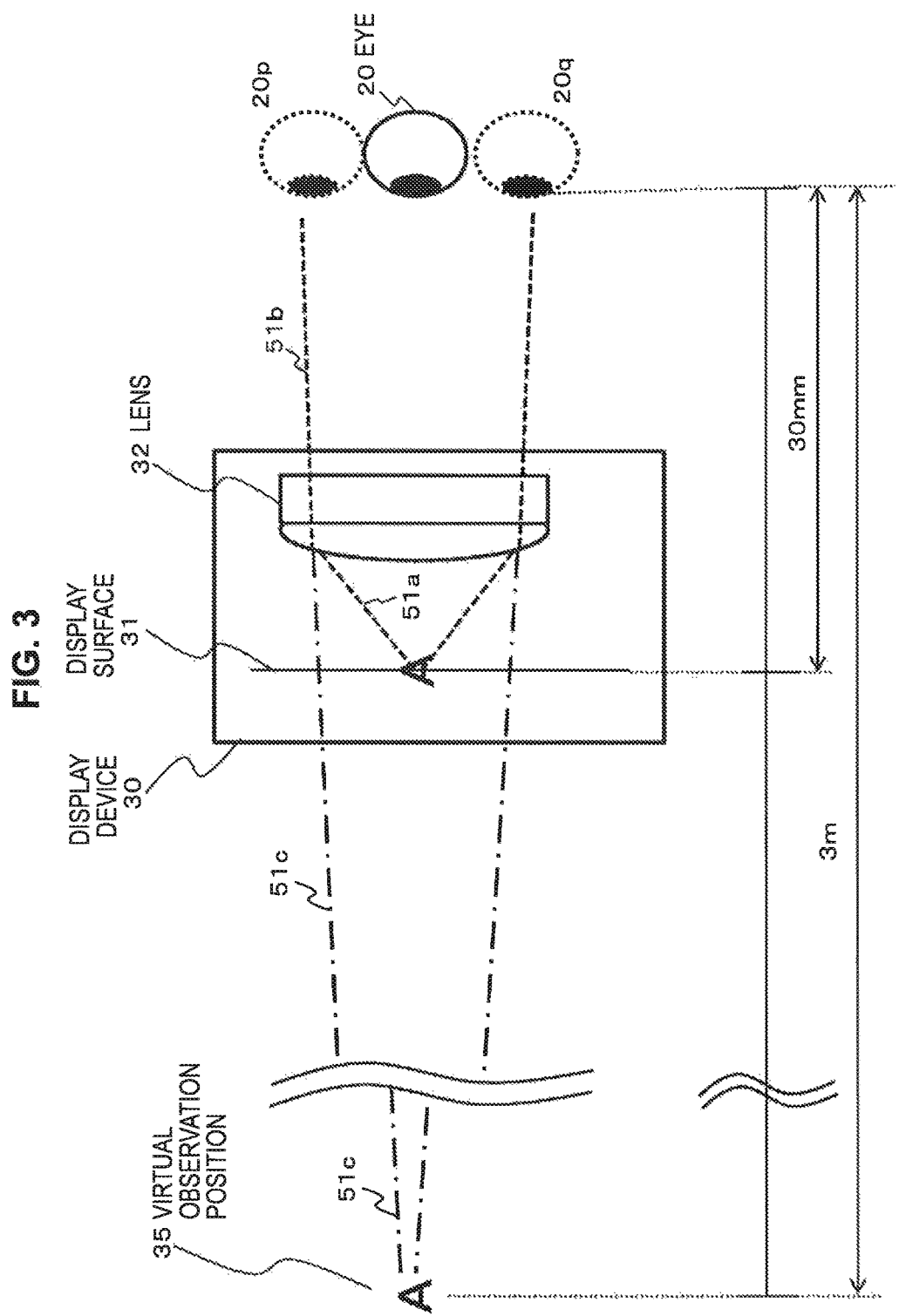
FIG. 3 is a diagram illustrated to describe an example of a technique for making an image on a display unit virtually visible at a distance.

As a countermeasure for this, as described above, the technique for allowing the optical system of the display unit to make the image on the display unit virtually farther away is effective. This technique will be described with reference to FIG. 3. FIG. 3 illustrates a sectional configuration of a display device 30 such as a head-mounted display and an eye 20 of a user who observes the display information.

The display device 30 is configured to include a lens 32 on the front surface of a display surface 31. The user observes information displayed on the display surface 31 through the lens 32. The distance between the display surface 31 and the user's eye 20 is approximately 30 mm.

The focal length of the eye 20 is necessary to be set to 30 mm to recognize the information displayed on the display surface 31 directly without passing through the lens 32. In a case where it is attempted to achieve focusing by moving the viewpoint to the display surface 31 from the state of viewing the scenery in the distant place, it is necessary to significantly change the focal position of the distant place to the focal position of 30 mm. Accordingly, it takes a time to achieve focusing, and thus a delay occurs in recognizing the display information.

However, in the configuration illustrated in FIG. 3, the lens 32 controls light 51a to be outputted from the display surface 31 as indicated by a control line 51b. In other words, the light to be outputted from the display surface 31 is controlled to be close to substantially collimated light by the lens 32, and is observed on the user's eye 20. This control allows the user's eye 20 to observe information displayed on the display surface 31, for example, a character "A" at the position along control lines 51$b$ and 51$c$, that is, a virtual observation position 35 shown in the figure.

In the example illustrated in the figure, the virtual observation position 35 is at a distance of approximately 3 m from the eye 20. The distance to the virtual observation position 35 is a distance determined by the configuration of the lens 32 and can be changed by the setting of the lens.

In this way, the observation position of the information displayed on the display surface 31 is set in the distance by the lens 32. Thus, in a case where the user moves the viewpoint to the display information to be outputted to the display surface 31 of the display device 30 from the state of viewing the outside distant landscape, the variation in the focal length of the eye 20 can be reduced. This makes it possible to reduce the time necessary for aligning the focal position and to recognize immediately the display information.

Moreover, such a way of controlling the lens illustrated in FIG. 3 is a method that has been used in the existing head-mounted display as the collimated light and long-distance imaging. Furthermore, in a case where this way of controlling the lens is used, even if the position of the eye 20 relative to the display device 30 shifts like the eyes 20$p$ and 20$q$ shown in the figure, the positional shift amount relative to the virtual observation position 35 is relatively less than the positional shift amount relative to the display surface 31. Thus, no large viewpoint shift is necessary, thereby observing the display information more stably.

[4. Consideration on Visibility Deterioration Due to Afterimage and Pursuit Eye Movement (Retinal Slippage)]

The visibility deterioration due to the afterimage and pursuit eye movement (retinal slippage) that are one of factors of the visibility deterioration due to eye as shown in FIG. 2 is considered.

As described above with reference to FIG. 2, the afterimage effect is an effect in which what viewed by a person with the eyes remains for a short time. In one example, in a liquid crystal television provided with a backlight that is turned on constantly, when a screen showing rapid movement such as sport is viewed, an image of the subsequent frame overlaps the afterimage of the preceding frame, and thus "motion blur" is experienced.

The pursuit eye movement (retinal slippage) is to predict motion and to move the eye accordingly, for continuous following of a moving object in capturing it at the center of the field of view. This is a process that feels what is not viewed actually but as if it is viewed, due to the shift between the predicted position and the actual display position, which causes occurrence of motion blur.

An example of a method of preventing an afterimage includes MotionFlow technology that is employed for television devices manufactured by Sony Corporation. This is a solution for reducing the influence of afterimages by blinking of a backlight of the liquid crystal display device. Specifically, the process of turning on the backlight of the LED from top to bottom in sequence every approximately 1 ms (1/960) allows an image to be set as being equivalent to the image at 16 times velocity (960 frames per second), thereby reducing significantly the sense of afterimage felt by the viewer. In other words, the sense of afterimage can be reduced by shortening a time necessary to display a frame image serving as one fixed image.

We conducted a simple experiment to obtain data for applying this to a user wearable or portable display. This experiment is described with reference to FIG. 4. The experiment was carried out by outputting a display character 41 consisting of two digits on a display device 40 serving as a tablet terminal, creating an application for displaying this display character in a blinking manner, and observing it to evaluate a recognition level.

The display application running on the display device 40 randomly generates and displays two-digit numeric character. The two types of display patterns were set as follows and they were executed respectively.

(A) "Continuous display (hold display) pattern" in which the numeric character continues to be turned on continuously (B) "Intermittent display (pulse display) pattern" in which the numeric character is turned on and off repeatedly every 10 ms The visibility of the display information was checked by causing an examination subject to observe the display information in a state in which the display device 40 was held by the examination subject with one hand and was slightly shaken. From the evaluation results of several people, it was determined that the "intermittent display (pulse display) pattern" in which turning on and turning off are repeatedly performed is clearly easier to view than the "continuous display (hold display) pattern".

[5. Prevention of Visibility Deterioration by Pulse Display]

Figure 4:
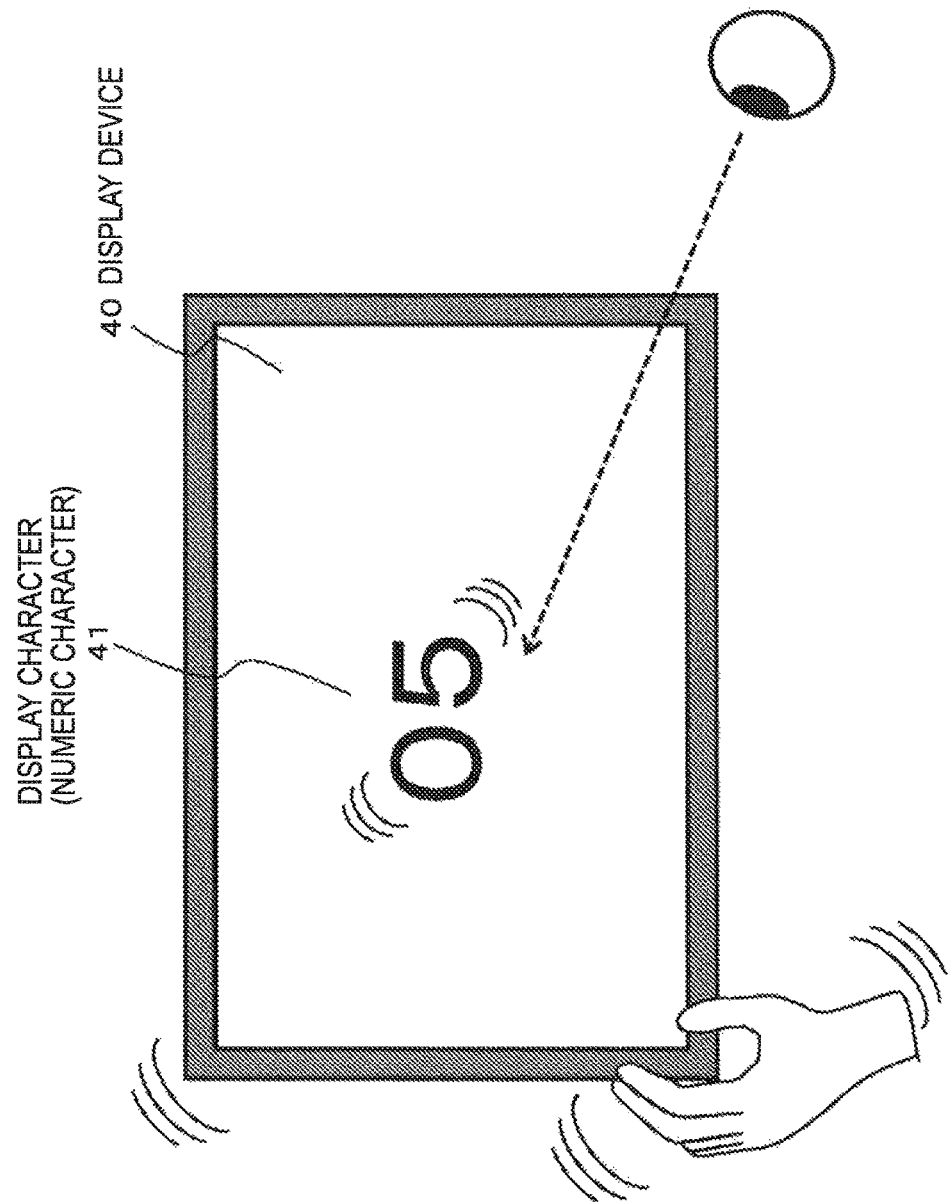
FIG. 4 is a diagram illustrated to describe an experiment of evaluating a recognition level using an application for causing a display character to be displayed in blinking mode.

It was found that the pulse display in which the output (ON) and stop (OFF) of display information are repeatedly performed has an effect of preventing the visibility deterioration in displaying information on a human-wearable or portable display device such as a head-mounted display or the like based on the experiment described with reference to FIG. 4. In the pulse display, display and non-display of information on the display unit are repeatedly performed at short time intervals. This processing makes it possible for an output image of a short time to be projected on the retina, and thus it is considered to have an effect of preventing slippage on the retina.

The correlation between the visibility and the pulse display control including setting of each period of the output (ON) and the stop (OFF) of display information is considered. Various experiments were carried out by mounting a control board on the existing head-mounted display and by preparing experimental equipment capable of turning on and off the backlight made of a liquid crystal that constitutes the display unit at high speed.

Figure 5:
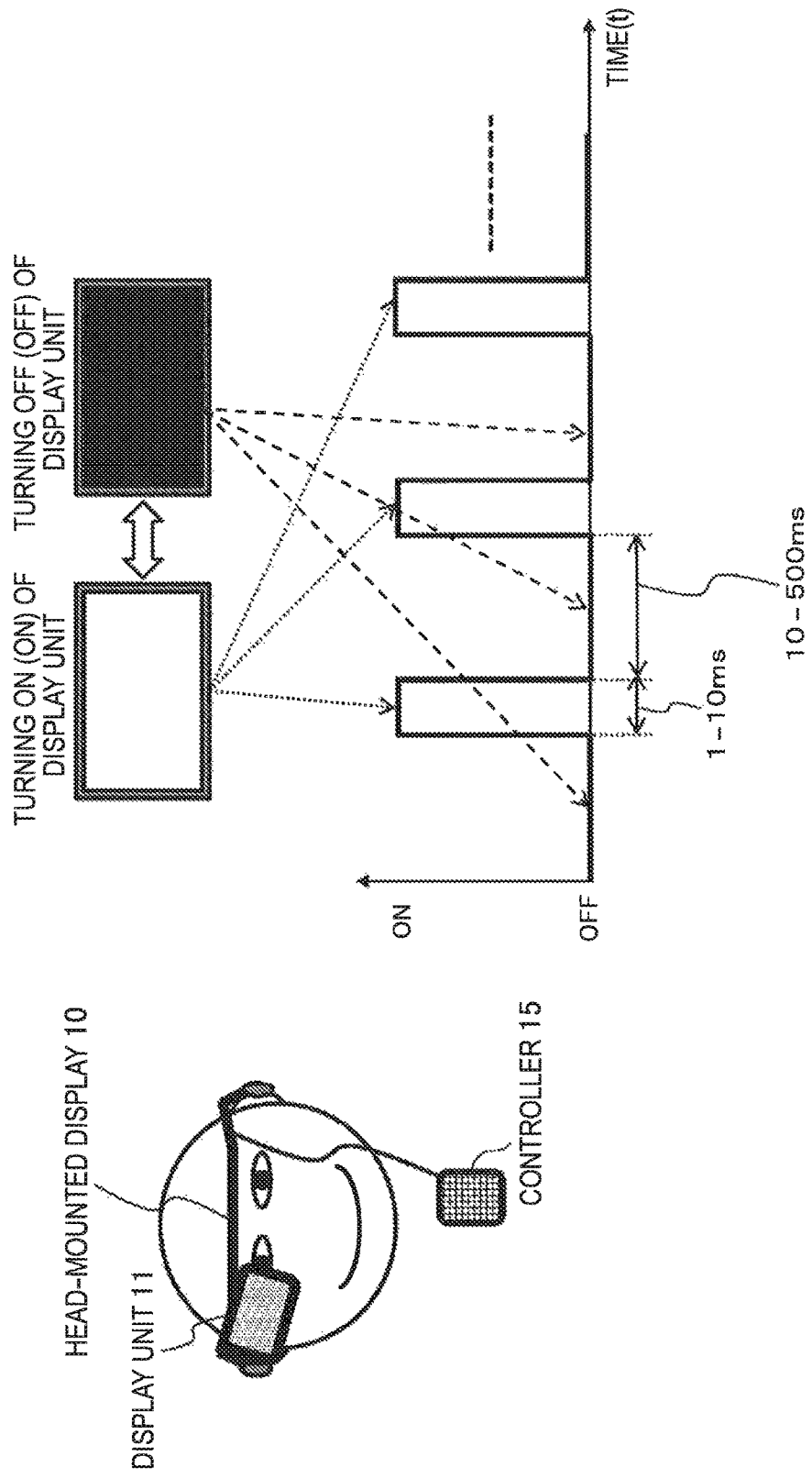
FIG. 5 is a diagram illustrated to describe intermittent display (pulse display) on a display unit.

The backlight of the display unit was configured to make "intermittent display (pulse display)" in which each time of turning on/off (ON/OFF) is set as illustrated in FIG. 5 executable, in addition to the setting of "continuous display (hold display)" which is turned ON continuously. As illustrated in FIG. 5, each time of turning on/off (ON/OFF) could be set optionally within the following range.

Turning on time=1 to 10 ms

Turning off time=10 to 500 ms

The experiment was carried out in a state in which an experiment subject (user) wears a head-mounted display provided with a display unit capable of ON/OFT at the time that is set within the range.

In the graph shown in FIG. 5, the turning on time was set to be adjustable within a range of 1 to 10 ms, and the turning off time was set to be adjustable within a range of 10 to 500 ms. The ON and OFF are repeated at the set time intervals, resulting in the pulse display in which ON/OFF of display information is repeatedly performed.

Figure 6:
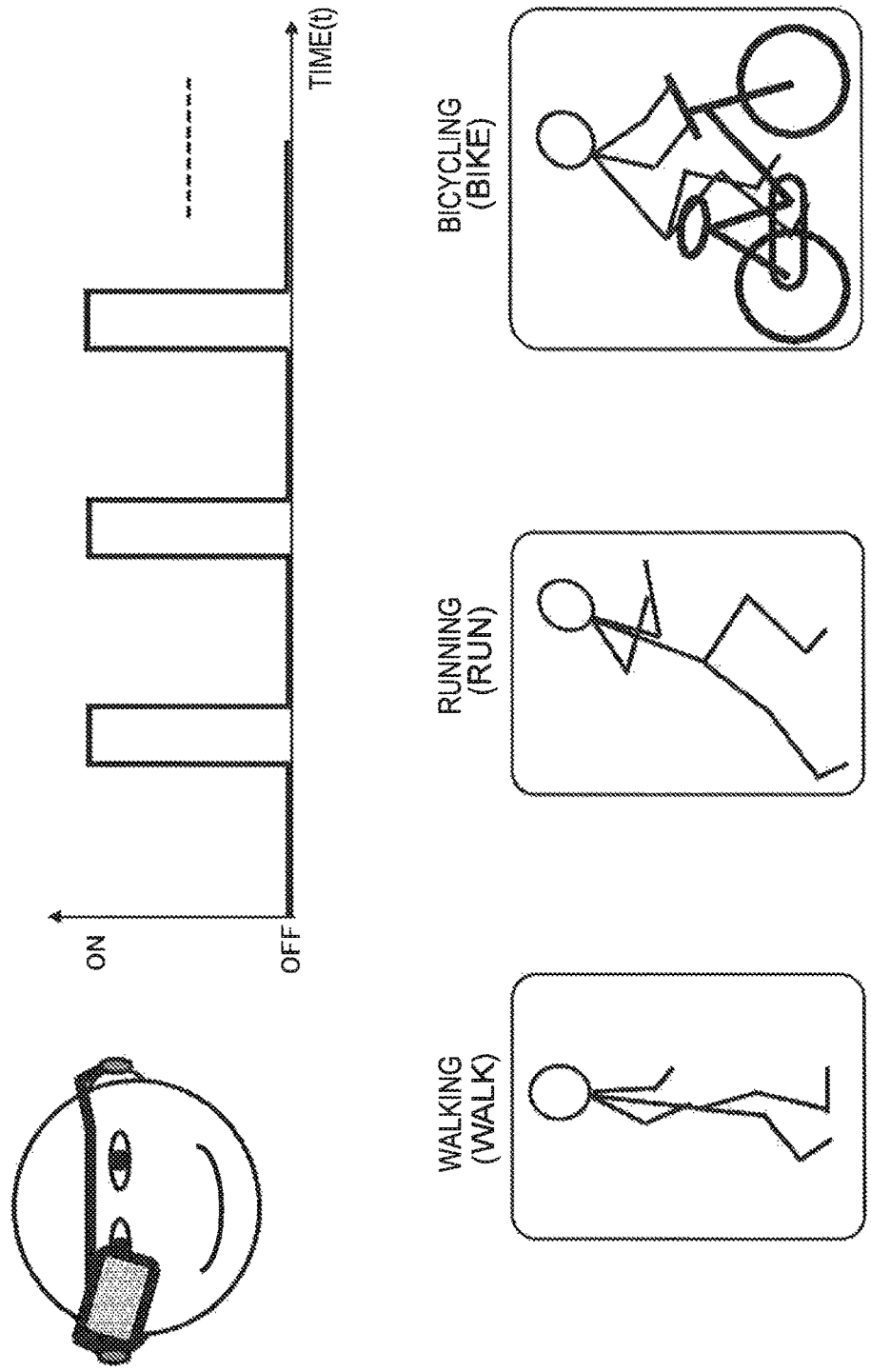
FIG. 6 is a diagram illustrated to describe an experiment of attaching a head-mounted display having a display unit enabling pulse display to an experiment subject (user) and of checking display information of the display unit while performing various exercises and motions.

As illustrated in FIG. 6, a head-mounted display provided with a display unit that enables pulse display was attached to the experiment subject (user), and the experiment subject was caused to perform various exercises or actions of walking, running, bicycling, stair climbing, sliding, strong swing of the neck, or the like. The experiment was carried out to cause the experiment subject to check information displayed on the display unit while performing such exercises.

From this experiment, the following conclusions were obtained as the visibility evaluation result for the display information on the display unit.

(Conclusion 1) Comparison between the "continuous display (hold display)" and the "intermittent display (pulse display)"

The "intermittent display (pulse display)" is more favorable for visibility than the "continuous display (hold display)".

(Conclusion 2) Comparison of "intermittent display (pulse display)" of various ON/OFF settings The effect of visibility is remarkable when the turning on (ON) time is set to equal to 1 to 5 ms, and the turning off (OFF) time is set to equal to 100 to 300 ms. These conclusions were obtained.

[6. Principle of Visibility Improvement by Pulse Display]

Figure 7:
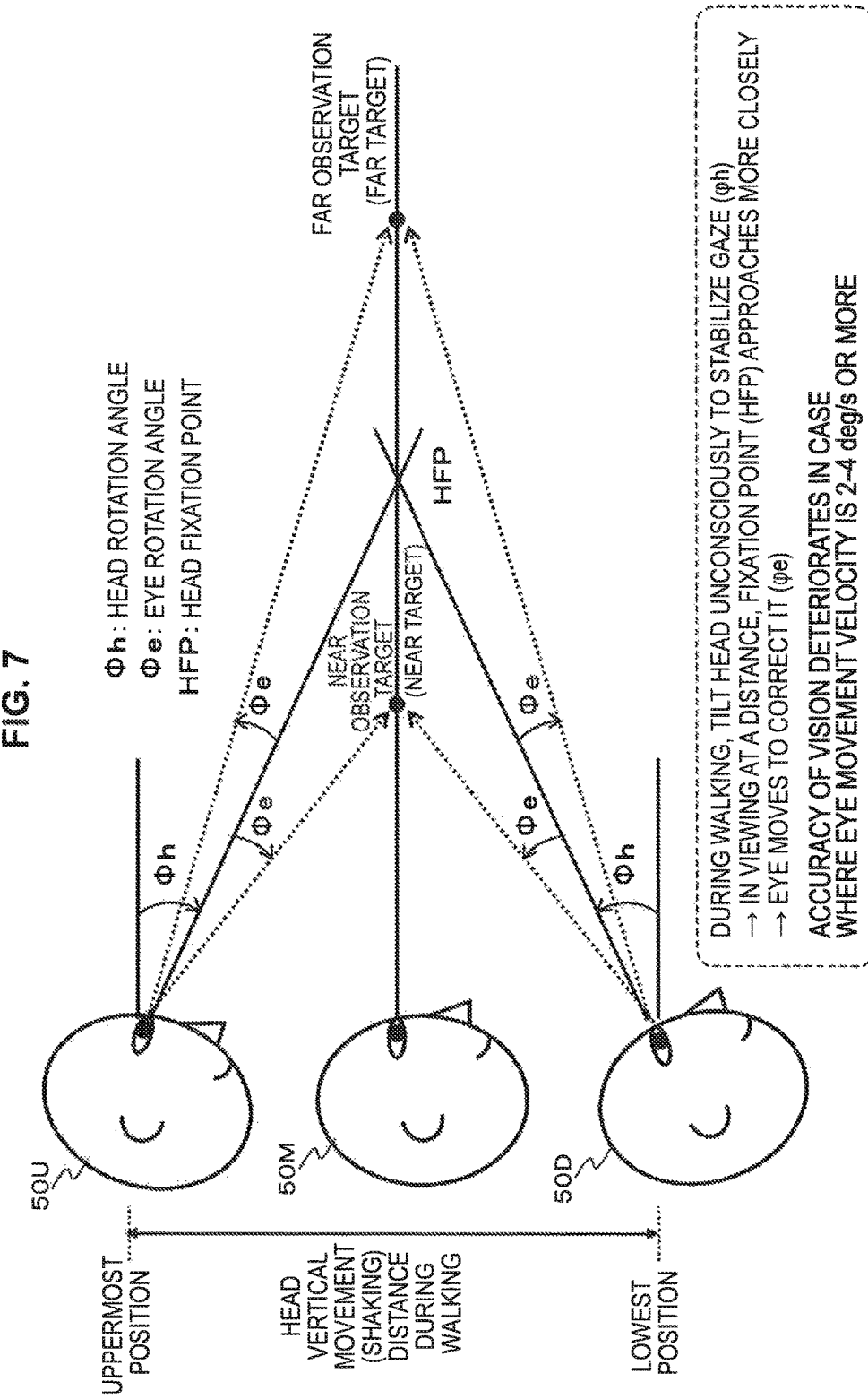
FIG. 7 is a diagram illustrated to describe head movement and eye movement for maintaining gaze stabilization during walking.

Theoretical verification was carried out on the effectiveness of pulse display based on the principle of occurrence of retinal slippage. FIG. 7 is a diagram based on the article "Eye-Head-Trunk Coordination Strategies for Gaze Stabilization during Locomotion" (Osaka University, Hirasaki Eishi, 2000).

Users 50U, 50M, and 50D shown in FIG. 7 represent each position and inclination of the face during walking. The human's head moves up and down or bobbing during walking. In this case, an action of tilting the head is performed unconsciously to stabilize the line of sight.

The user 50M indicates the position and inclination of the face at the vertical direction intermediate position during walking. The user 50U indicates the position and inclination of the face at the uppermost position during walking. The user 50D indicates the position and inclination at the lowest position during walking. A human typically sets an observation target (Target) during walking and walks while watching the observation target. Thus, when the head is bobbing, the head is tilted up and down so that the line of sight is directed to the observation target (Target).

The observation target (Target) can be set in various positions. In this figure, as two setting examples, a far observation position (Far Target) and a near observation position (Near Target) are shown. In one example, the user sets one of them as an observation target (Target) and walks while watching the observation target.

In one example, the user 50M at the intermediate position shown in the figure views the observation target (Target) at the same height as the line of sight of the user M, and thus the inclination of the head is zero. However, the user 50U whose head is moved to the upper part in the vertical direction tilts the head downward to view the same observation target (Target). The inclination angle is the head rotation angle ($\Phi h$) as shown in the figure. Similarly, the user 50D whose head is moved to the lower part in the vertical direction tilts the head upward in order to view the same observation target (Target). The inclination angle is the head rotation angle ($\Phi h$) as shown in the figure.

However, this inclination angle of the head is not a completely exact direction to the observation target and in one example when the far observation target (Far Target) is viewed at a distance, the head inclination ($\varphi h$) will be larger, thus the user views a little close place (HFP). In order to correct this, a correction process of moving the eye in the direction opposite to the head is performed. The moving angle of the eye is the eye rotation angle ($\Phi_e$) as shown in the figure.

The head rotation and the eye rotation for correcting an excessive head rotation make it possible to observe continuously the observation target and to perform stable walking.

Moreover, in a case of observing the far observation target (Far Target) at a further distance during walking, a correction process of moving the eye in the direction opposite to the head is performed. On the other hand, in a case of observing the near observation target (Near Target) close to the user, a correction process of moving the eye in the same direction as the head is performed.

In other words, in both cases of observing the far observation target (Far Target) and of observing the near observation target (Near Target) during walking, the inclination of the head is adjusted so that the head directs to substantially at the head fixation point (HPF). The eye moves in the same direction as the inclination of the head or the opposite direction to the inclination of the head depending on the positional relationship between the head direction oriented toward the head fixation point (HPF) and the observation target (Target). This processing makes it possible to walk without turning the line of sight to the observation target (Target).

Such eye movement processing is one factor of the visibility deterioration. If the rotation angular velocity of the eye is 2 to 4 deg/s or more, the visibility deterioration occurs. The eye movement velocity (angular velocity) during walking and running was calculated on the premise that inclination of the head and movement of the eye occurred as shown in FIG. 7. FIG. 8 is a diagram illustrating an example of calculation processing of the eye movement velocity (angular velocity) during walking. FIG. 9 is a diagram illustrating an example of calculation processing of the eye movement velocity (angular velocity) during running.

An example of calculation processing of the eye movement velocity (angular velocity) during walking will be described with reference to FIG. 8. FIG. 8 illustrates two graphs as follows.

(A1) Temporal transition of head position during walking (A2) Temporal transition of eye direction and eye movement velocity (angular velocity) during walking The temporal transition of head position during walking (A1) is based on the theory described above with reference to FIG. 7, and is a graph showing the vertical movement of the head during walking. Moreover, the moving distance of the head during walking was set to 50 mm in vertical width and 2 Hz in frequency (corresponding to the number of steps per second).

In the temporal transition of eye direction and eye movement velocity (angular velocity) during walking (A2), the eye direction (equal to the eye direction angle ($\Phi_e$)) is based on the theory described above with reference to FIG. 7, and the eye movement velocity (angular velocity) (equal to the eye angular velocity ($\Phi_{e-v}$)) is eye velocity data (angular velocity) calculated based on the eye direction temporal transition data.

In the graph (A2) shown in FIG. 8, the dotted line data is angle transition data indicating the eye direction, and the solid line data indicates the eye movement velocity (angular velocity). As indicated by the solid line in (A2) of FIG. 8, the eye movement velocity (angular velocity) $\Phi_{e\text{-}v}$ is a graph that repeats the following range periodically.

$\Phi_{e\text{-}v}$=−1.8 deg/s to +1.8 deg/s

The eye movement velocity (angular velocity) during walking, which equals to $\Phi_{e\text{-}v}$=−1.8 deg/s to +1.8 deg/s, is less than or equal to the angular velocity, which equals to 2 to 4 deg/s, at which the visibility deterioration described above occurs, and it is determined that the visibility deterioration is less likely to occur at this level.

An example of calculation processing of the eye movement velocity (angular velocity) during running will be described with reference to FIG. 9. FIG. 9 illustrates two graphs as follows, similar to FIG. 8.

(B1) Temporal transition of head position during running (B2) Temporal transition of eye direction and eye movement velocity (angular velocity) during running The temporal transition of head position during running (B1) is based on the theory described above with reference to FIG. 7, and is a graph showing the vertical movement of the head during running. Moreover, the moving distance of the head during running was set to 100 mm in vertical width and 3 Hz in frequency (corresponding to the number of steps per second).

In the temporal transition of eye direction and eye movement velocity (angular velocity) during running (B2), the eye direction (equal to the eye direction angle ($\Phi_e$)) is based on the theory described above with reference to FIG. 7, and the eye movement velocity (angular velocity) (equal to the eye angular velocity ($\Phi_{e\text{-}v}$)) is velocity data calculated based on the eye direction temporal transition data.

In the graph (B2) shown in FIG. 9, the dotted line data is angle transition data indicating the eye direction, and the solid line data indicates the eye movement velocity (angular velocity). As indicated by the solid line in (B2) of FIG. 9, the eye movement velocity (angular velocity) $\Phi_{e\text{-}v}$ is a graph that repeats the following range periodically.

$\Phi_{e\text{-}v}$=−5.5 deg is to +5.5 deg/s

The eye movement velocity (angular velocity) during running, which equals to $\Phi_{e\text{-}v}$=−5.5 deg's to +5.5 deg/s, exceeds the angular velocity, which equals to 2 to 4 deg/s, at which the visibility deterioration described above occurs, and it is determined that the visibility deterioration occurs at this level.

The correspondence relationship between the eye movement velocity and the visibility deterioration level is described with reference to FIG. 10 and subsequent figures. The portion (a) of FIG. 10 illustrates the assessment of size of characters displayed on a 24-inch virtual image monitor at a distance of three meters. The display information shown in the portion (a) of FIG. 10 corresponds to information obtained when the user who views the display device 30 provided with the lens 32 described above with reference to FIG. 3 observes the information displayed on the display unit 31 at the virtual observation position 35.

The display information shown in the portion (a) of FIG. 10 indicates nine different sizes of characters A, B, and C, and Landolt ring [C] from "(1) vertical width of 88 mm" to "(9) vertical width of 5.2 mm". Moreover, "(1) vertical width of 88 mm" indicates a character or Landolt ring having a vertical length of 88 mm.

The smallest character is a character ABC and Landolt ring C of "(9) vertical width of 5.2 mm". The characters ABC and Landolt ring C shown in "(9) vertical width of 5.2 mm" are symbols that are visible by people equivalent to visual acuity of 0.8. In other words, if you are in a static state where the body is not moving, it is based on the premise that people having visual acuity of 0.8 can see the characters ABC and Landolt ring C of "(9) vertical width of 5.2 mm".

A condition that visibility deteriorates depending on how much these characters shift is determined. In this case, the determination condition of visibility deterioration is when the image shifts by 10% from the height of a character (corresponding to the gap of the Landolt ring filled by 50%) as shown in the portion (b) of FIG. 10.

In one example, the determination that the character of "(1) vertical width of 88 mm" that is the largest character shown in the portion (a) of FIG. 10 fails to be recognized is made when a shift of 10% occurs for the height of the character of 88 mm, that is, when the character shift of 88 mm×0.1=8.8 mm occurs.

Furthermore, the determination that the character of "(3) vertical width of 44 mm" shown in the portion (a) of FIG. 10 fails to be recognized is made when a shift of 10% occurs for the height of the character of 44 mm, that is, when the character shift of 44 mm×0.1=4.48 mm occurs.

Moreover, the determination that the character of "(9) vertical width of 5.2 mm" that is the smallest character shown in the portion (a) of FIG. 10 fails to be recognized is made when a shift of 10% occurs for the height of the character of 5.2 mm, that is, when the character shift of 5.2 mm×0.1=0.52 mm occurs.

In this way, it is easy to recognize large characters even if the shift amount is large, but it is difficult for small characters to be recognized because the shift amount is small.

In one example, if the information shown in the portion (a) of FIG. 10 is continuously displayed on the display unit and the observer views the information displayed on the display unit during walking or running, the eye movement occurs as described above with reference to FIGS. 8 and 9. The eye movement causes an image in which the character is shifted to be recognized as shown in the portion (b) of FIG. 10.

However, if the information shown in the portion (a) of FIG. 10 is displayed on the display unit is displayed for a short time, that is, the pulse display rather than the continuous display (hold display) in one example, the observer can recognize only the shift amount corresponding to the eye movement in the time corresponding to the displayed period through the eyes. Thus, the pulse display is more likely to improve the recognition level.

Moreover, as described above with reference to FIGS. 8 and 9 or the like, the eye movement velocity is the velocity that is different depending on the exercise being performed such as during walking or running. Thus, the size of an identifiable character, that is, the size of a character that occurs visibility determination threshold (shift by 10% from the height of a character) described with reference to the portion (b) of FIG. 10, depending on the display time of the information displayed on the display unit and the type of exercises executed by the observer viewing the display unit.

FIG. 11 shows results obtained by analyzing the eye movement velocity, the shift amount of a character generated depending on the information display time, and the identifiable character size, in performing the following three exercises.

(1) Walking
(2) Low speed running that is slow running
(3) High speed running that is fast running The eye movement velocity was calculated according to the logic described with reference to FIGS. 7, 8, and 9, and was set to the following values.

(1) Eye movement velocity during walking=2 deg/s (2) Eye movement velocity at low speed running that is slow running=5 deg/s (3) Eye movement velocity at high speed running that is fast running=10 deg/s Furthermore, the display time of characters in the pulse display was set to 6 types of 1 ms, 2 ms, 3 ms, 5 ms, 10 ms, and 16 ms. Moreover, the display time of 16 ms corresponds to the continuous display (halt display).

The shift amount on the retina was calculated based on a value obtained by multiplying the eye movement velocity by the display time. In other words, the following calculation formula is established.

$$\text{Retinal shift amount} = \text{Eye movement velocity} \times \text{Display time}$$

Further, the "retinal shift amount" calculated by the above calculation formula is set as "shift amount" described with reference to the portion (b) of FIG. 10. The recognizable character size is a size that is ten times the shift amount is set as the recognizable character size, based on the criterion that the recognition is failed in a case where a display shift amount of 10% of the character size occurs.

The case of walking (eye movement velocity of 2 deg/s) will be described. In the case where the image is set to have display time that equals to 1 ms (corresponding to the pulse display), the shift amount equals to 0.1 mm. On the basis of this, the identifiable character size is calculated using the above-mentioned visibility deterioration condition (shift by 10% in character height, equivalent to filling of the gap of Landolt ring by 50%). The size (vertical size) of the character having the shift amount; 10%=0.1 mm is set to 1.00 mm. This is the size smaller than or equal to the size of the item "(9) vertical width of 5.2 mm" in the portion (a) of FIG. 10. In other words, in a case where the pulse display of display time that equals to 1 ms is set during walking, the characters of all sizes in items (1) to (9) in the portion (a) of FIG. 10 can be recognized.

On the other hand, in the case where the image is set to have display time that equals to 16 ms (corresponding to the hold display), the shift amount equals to 1.68 mm. This is compared with the above-mentioned visibility deterioration condition (shift by 10% in character height, equivalent to filling of the gap of Landolt ring by 50%). The size (vertical size) of the character having the shift amount: 10%=1.68 mm is set to 16.8 mm. This is located between "(6) vertical width of 18.0 mm" to "(7) vertical width of 14.0 mm" in the portion (a) of FIG. 10.

In other words, in a case where the pulse display of display time that equals to 16 ms (corresponding to the hold display) is set during walking, characters of items having sizes larger than or equal to the size of the item (6) can be recognized in the portion (a) of FIG. 10. However, the characters of items having sizes less than or equal to the size of the item (7) fail to be recognized.

The longest display time necessary to recognize visually a character of the item (9) of 5.2 mm in the portion (a) of FIG. 10 during walking (eye movement velocity of 2 deg/s) can be determined to be an entry indicating the recognizable character of 5.2 mm, that is, the display time equals to 5 ms, from the data shown in FIG. 11. In other words, by performing the pulse display having the ON output period is set to a time of 5 ms or less during walking (eye movement velocity of 2 deg/s), the characters of all sizes in items (1) to (9) in the portion (a) of FIG. 10 can be recognized.

Moreover, the dotted line frame shown in FIG. 11 is a frame indicating an entry corresponding to the longest display time at which all characters of the items "(1) 88 mm" to "(9) 5.2 mm" in the portion (a) of FIG. 10 are recognizable.

The case of low speed running (eye movement velocity of 5 deg/s) will be described. In the case where the image is set to have display time that equals to 1 ms (corresponding to the pulse display), the shift amount equals to 0.21 mm. The identifiable character size is calculated using the above-mentioned visibility deterioration condition (shift by 10% in character, equivalent to filling of the gap of Landolt ring by 50%). The size (vertical size) of the character having the shift amount: 10%=1.21 mm is set to 2.10 mm. This is sizes less than or equal to the size of the item "(9) vertical width of 5.2 mm" in the portion (a) of FIG. 10. In other words, in the case where the pulse display of the display time that equals to 1 ms is set during the low speed running, the characters of all sizes in items (1) to (9) in the portion (a) of FIG. 10 can be recognized.

On the other hand, in a case where the image is set to have display time that equals to 5 ms (corresponding to the pulse display), the shift amount equals to 0.63 mm. This is compared with the above-mentioned visibility deterioration condition (shift by 10% in character height, equivalent to filling of gap of Landolt ring by 50%). The size (vertical size) of the character having the shift amount: 10%=0.63 mm is set to 6.30 mm. This is located between "(8) vertical width of 10.0 mm" and "(9) vertical width of 5.2 mm" in the portion (a) of FIG. 10.

In other words, if the display time is set to 5 ms (corresponding to the pulse display) during low speed running, the characters of sizes larger than or equal to the size of the item (8) in the portion (a) of FIG. 10. However, the characters of sizes smaller than or equal to the size of the item (9) in the portion (a) of FIG. 10 fail to be recognized.

The longest display time necessary to recognize visually a character of the item (9) of 5.2 mm in the portion (a) of FIG. 10 during low speed running (eye movement velocity of 5 deg/s) can be determined to be an entry indicating that the recognizable character size is smaller than or equal to 5.2 mm, that is, the display time equals to 2 ms, from the data shown in FIG. 11. In other words, by performing the pulse display having the ON output period is set to a time of 2 ms or less during low speed running (eye movement velocity of 5 deg/s), the characters of all sizes in items (1) to (9) in the portion (a) of FIG. 10 can be recognized.

The case of high speed running (eye movement velocity of 10 deg/s) will be described. In the case where the image is set to have display time that equals to 1 ms (corresponding to the pulse display), the shift amount equals to 0.521 mm. The identifiable character size is calculated using the above-mentioned visibility deterioration condition (shift by 10% in character, equivalent to filling of the gap of Landolt ring by 50%). The size (vertical size) of the character having the shift amount: 10%=0.52 mm is set to 5.20 mm. This is equivalent to the size of the item "(9) vertical width of 5.2 mm" in the portion (a) of FIG. 10. In other words, in the case where the pulse display of the display time that equals to 1 ms is set during the high speed running, the characters of all sizes in items (1) to (9) in the portion (a) of FIG. 10 can be recognized.

On the other hand, in the case where the image is set to have display time that equals to 2 ms (corresponding to the hold display), the shift amount equals to 1.05 mm. This is compared with the above-mentioned visibility deterioration condition (shift by 10% in character height, equivalent to filling of the gap of Landolt ring by 50%). The size (vertical size) of the character having the shift amount: 10% 1.05 mm is set to 10.50 mm. This is located between "(7) vertical width of 14.0 mm" and "(8) vertical width of 10.0 mm" in the portion (a) of FIG. 10.

In other words, in a case where the pulse display of display time that equals to 2 ms (corresponding to the hold display) is set during high speed running, characters of items having sizes larger than or equal to the size of the item (7) can be recognized in the portion (a) of FIG. 10. However, the characters of items having sizes less than or equal to the size of the item (8) fail to be recognized.

The longest display time necessary to recognize visually a character of the item (9) of 5.2 mm in the portion (a) of FIG. 10 during high speed running (eye movement velocity of 1.0 deg/s) can be determined to be an entry indicating that the recognizable character size is smaller than or equal to 5.2 mm, that is, the display time equals to 1 ms, from the data shown in FIG. 11. In other words, by performing the pulse display having the ON output period is set to a time of 1 ms or less during high speed running (eye movement velocity of 10 deg/s), the characters of all sizes in items (1) to (9) in the portion (a) of FIG. 10 can be recognized.

FIG. 12 is a diagram summarizing two analysis results obtained from the results shown in FIG. 11. FIG. 12 shows the results of analyzing the following two analysis results for each of (a) walking, (b) low speed running, and (c) high speed running.

(Analysis Result 1) In the characters shown in the portion (a) of FIG. 10, the recognizable character size in the continuous display (hold display of 16 ms) and the unrecognizable character size (Analysis result 2) Display time of the pulse display capable of recognizing the character having a minimum character vertical width of 5.2 mm shown in the portion (a) of FIG. 10

The (Analysis Result 1) shows the recognizable character size and unrecognizable character size in performing the continuous display (hold display of 16 ms) for each of (a) walking, (b) low speed running, and (c) high speed running. As shown in the figure, the following analysis results were obtained.

(a) Walking (eye movement velocity=2 deg/s)
Recognizable: (1) vertical width of 88 mm to (6) vertical width of 18.0 mm in the portion (a) of FIG. 10
Unrecognizable: (7) vertical width of 14.0 mm to (9) vertical width of 5.2 mm in the portion (a) of FIG. 10

(b) Low speed running (eye movement velocity=5 deg's)
Recognizable: (1) vertical width of 88 mm-(3) vertical width of 44.0 min in the portion (a) of FIG. 10
Unrecognizable: (4) vertical width of 33.6 mm to (9) vertical width of 5.2 mm in the portion (a) of FIG. 10

(c) High speed running (eye movement velocity=10 deg/s)
Recognizable: only (1) vertical width of 88 mm in the portion (a) of FIG. 10
Unrecognizable: (2) vertical width of 67.2 mm to (9) vertical width of 5.2 mm in the portion (a) of FIG. 10

As can be understood from the above results, as the movement becomes intense, the recognizable character size in the hold display becomes gradually increased.

Furthermore, the (Analysis result 2) shows the display time of the pulse display that can recognize the character having a minimum character vertical width of 5.2 mm shown in the portion (a) of FIG. 10 for each of (a) walking, (b) low speed running, and (c) high speed running. As shown in the figure, the following analysis results were obtained.

(a) Walking (eye movement velocity=2 deg/s)
Pulse display with display time of 5 ms or shorter (b) Low speed running (eye movement velocity=5 deg/s)
Pulse display with display time of 2 ms or shorter
(c) High speed running (eye movement velocity 10 deg/s)
Pulse display with display time of 1 ms or shorter As can be understood from the above results, it is necessary to set the display time in the pulse display to 5 mms or less at the time of walking and to set the display time in the pulse display to be shorter as the exercise becomes intense.

By setting the pulse display time to 1 ms to 5 ms, the visibility of all characters of "(1) vertical width of 88 mm" to "(9) vertical width of 5.2 mm" shown in the portion (a) of FIG. 10 can be secured during either exercise of (a) walking, (b) low speed running, and (c) high speed running. As understood from the analysis results shown in FIGS. 11 and 12, it was found that a display device capable of clearly recognizing contents being displayed during exercise can be implemented by controlling "display character (symbol) size and pulse display time" depending on exercise intensity.

[7. Configuration for Executing Control depending on Movement of User]

From the above analysis results, considering only the point that display information of a human-wearable or portable display device such as a head-mounted display and the like can be clearly recognized during exercise, it can be said that it is possible to solve by setting the pulse display in which the display time is set to be short and a non-display time is set to be longer than or equal to the afterimage time.

However, in one example, it is assumed that the pulse display when stopping is unnoticeable and the visibility may be bad and uncomfortable compared to the normal display (hold display). In consideration of such circumstances, it is considered preferable to control (optimum adjustment) display contents (e.g. characters and images) and other parameter values depending on the user's activity state or action state (e.g. walking, running, and bicycling) and the external light environment (e.g. morning, daytime, night, and region).

An embodiment for implementing improvement in comfort in performing display information recognition processing by executing display control according to situations as described above will be described. The embodiments described below are illustrative embodiments of a display device that can be comfortably used in various usage environments and states by controlling the mode, timing, contents, luminance of display according to the movement or action state.

FIG. 13 is a diagram illustrated to describe an example of display control depending on various exercise states of a user who wears or carries a human-wearable or portable display device such as a head-mounted display. In FIG. 13, the following five exercise situations are set as the user's exercise situation.

(1) Stationary (STAY)
(2) Walking (WALK)
(3) Low speed running (JOG)
(4) High speed running (RUN)
(5) Bicycling (BIKE)

In FIG. 13, the following pieces of information corresponding to these five exercise situation items are shown.

(a) Exercise vibration cycle (sec)
(b) Head movement width (mm)
(c) Eye velocity (deg/s)
(d) Optimum display mode
(e) Optimum display time
(f) Information depth The movement cycle of the item (a) basically corresponds to the period of movement of a body part including the head or the like wearing a display device such as a head-mounted display. In the movement cycle, the case of stationary is infinite (∞), the case of walking is 0.5 seconds, the case of low speed running is 0.3 seconds, and the case of high speed running is 0.2 seconds. These cycles correspond to a cycle of one step in performing walking and running. In the case of bicycling, it varies depending on the velocity and the road surface condition, and periodic data could not be obtained.

The head movement width of the item (b) corresponds to the head movement width of each cycle of the item (a). In the head movement width, the case of stationary is 0 mm, the case of walking is 50 mm, the case of low speed running is 100 mm, and the case of high speed running is 100 mm or more. In the case of bicycling, it varies depending on the velocity and road surface condition.

The eye velocity of the item (c) is the eye angular velocity (deg/s) data based on the theory described above with reference to FIG. 7 and the like. In the eye velocity, the case of stationary is 0 deg/s, the case of walking is 2.0 deg/s, the case of low speed running is 5.0 deg/s, and the case of high speed running is 10 deg/s. In the case of bicycling, it varies depending on the velocity and road surface condition.

The optimum display mode of the item (d) is the setting information of an optimum display mode depending on the user exercise situation obtained based on the analysis results described above with reference to FIGS. 7 to 12. In other words, it is the setting information of the display mode in which the display information of the display unit can be recognized reasonably and without any discomfort. Specifically, it is the optimum display mode determined depending on the calculation result obtained by calculating the eye movement velocity based on the head movement state.

In the example shown in FIG. 13, in the case where the user state is stationary, walking, or low speed running, the hold (continuous) display is performed, and in the case where the user state is walking, low speed running, high speed running, or bicycling, the pulse display is performed. In the case of walking and low speed running, it means that either hold display or burrs display can be selected.

Moreover, in the case of stationary, walking, and low speed running, the hold (continuous) display is used, but in the case where the body movement in which the eye moves at high speed or shock is detected, display control to temporarily turn off (OFF) the display is executed.

Furthermore, in the case where the pulse display is performed in low speed running, high speed running, and bicycling, it is preferable to control the timing of display ON and OFF in the pulse display further depending on the exercise of the user.

Specifically, the following control is performed,
Pulse display in which the display period is set to the eye stabilization timing obtained from the exercise cycle result In a case where the action cycle is less than or equal to a preset threshold (e.g., 0.25 seconds), short-term pulse display in which turning on (ON) time is short is used. In a case where the action cycle is longer than the threshold, long-term pulse display in which turning on (ON) time is long is used.

Pulse display with fixed period for non-periodic exercise Such display control allows the user to recognize more stably the display information.

In the optimum display time of the item (d), in the case where the user state is stationary, walking, and low speed running, the hold (continuous) display is used. Thus, the display time is continuous, that is, infinite (∞). In the case of using the pulse display in walking, low speed running, high speed running, and bicycling, it is preferable to perform control depending on the activity situation and external illuminance. Specifically, it is preferable to perform the pulse display in which the turning on (ON) time is set to 2 to 10 ms and the turning off (OFF) time is set to 50 to 200 ms.

The information depth of the item (e) refers to a level of information displayed on the display unit. In one example, in the stationary state, a full display that displays detailed information including sentences, maps, detailed figures, or the like using a small character size is performed. In situations where movement such as walking and running is occurring, information display such as small character information is stopped and information of a level that is recognizable with a medium shift amount is displayed. An example thereof includes current location information, simple map, navigation information, and the like. Furthermore, in situations where the movement is intense, such as high speed running and bicycling, only information of a recognizable level is displayed even if the shift amount is large. More specifically, an example thereof includes simple instruction information, danger avoidance information, and the like.

Figure 14:
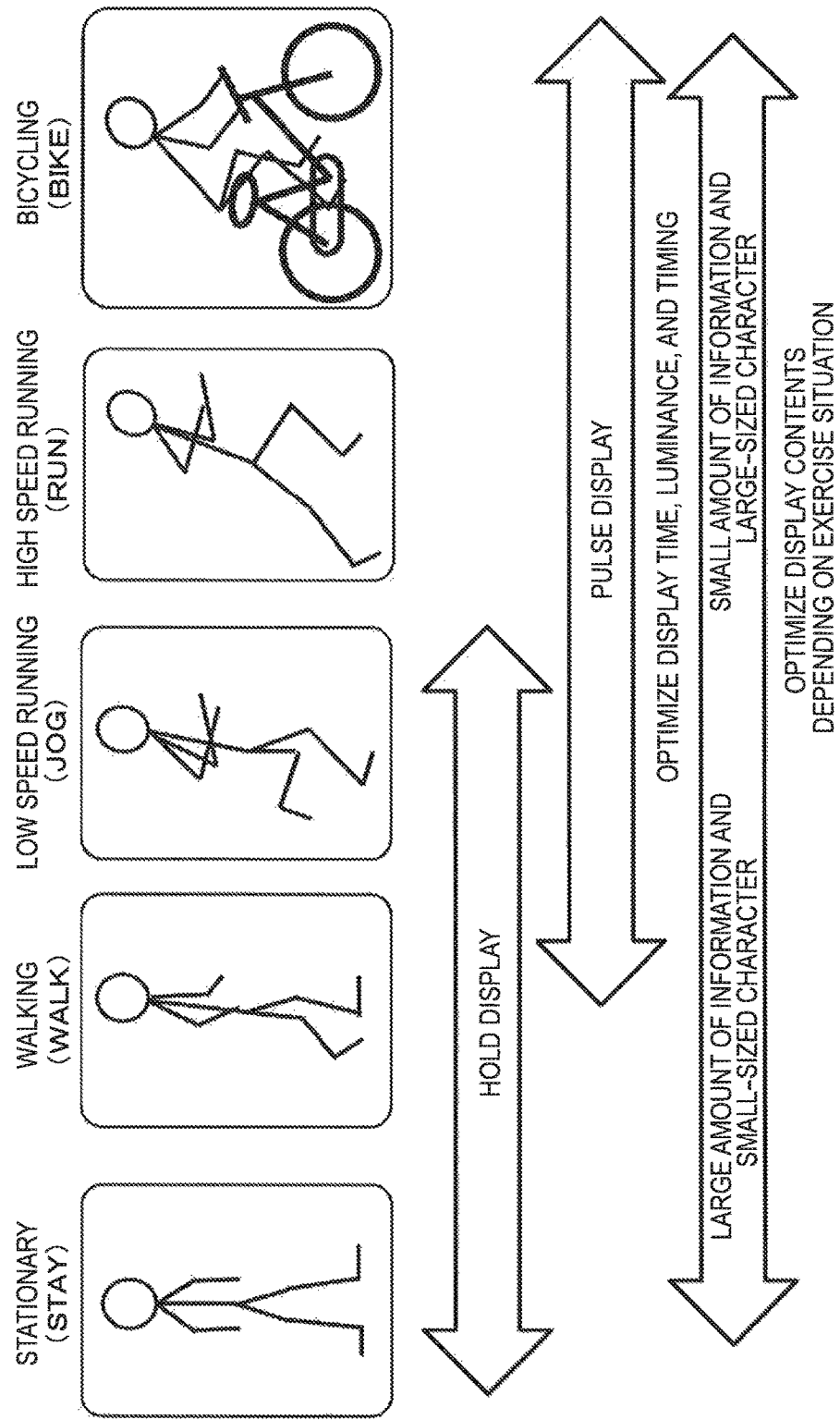
FIG. 14 is a diagram illustrated to describe an example of setting a display mode and display information in each user state.

FIG. 14 is a diagram summarizing setting examples of display mode and display information in the following user states.

(1) Stationary (STAY)
(2) Walking (WALK)
(3) Low speed running (JOG)
(4) High speed running (RUN)
(5) Bicycling (BIKE)

In the case of stationary, walking, and low speed running, the hold display is used. In the case of low speed running, high speed running, and bicycling, the pulse display is used. Moreover, in the case of walking and low speed running, either of the hold display or the pulse display may be set. Specifically, in one example, it is preferable to use a configuration in which switching control is performed depending on the eye movement velocity. In the case where the moving velocity is less than or equal to a preset threshold (e.g. 3.5 deg/s), the hold display is set. In the case where the velocity is higher than or equal to the threshold, the pulse display is set.

In the display information, the display processing is performed by increasing the information amount as the eye movement velocity such as stationary and walking is smaller and by constructing display information using a smaller character size. The display processing is performed by decreasing the information amount as the eye movement velocity such as high speed running and bicycling is larger and by constructing display information using a larger character size.

[8. Control of Display Timing in Pulse Display]

In the pulse display described with reference to FIG. 13, the pulse display in which the display period is set to the eye stabilization timing obtained from the exercise cycle results has been briefly described, but processing thereof will be described in detail.

As described above with reference to FIGS. 8 and 9, the eye generates movement depending on the exercise cycle of the user during walking or running. The eye movement velocity (angular velocity) in this case also varies at a predetermined cycle.

FIG. 15 is a graph showing the eye position (direction angle) and the eye movement velocity (angular velocity) during walking and running, described above with reference to FIGS. 8 and 9. The portion (A) of FIG. 15 is a graph showing the eye position (direction angle) and the eye movement velocity (angular velocity) during walking, which corresponds to the graph of the portion (A2) of FIG. 8. The portion (B) of FIG. 15 is a graph showing the eye position (direction angle) and the eye movement velocity (angular velocity) during running, which corresponds to the graph of the portion (B2) of FIG. 9.

In each of these graphs, the eye movement velocity (angular velocity) is shown as a solid line graph. In the eye movement velocity shown by this solid line, its velocity varies periodically, and a point indicating the velocity that equals to zero periodically appears. In one example, in the case of walking, points indicated by arrows (p), (q), and (r) shown in the portion (A) of FIG. 15 are points at which the movement velocity zero. Furthermore, in the case of running, the point indicated by the arrows (p), (q), (r), and (s) shown in the portion (B) of FIG. 15 is the point where the movement velocity=zero. At these timings, the user is in an eye still state in which the eye does not substantially move even while walking or running.

The control of the timing of these arrows as the ON (turning on) time in the pulse display makes it possible to observe the display information in a state where the user's eye does not substantially move, and thus the display information can be recognized stably.

Figure 16:
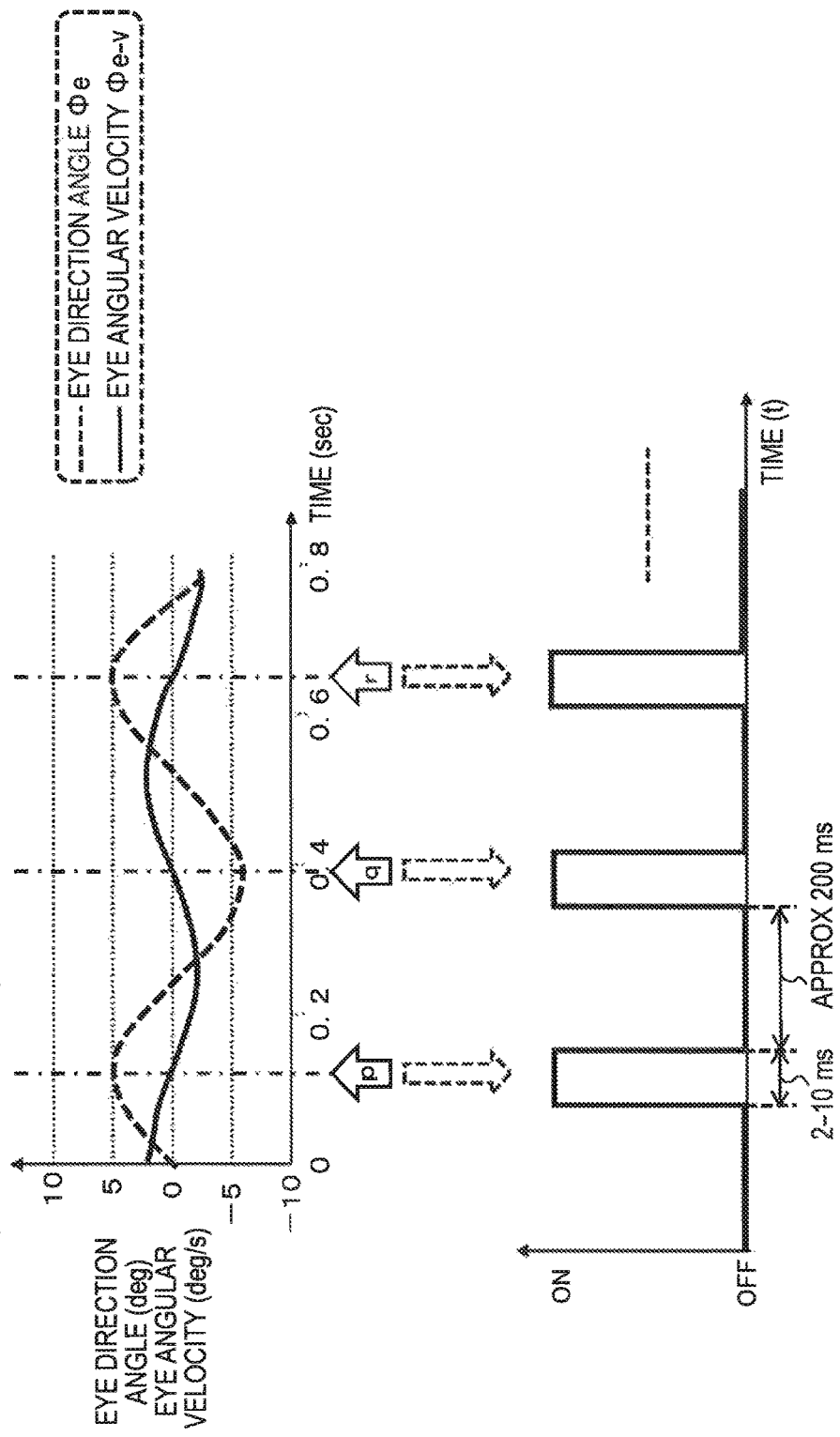
FIG. 16 is a diagram illustrated to describe an example of display control in the case of performing pulse display in which display on the display unit is turned on (ON) at the timing when the eye velocity becomes substantially zero during walking.

FIG. 16 shows a graph of the eye direction and the eye movement velocity during walking in the upper part. The lower part shows an example of display control in the case of performing the pulse display in which the display of the display unit is turned on (ON) at the timing when the eye velocity derived from this graph is substantially zero.

The graph shown in the lower part of FIG. 16 shows the pulse display in which the display is turned on (ON) at the timing when the eye velocity becomes substantially zero, that is, at each timing of p, q, and r, and the other timings are turned off (OFF) is performed. Moreover, the pulse display can be implemented by turning ON only at the timing when the eye velocity becomes substantially zero during walking by the pulse display in which the ON period is set to 2 to 10 ms and the OFF period is set to about 200 ms.

Figure 17:
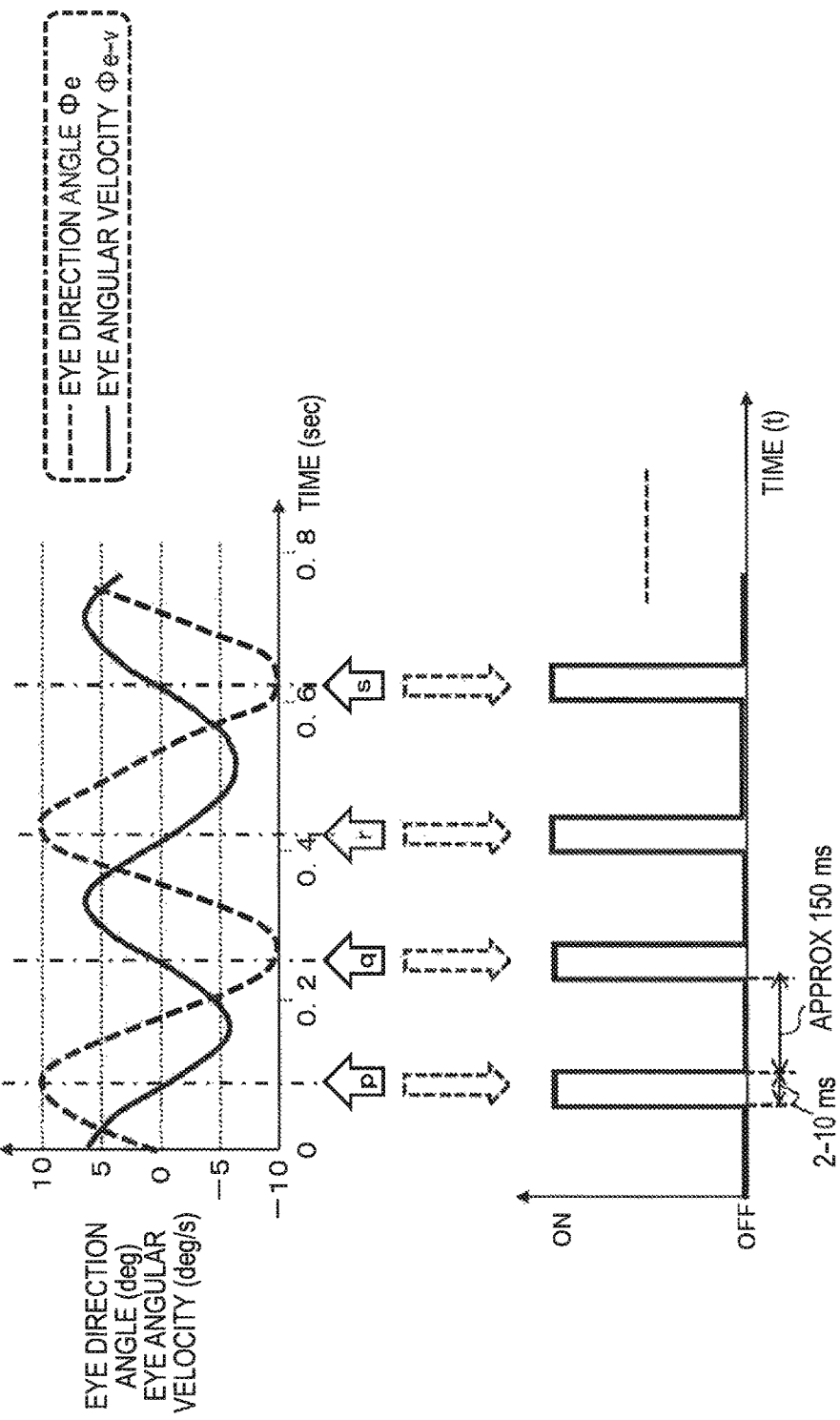
FIG. 17 is a diagram illustrated to describe an example of display control in the case of performing pulse display in which display on the display unit is turned on (ON) at the timing when the eye velocity becomes substantially zero during running.

FIG. 17 shows a graph of the eye direction and the eye movement velocity during running in the upper part. The lower part shows an example of display control in the case of performing the pulse display in which the display of the display unit is turned on (ON) at the timing when the eye velocity derived from this graph is substantially zero.

The graph shown in the lower part of FIG. 17 shows the pulse display in which the display is turned on (ON) at the timing when the eye velocity becomes substantially zero, that is, at each timing of p, q, r, and s, and the other timings are turned off (OFF) is performed. Moreover, the pulse display can be implemented by turning ON only at the timing when the eye velocity becomes substantially zero during running by the pulse display in which the ON period is set to 2 to 10 ms and the OFF period is set to approximately 150 ms.

[9. Control of Luminance of Display Unit]

Figure 18:
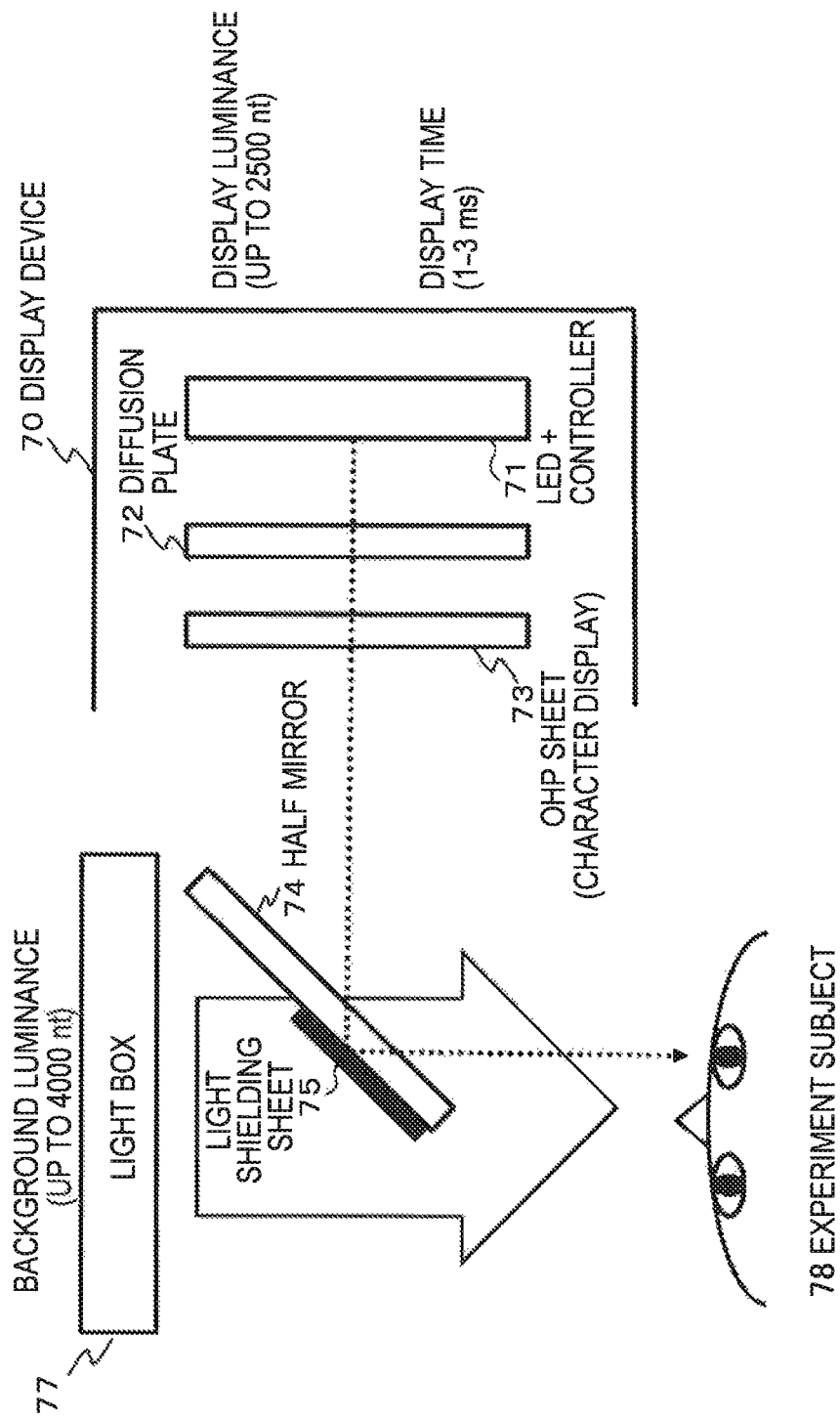
FIG. 18 is a diagram illustrated to describe experimental equipment for checking the light amount control in pulse display depending on the brightness of the background field of view.

The visibility in the case where the pulse display is performed varies depending on a value of the product of the display time and the luminance. This is because the human eye feels the brightness depending on the time-integrated light amount, and if the display time is short, its spectral quantity is necessary (Baroque law). It is also necessary to consider the use in bright outdoors. If the background field of view is bright, the pupil will shrink and accordingly the amount of light in the pulse display is necessary to be increased. There is no article on the relationship between the display time in milliseconds and the luminance, and thus experimental system was constructed and actually measured. FIG. 18 is a configuration diagram of the experimental system.

A light box 77 for photographic negative projection is arranged as a background luminance device. This light box 77 presents light equivalent to external light to the experiment subject (maximum 4000 nt). A display device 70 is arranged on the right side. The display device 70 is configured to include an LED 71 having a controller, a diffusion plate 72, and an OHP sheet 73. This display device 70 is a display monitor (maximum 2500 nt) assuming a virtual image screen of a head-mounted display.

The light emitted from the display device 70 is reflected by the half mirror 74 affixed with the central light shielding sheet 75 and is input to the eye of the experiment subject 78. The display character of the display device 70 is a white Landolt ring (C) made of the OHP sheet 73. This system allows a pseudo environment to observe the display information of the display unit of the head-mounted display while exposed to outdoor light to be created.

The display device 70 can optionally change the luminance and the display time. In the experiment, when the display time was reduced from 3 ms to 1 ms, the brightness at which the experiment subject 78 started to recognize the Landolt ring and the brightness at which the luminance and the Landolt ring was clearly visible were measured. There are four subjects. The graph shown in FIG. 19 is a graph showing the results.

Figure 19:
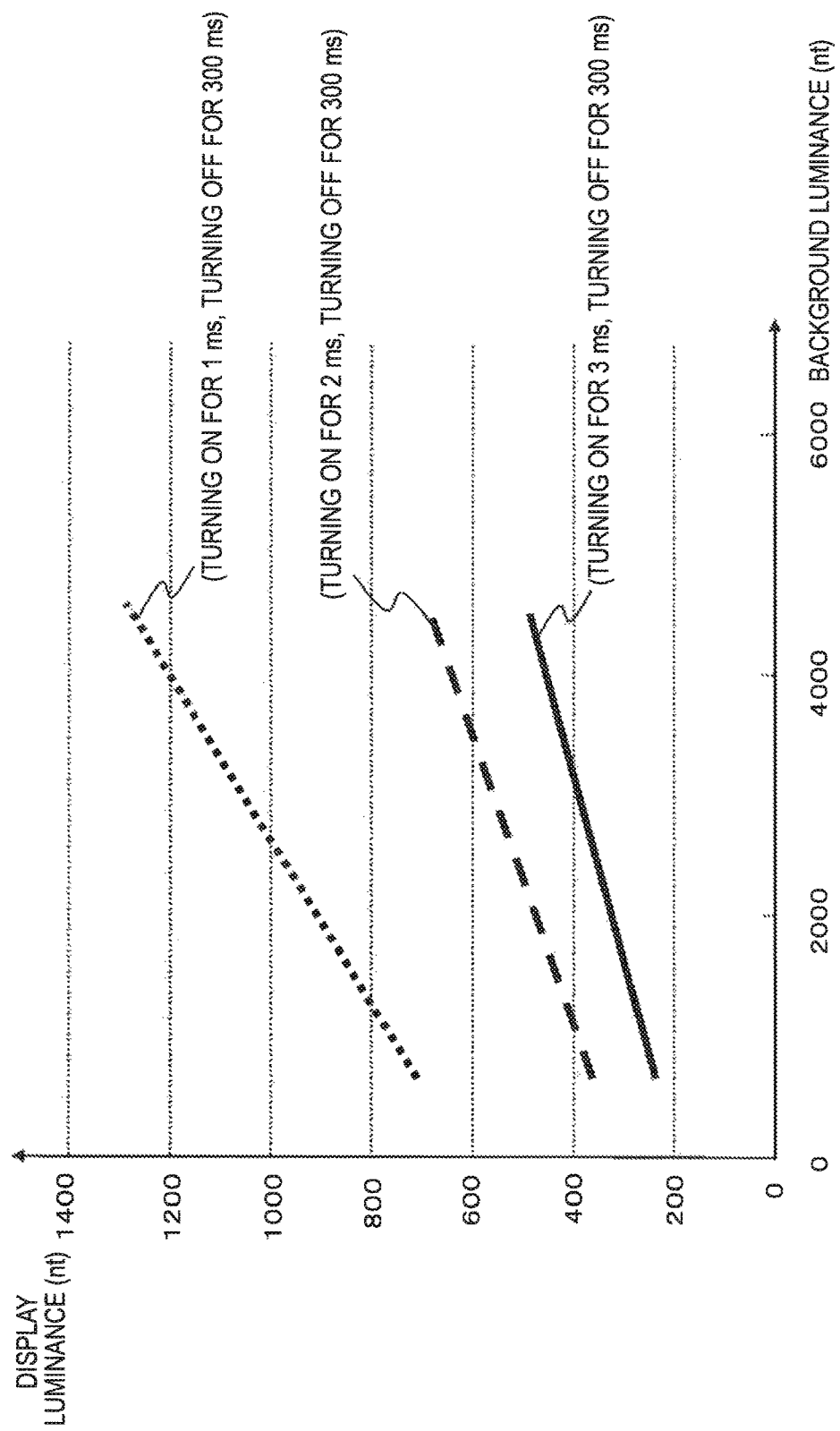
FIG. 19 is a diagram illustrated to describe results of an experiment using the experimental equipment shown in FIG. 18.

FIG. 19 shows experimental results of the pulse display of the following pattern.

(a) Display luminance in which display information was recognized in the pulse display in which turning on for 1 ms and turning off for 300 ms (b) Display luminance in which display information was recognized in the pulse display in which turning on for 2 ms and turning off for 300 ms (c) Display luminance in which display information was recognized in the pulse display in which turning on for 3 ms and turning off for 300 ms Each line shown in FIG. 19 shows the average value of four experiment subjects.

According to the result of this experiment, in one example, in a case where the background luminance is 4000 nt at the time of turning on for 3 ms, if the display luminance is 400 nt or more, the visual recognition can be achieved. Furthermore, in a case where the background luminance is 4000 nt at the time of turning on for 2 ms, when the display luminance is 700 nt or more at the time of turning on for 1 ms, the actual measurement has found that the display luminance was 1200 nt at the background luminance=4000 nt.

Subsequently, necessary brightness that is necessary to recognize visually the display information in the case where information is displayed on the display unit in a brighter environment based on the experiment result is calculated. The background luminance of 4000 nt actually measured by the system shown in FIG. 18 as described above is about brightness equivalent to clear sky or day in the spring, and a brighter environment is assumed at the time of actual use during sports.

Figure 20:
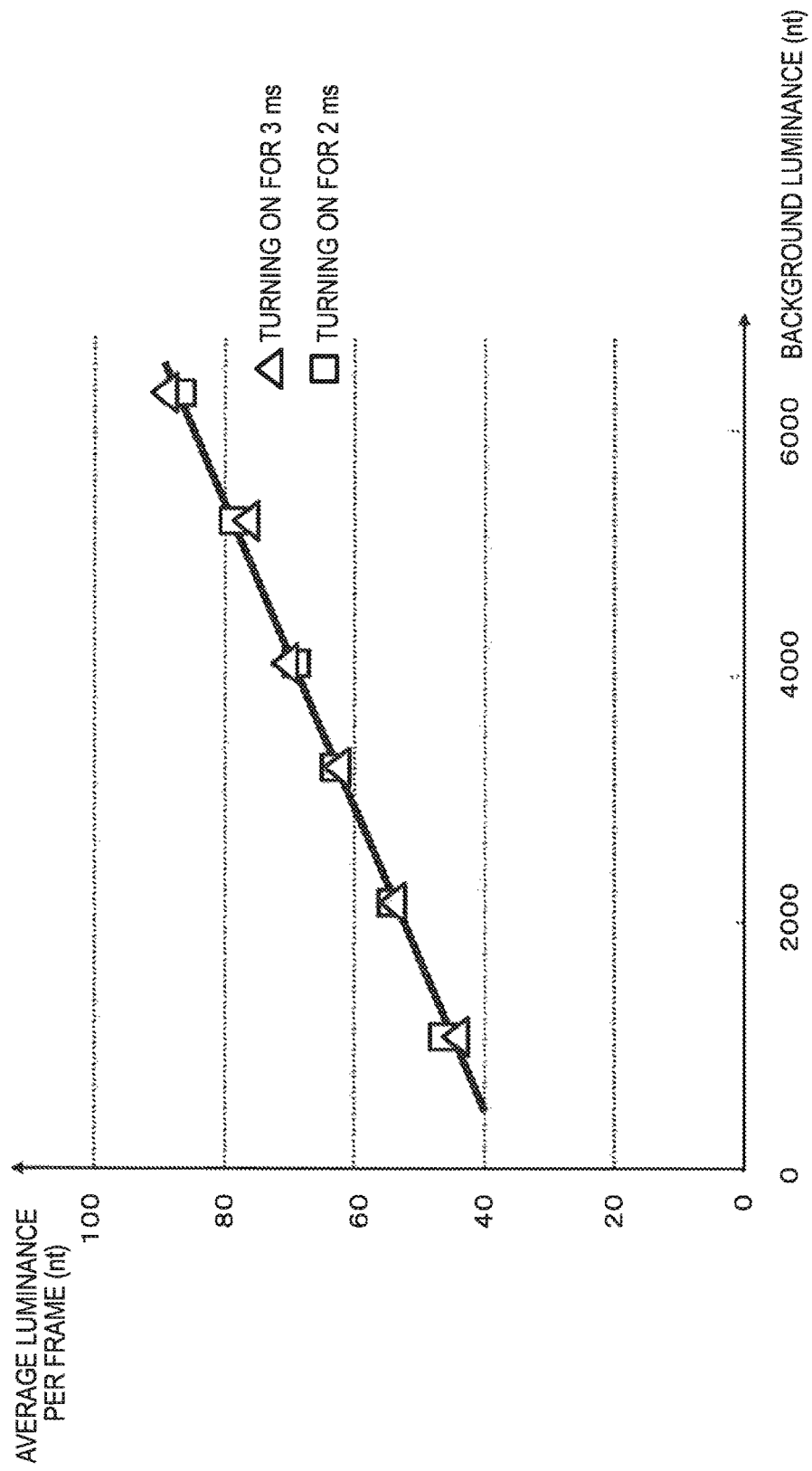
FIG. 20 is a diagram showing a graph obtained by converting actually measured display luminance into one frame average luminance (1 frame=16.67 ms) for necessary luminance under an environment exceeding 4000 nt.

FIG. 20 is a graph obtained by converting actually measured display luminance into average luminance per one frame (one frame=16.67 ms) upon the calculation of the necessary luminance under an environment exceeding 4000 nt. The horizontal axis represents the environmental brightness of the background environment corresponding to the outside world, and the vertical axis represents the average brightness per one frame of the frame used as display information of the display unit. From this graph, it is understood that the relationship between the display average luminance and the background luminance does not depend on the display time (2 or 3 ms).

Figure 21:
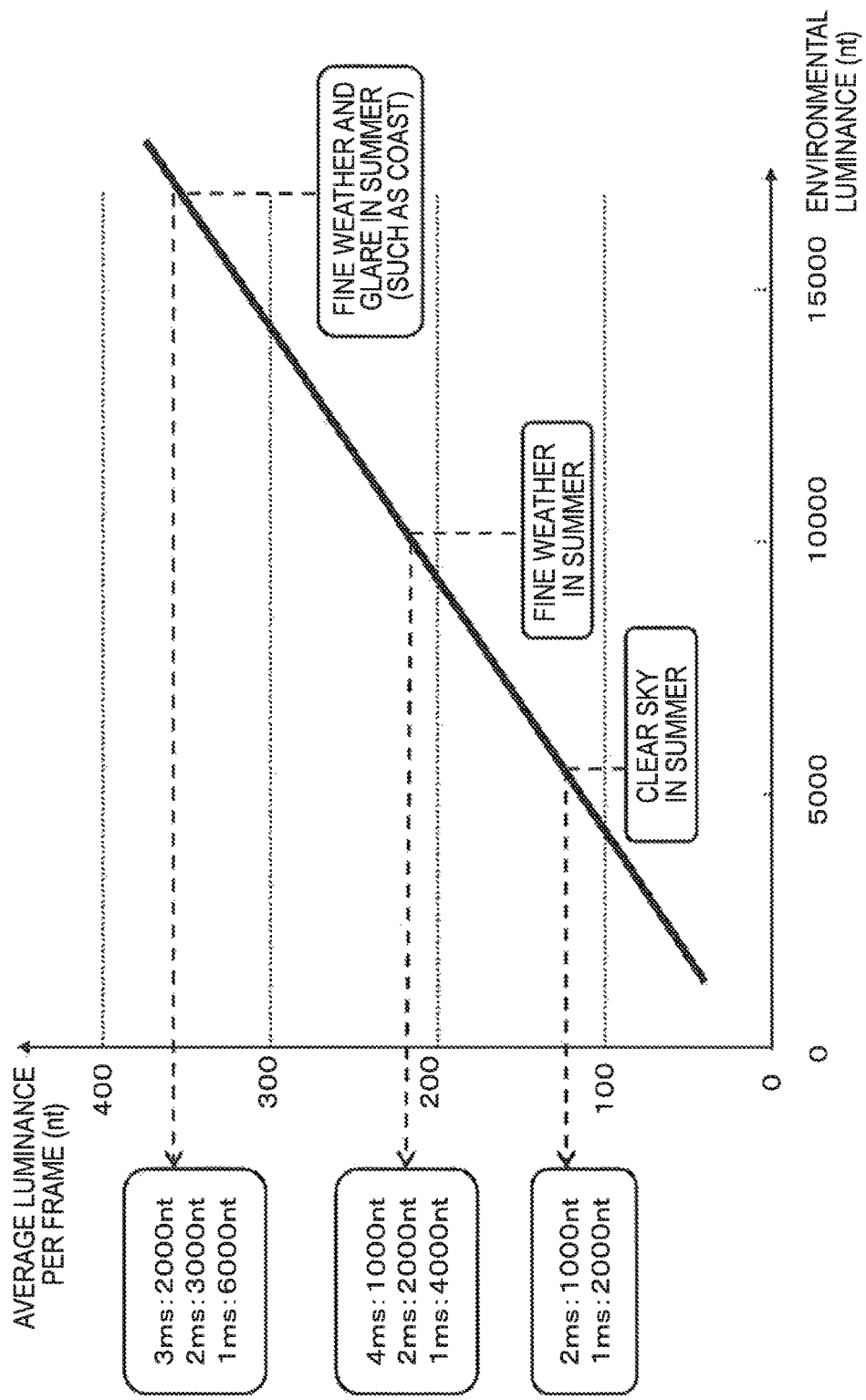
FIG. 21 is a diagram illustrating a graph shown to describe luminance of the display unit necessary for the environmental luminance by setting the environmental luminance of the external environment on the horizontal axis and one frame average luminance of the frame to be used as the display information of the display unit on the vertical axis.

FIG. 21 shows the results obtained by calculating data corresponding to the actual external environment based on the above results. In FIG. 21, the horizontal axis represents the environmental luminance of the external environment, and the vertical axis represents the average luminance per one frame of the frame used as the display information of the display unit. In one example, the environmental brightness of the external environment is about 6000 nt in the summer's fine weather, about 11000 nt in summer, and about 6000 nt in the summer's fine weather and reflective environment such as sea.

In one example, in the case of a typical environment (summer fine weather=11000 nt) as an exercise environment such as running, if each of the turning on (ON) time of the display unit performing the pulse display is set to 4 ms, 2 ms, and 1 ms, 4 ms pulse display=necessary luminance of 1000 nt,
2 ms pulse display=necessary luminance of 2000 nt,
1 ms pulse display=necessary luminance s of 4000 nt.

As described above, necessary luminance information necessary for information recognition in each of the pulse displays was obtained.

Furthermore, at the sunny reflection (=16000 nt) which is the extreme environment of the brightness, if each of the turning on (ON) time of the display unit performing the pulse display is set to 3 ms, 2 ms, and 1 ms, 3 ms pulse display=necessary luminance of 2000 nt,
2 ms pulse display=necessary luminance of 3000 nt,
1 ms pulse display=necessary luminance of 6000 nt.

As described above, necessary luminance information necessary for information recognition in each of the pulse displays was obtained.

[10. Processing Procedure of Display Control]

Next, a display control processing procedure executed by the control device of the present disclosure will be described with reference to flowcharts shown in FIG. 22 and subsequent figures. Moreover, the processing to be described with reference to the flowcharts shown in FIG. 22 and subsequent figures is executed, in one example, according to a program stored in a memory of a control device under the control of a data processing unit (controller) including a CPU or the like having a program execution function.

(10-1. Basic Procedure of Switching Control between Hold Display and Pulse Display)

Figure 22:
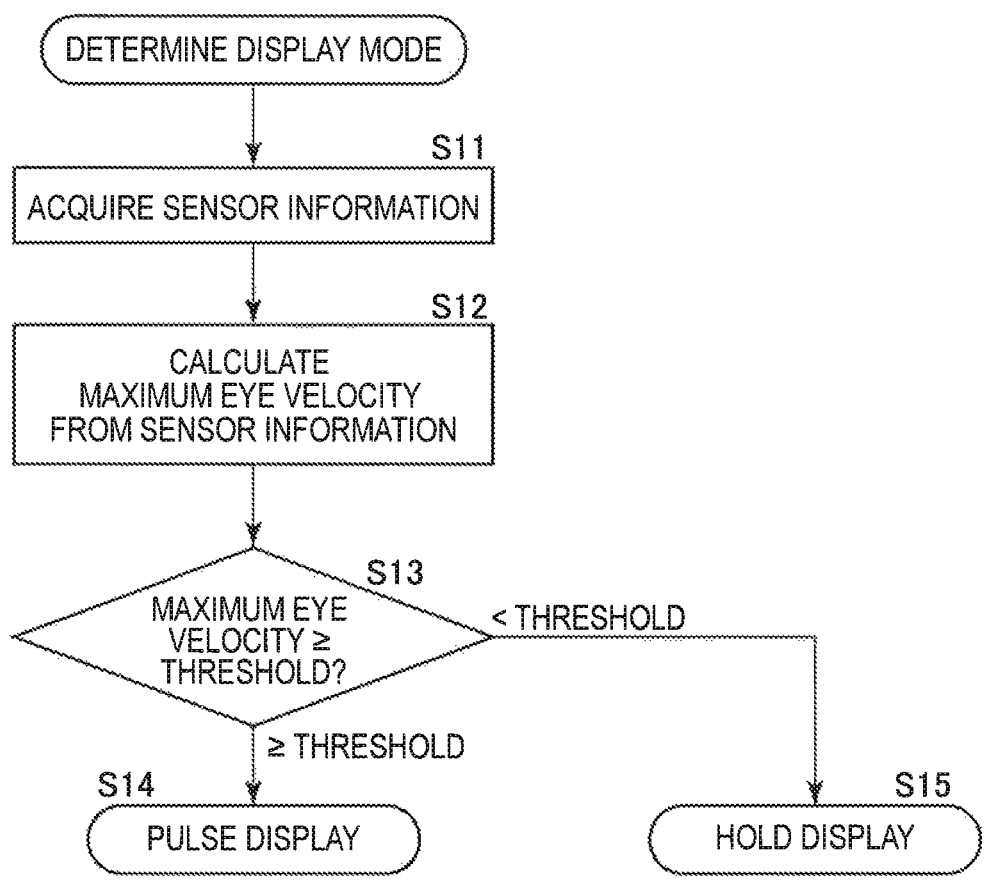
FIG. 22 is a diagram illustrating a flowchart for describing a basic procedure of switching control between hold display and pulse display.

The flowchart shown in FIG. 22 is a flowchart for describing a basic display control procedure in the case where alternative processing is performed by setting the display on the display device to the hold (continuous) display or to the pulse display for repeating turning on (ON)/turning off (OFF). The processing of each step will be described.

(Step S11)

In step S11, sensor information associated with a display device such as a head-mounted display is acquired. The display device is provided with various sensors such as a sensor for detecting the movement of the user. A controller acquires these pieces of sensor information. In step S11, specifically, sensor information such as an accelerometer is acquired, in one example.

(Step S12)

Next, in step S12, the controller determines the movement of the user based on the acquired sensor information, and calculates the maximum eye movement velocity based on the determined user's movement. The eye velocity calculation processing is executed as the calculation processing in accordance with the theory described above with reference to FIGS. 7 to 9, in one example.

(Step S13)

Next, in step S13, it is determined whether the maximum eye velocity calculated in step S12 is greater than or equal to a predefined threshold or less than the threshold. The threshold is, in one example, an eye velocity of 2 deg/s, and the determination formula is as follows.

$$\text{Maximum eye velocity} \geq 2 \text{ deg/sec}$$

In the case where the above determination formula is satisfied, that is, if it is determined that the maximum eye velocity calculated in step S12 is larger than or equal to the predefined threshold, the processing proceeds to step S14. In the case where the above determination formula is not satisfied, that is, if it is determined that the maximum eye velocity calculated in step S12 is less than the predefined threshold, the processing proceeds to step S15. The above-described threshold is an example, and various thresholds can be set.

(Step S14)

In the case where the above determination formula is satisfied, that is, if it is determined that the maximum eye velocity calculated in step S12 is larger than or equal to the predefined threshold, the processing proceeds to step S14. Then, the display on the display unit is set to the pulse display and the display processing is executed. It is preferable that the turning on (ON) time in the pulse display is set to 2 to 10 msec and the turning off (OFF) time is set to 50 to 200 msec.

(Step S15)

In the case where the determination formula is not satisfied, that is, if it is determined that the maximum eye velocity calculated in step S12 is less than the predefined threshold, the processing proceeds to step S15. Then, the display on the display unit is set to the hold (continuous) display and the display processing is executed.

Moreover, the processing according to the procedure shown in FIG. 22 is executed repeatedly in a period manner. Thus, the hold display and the pulse display are switched appropriately depending on the change in the user's exercise situation. However, if this switching is frequently performed, there is a concern that visibility may be likely to deteriorate. Thus, appropriate hysteresis is given to the switching between the burrs display and the hold display to prevent modes from being switched frequently.

Moreover, the above description, the eye movement velocity is calculated using the movement of the user based on the theory described above with reference to FIGS. 7 to 9. However, the eye velocity may be calculated by the processing using a sensor for measuring the movement by directly monitoring the eye's movement.

Moreover, in the case of calculating the eye movement velocity from a measurement value obtained by the sensor attached to the head for detecting the movement of the user, in one example, the processing according to the following formulas can be applied.

$$\text{Target viewpoint(e.g., 3.0 m)} = L[m]$$

$$\text{Constant} = a (\text{where } 0 < a < 0.3), \text{ in the following example, } a = 0.21$$

$$\text{Head position (height change amount) } Ph] \text{ m}]$$

The eye movement velocity: Ve [deg/sec] is obtained by the following formula.

$$V_e = d(\arctan(Ph/L) - \arctan(Ph/aL))/dt$$

(10-2. Exercise Situation Determination Processing Procedure)

Figure 23:
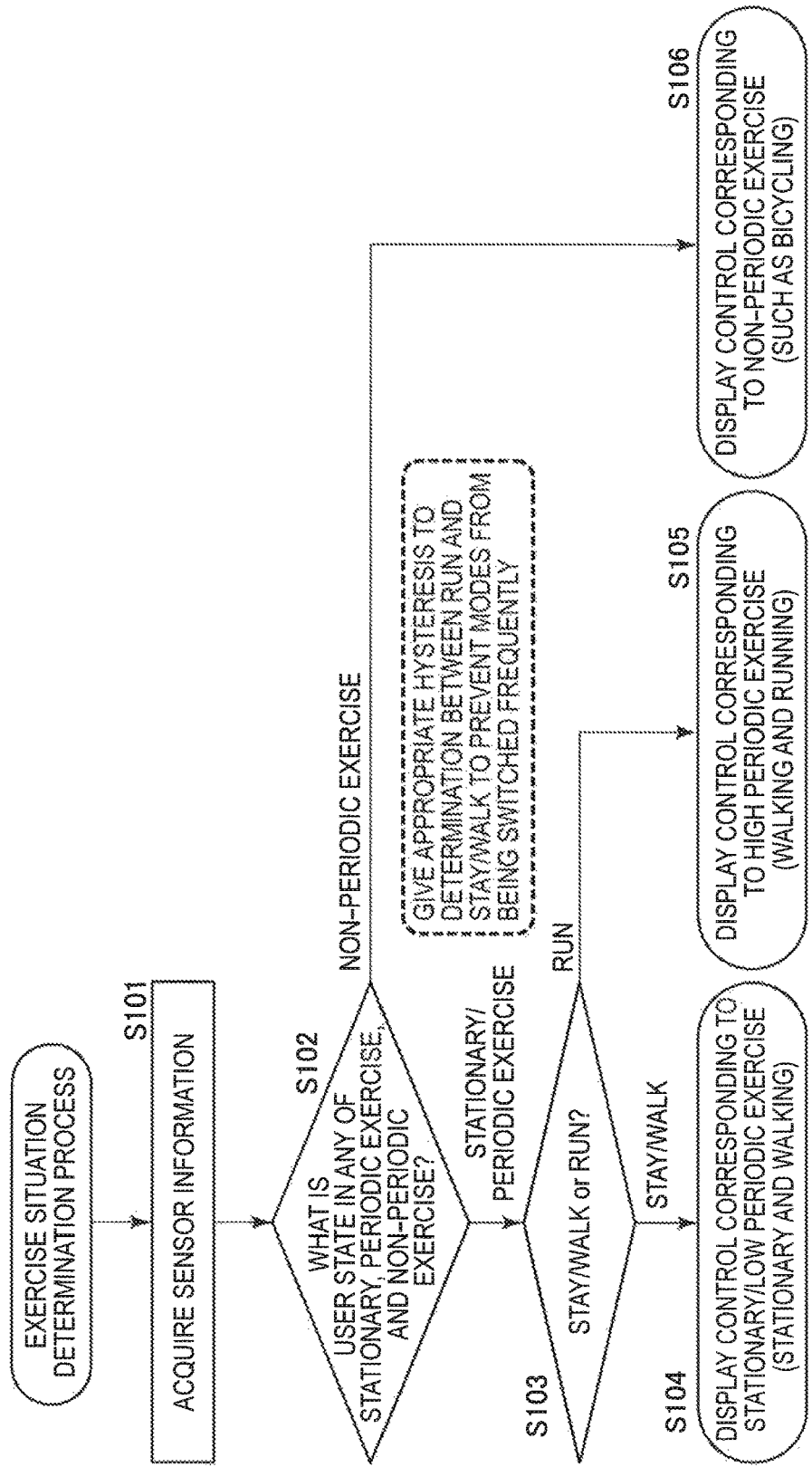
FIG. 23 is a diagram illustrating a flowchart for describing an exercise situation determination processing procedure.

Next, with reference to the flowchart shown in FIG. 23, a processing procedure for determining the exercise situation of the user wearing a display device such as a head-mounted display will be described. The processing of each step will be described.

(Step S101)

In step S101, sensor information associated with a display device such as a head-mounted display is acquired. The display device is provided with various sensors such as a sensor for detecting the movement of the user, and a controller acquires these pieces of sensor information. In step S101, specifically, sensor information such as an accelerometer is acquired, in one example.

(Step S102)

The controller determines whether the user is stationary, performs a periodic exercise that repeats a fixed movement, or performs non-periodic exercise, based on the sensor information acquired in step S101. Moreover, the periodic exercise is, for example, an exercise including walking (walking) described with reference to FIG. 8 and running described with reference to FIG. 9. The non-periodic exercise is an exercise accompanied by a movement that is not constant, and an example thereof includes bicycling or the like.

If it is determined that the user is in a stationary state or in performing a periodic exercise, the processing proceeds to step S103. If it is determined that the user performs a non-periodic exercise that is not a periodic exercise, then the processing proceeds to step S106.

(Step S103)

If it is determined in step S102 that the user is in a stationary state or in performing a periodic exercise, the processing proceeds to step S103, and then it is determined whether the user is in a stationary or walking state or in a running (running) state. This determination is made based on the length of the exercise cycle. In other words, as described above with reference to FIG. 13, it is possible to make a determination based on the length of the exercise vibration period in the portion (1) of FIG. 13.

In step S103, if it is determined that the user is in a stationary or walking state, the processing proceeds to step S104. On the other hand, if it is determined in step S103 that the user is in a running (running) state, the processing proceeds to step S105.

(Step S104)

If it is determined in step S103 that the user is in a stationary or walking state, the processing proceeds to step S104, and in step S104, display control corresponding to stationary or low periodic exercise is executed. In other words, display control corresponding to the case where the user is in a stationary or walking state is executed. Moreover, this processing is a process corresponding to the hold display processing shown in the column (d) of FIG. 13.

(Step S105)

If it is determined in step S103 that the user is in the running (running) state, the processing proceeds to step S105, and the display control corresponding to the high periodic exercise is executed in step S105. In other words, the display control corresponding to the case where the user is walking, running (running), or the like is executed. Moreover, this processing is a process corresponding to the display control processing during execution of the periodic exercise excluding non-periodic exercise in performing bicycling or the like in the item (5) in the pulse display processing shown in the column (d) of FIG. 13.

(Step S106)

If it is determined in step S102 that the user is performing a non-periodic exercise, the processing proceeds to step S106, and in step S106, the display control corresponding to the non-periodic exercise state is executed. In other words, the display control corresponding to the case where the user is performing bicycling or the like is executed. Moreover, this processing is a process corresponding to the display control processing during execution of the non-periodic exercise in performing bicycling in the item (5) in the pulse display processing shown in the column (d) of FIG. 13.

(10-3. Display Control Procedure in Stationary or in Executing Low Periodic Exercise)

Next, with reference to a flowchart shown in FIG. 24, a display control processing procedure in a case where the user is performing a low periodic exercise such as stationary or walking will be described. In other words, this is the detailed procedure of the display control processing in step S104 shown in FIG. 23. The processing of each step will be described.

(Step S201)

In step S201, sensor information associated with a display device such as a head-mounted display is acquired. The display device is provided with a sensor for grasping the position of the user and the user's body condition (heartbeat and perspiration amount) in addition to the movement of the user, and is further provided with various sensors for measuring temperature, humidity, illuminance, or the like of the outside world. The controller acquires these pieces of sensor information.

(Step S202)

Next, in step S202, the controller constructs display information to be presented to the user based on the acquired sensor information. In one example, the display information composed of map information indicating the current position based on the information obtained from the position sensor, information indicating the physical condition of the user obtained from the sensor for grasping the user's body condition, information on the outside air temperature and the humidity is constructed.

(Step S203)

In step S203, a screen for combining the display information generated in step S202 and for outputting it to the display unit is built. The display screen is a halt display screen such as the continuous display. Furthermore, the display luminance is the luminance of the outside world obtained by the photometer, that is, the luminance determined according to the environmental luminance. Specifically, as described above with reference to FIGS. 19 to 21 and the like, the display information determined according to the environmental luminance is set to a luminance level that can be easily recognized.

(Step S204)

In step S204, the continuous (hold) display of the display screen built in step S203 is started.

Figure 24:
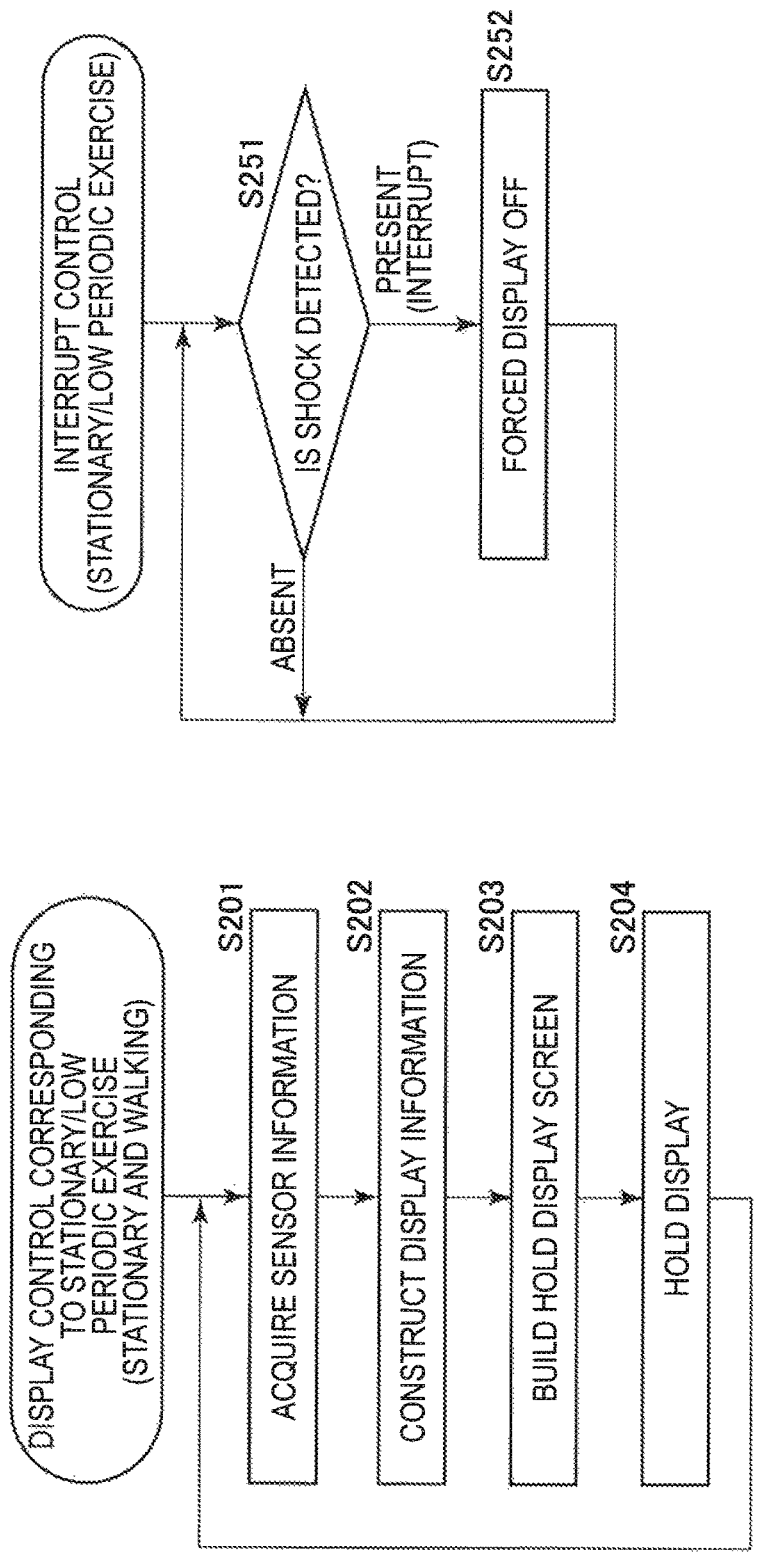
FIG. 24 is a diagram illustrating a flowchart for describing a display control procedure during stationary or in executing low periodic exercise.

The procedure shown on the right side of FIG. 24 is an interrupt control procedure executed while the processing of steps S201 to S204 on the left side is continued. This processing procedure will be described.

(Step S251)

Figure 25:
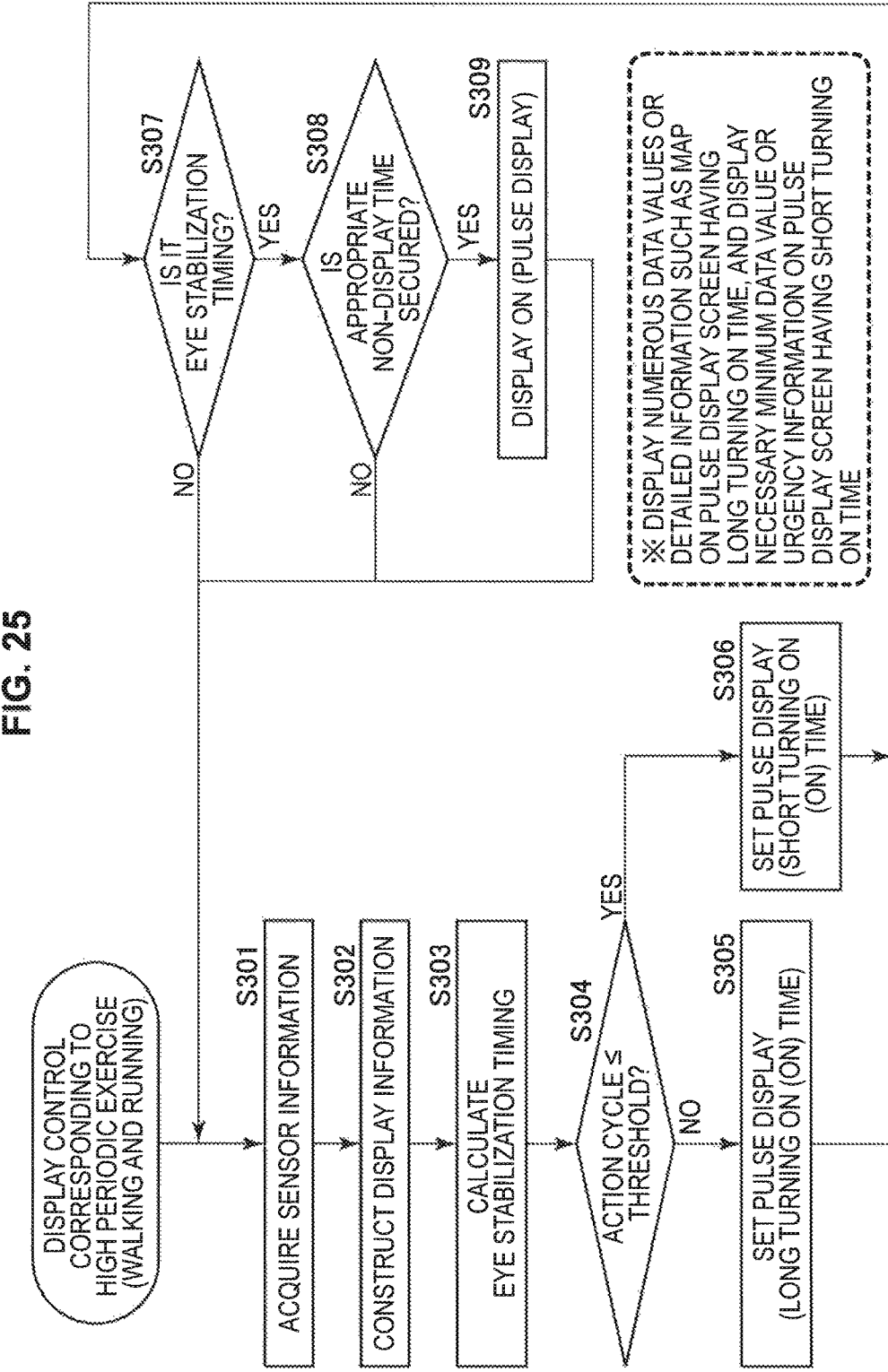
FIG. 25 is a diagram illustrating a flowchart for describing a display control procedure in executing high periodic exercise.

In step S251, the controller acquires sensor information associated with a display device such as a head-mounted display. In one example, the display device is provided with a sensor for detecting a sudden shock or the like, for example, an accelerometer. The controller determines the presence or absence of a shock such as an impact on the display device based on the output from the accelerometer. If it is determined that a shock is detected, the processing proceeds to step S252.
(Step S252)
If it is determined in step S251 that a shock is detected, the output of the display unit is stopped in step S252. Moreover, this processing corresponds to display off processing in detecting the shock during executing the hold display in the optimum display mode of the portion (d) of FIG. 13 described above with reference to FIG. 13.
(10-4. Display Control Procedure in Executing High Periodic Exercise)
Next, with reference to a flowchart shown in FIG. 25, a display control processing procedure in the case where the user is performing high periodic exercise such as running will be described. In other words, this is the detailed procedure of the display control processing in step S105 shown in FIG. 23. The processing of each step will be described.
(Step S301)
In step S301, sensor information associated with a display device such as a head-mounted display is acquired. As described above, the display device is provided with a sensor for grasping the position of the user and the user's body condition (heartbeat and perspiration amount) in addition to the movement of the user, and is further provided with various sensors for measuring temperature, humidity, illuminance, or the like of the outside world. The controller acquires these pieces of sensor information.
(Step S302)
Next, in step S302, the controller constructs display information to be presented to the user based on the acquired sensor information. In one example, the display information composed of map information indicating the current position based on the information obtained from the position sensor, information indicating the physical condition of the user obtained from the sensor for grasping the user's body condition, information on the outside air temperature and the humidity is constructed.
(Step S303)
In step S303, the eye stabilization timing is calculated. In other words, the timing at which the eye movement velocity becomes substantially zero as described with reference to FIGS. 16 and 17 is calculated. This timing can be calculated based on the eye movement cycle calculated from the exercise cycle of the user.
This timing information can be calculated by learning processing of user's exercise situation data. In step S303, in one example, correspondence data between the exercise cycle of the user and the eye stabilization timing is prepared, and data capable of instantaneously determining whether the current time is the eye stabilization timing is generated from the exercise situation of the user detected by the sensor.
(Step S304)
In step S304, it is determined whether the action cycle of the user is less than or equal to a predefined threshold. If it is less than or equal to the threshold, the processing proceeds to step S306. If it is lamer than the threshold, the processing proceeds to step S305. In this processing, in one example, in the case of performing intense exercise with short cycle such as high-speed running, the processing proceeds to step S306, the pulse display in which the turning on time for making the display ON is set to be shortened is executed. In the case where a moderate exercise with a relatively long cycle such as the low speed running is performed, the processing proceeds to step S305, which means that the pulse display in which the turning on time for making the display ON is to be lengthened is executed.
(Step S305)
The step S305 is a process in a case where it is determined in step S304 that the action cycle of the user is larger than the predefined threshold. In other words, the processing is performed when a moderate exercise with a relatively long cycle such as the low speed running is performed. In this case, in step S305, the pulse display in which the turning on time for making the display ON is to be lengthened is executed.
(Step S306)
The step S306 is a process in the case where it is determined in step S304 that the action cycle of the user is less than or equal to a predefined threshold. In other words, this is a process in the case of performing a long and intense exercise having a short period such as high speed running, and in this case, the pulse display in which the turning on time for making the display ON is to be shortened is executed in step S306.
(Step S307)
After completion of pulse display setting in step S305 or step S306, it is determined in step S307 whether the eye stabilization timing is set. In other words, it is determined sequentially whether the eye stabilization timing is set from the exercise information detected from the sensor, based on the correspondence relationship data between the user exercise situation and the eye stabilization timing calculated in step S303.
If it is determined that the current time is the eye stabilization timing, the processing also proceeds to step S308, otherwise the processing returns to step S301.
(Step S308)
In step S308, it is determined whether the turning off time (OFF) in the pulse display is within the range of a predetermined time. The appropriate time for the turning on (ON) and turning off (OFF) in the pulse display is as follows, as described above with reference to FIGS. 10 to 13.
Turning on (ON) time=2 to 10 ms
Turning off (OFF) time=50 to 200 ms
In step S308, it is determined whether the turning off (OFF) time is in the range of 50 to 200 ms. If yes, the processing proceeds to step S309, and if no, the processing returns to step S301.
(Step S309)
In step S309, the display information is outputted in the pulse display, that is, the display unit is turned on (ON) to output the display information. The turning on (ON) time is set to be the turning on (ON) time that is set in step S305 or S306. If the turning on time is elapsed, the processing returns to step S301.
(10-5. Display Control Procedure in Executing Non-Periodic Exercise)
Next, with reference to a flowchart shown in FIG. 26, a display control processing procedure in the case where the user is performing a non-periodic exercise such as bicycling will be described. In other words, this is the detailed procedure of the display control processing in step S106 shown in FIG. 23. The processing of each step will be described.
(Step S401)
In step S401, sensor information associated with a display device such as a head-mounted display is acquired. The display device is provided with a sensor for grasping the position of the user and the user's body condition (heartbeat and perspiration amount) in addition to the movement of the user, and is further provided with various sensors for measuring temperature, humidity, illuminance, or the like of the outside world. The controller acquires these pieces of sensor information.

(Step S402)

Next, in step S402, the controller constructs display information to be presented to the user based on the acquired sensor information. In one example, the display information composed of map information indicating the current position based on the information obtained from the position sensor, information indicating the physical condition of the user obtained from the sensor for grasping the user's body condition, information on the outside air temperature and the humidity is constructed.

(Step S403)

In step S403, a screen for combining the display information generated in step S402 and for outputting it to the display unit is built. The display screen is the pulse display screen. Furthermore, the display luminance is the luminance of the outside world obtained by the photometer, that is, the luminance determined according to the environmental luminance. Specifically, as described above with reference to FIGS. 19 to 21 and the like, the display information determined according to the environmental luminance is set to a luminance level that can be easily recognized.

(Step S404)

In step S404, the pulse display of the display screen built in step S403 is started.

Figure 26:
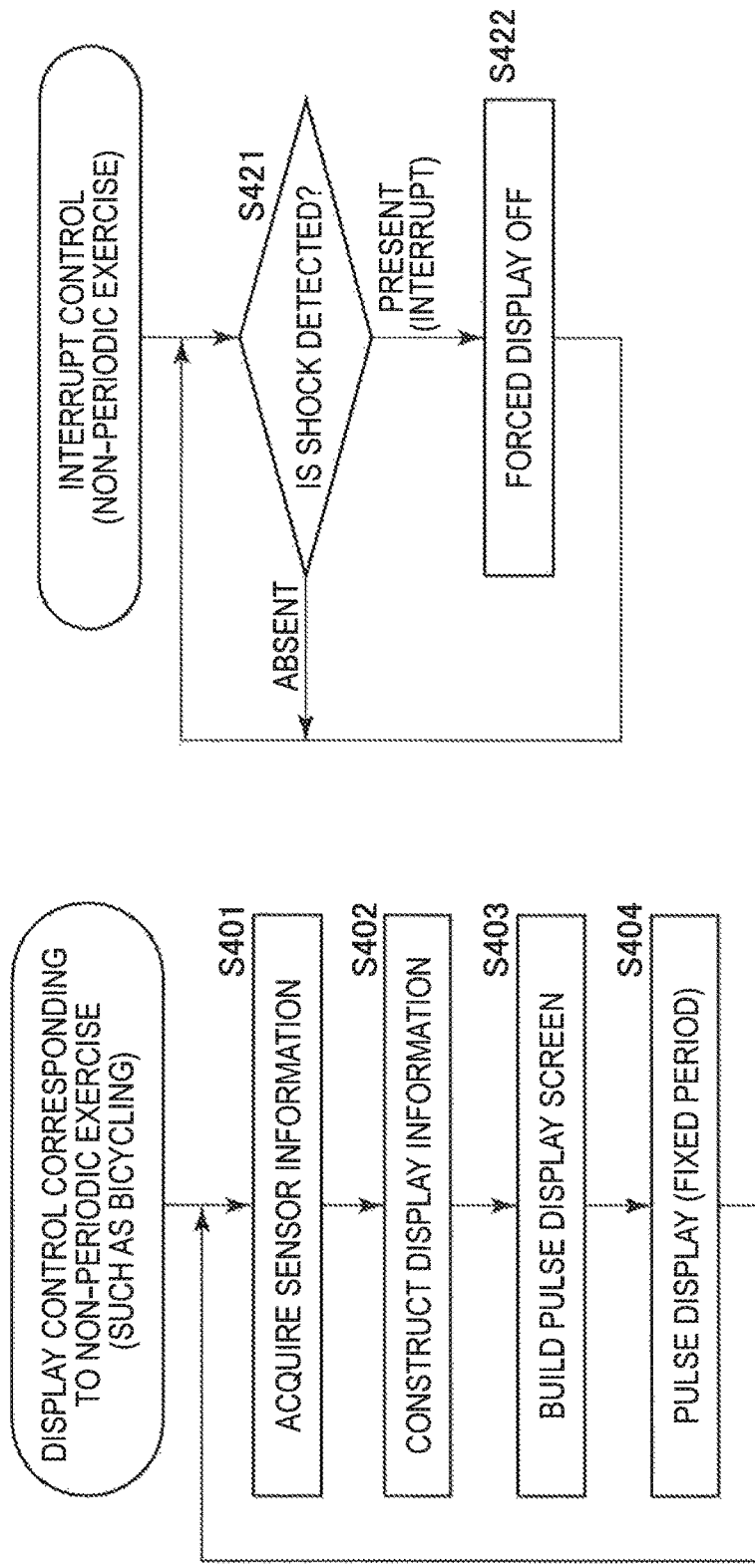
FIG. 26 is a diagram illustrating a flowchart for describing a display control procedure in executing non-periodic exercise.

The procedure shown on the right side of FIG. 26 is an interrupt control procedure executed while the processing of steps S401 to S404 on the left side is continued. This processing procedure will be described.

(Step S451)

In step S451, the controller acquires sensor information associated with a display device such as a head-mounted display. In one example, the display device is provided with a sensor for detecting a sudden shock or the like, for example, an accelerometer. The controller determines the presence or absence of a shock such as an impact on the display device based on the output from the accelerometer. If it is determined that a shock is detected, the processing proceeds to step S452.

(Step S452)

If it is determined in step S451 that a shock is detected, the output of the display unit is stopped in step S452.

[11. Exemplary Switching Processing Between Normal Display and Afterimage Consideration Pulse Display in which Non-Display Period is Set within Afterimage Recognition Period]

In the above-described embodiments, the configuration performing the switching control between the following two settings has been described.

(a) "Continuous display (hold display)" in which the backlight of the display unit is set to continuous turning ON (b) "Intermittent display (pulse display)" in which the backlight of the display unit is set to repeat turning on/turning off (ON/OFF)

The description has been made as an embodiment for performing this switching control. As described above with reference to FIGS. 13 and 14, the control is performed so that in the case where the user state is stationary, walking, or low speed running, the hold (continuous) display is used, and in the case where the user state is walking, low speed running, high speed running, or bicycling, the pulse display is used.

Another example of the display control described above will be described. In the display control to be described below, the display on the display unit is switched between the following two modes.

(a) Afterimage consideration pulse display in which the non-display period is set within the afterimage recognition period, which is the pulse display in which turning on/turning off (ON/OFF) of the backlight of the display unit are repeated (b) Normal pulse display the non-display period is set to be longer than or equal to the afterimage recognition period, which is the pulse display in which turning on/turning off (ON/OFF) of the backlight of the display unit are repeated The control for switching between displays of the items (a) and (b) is executed.

The "afterimage consideration pulse display" of the mode (a) has substantially the same effect as the "continuous display (hold display)" of the continuous turning on in the embodiment described above, that is, it is the display mode in which the observer is in a state of continuous observation of the display information. This afterimage consideration pulse display will be described with reference to FIG. 27.

Figure 27:
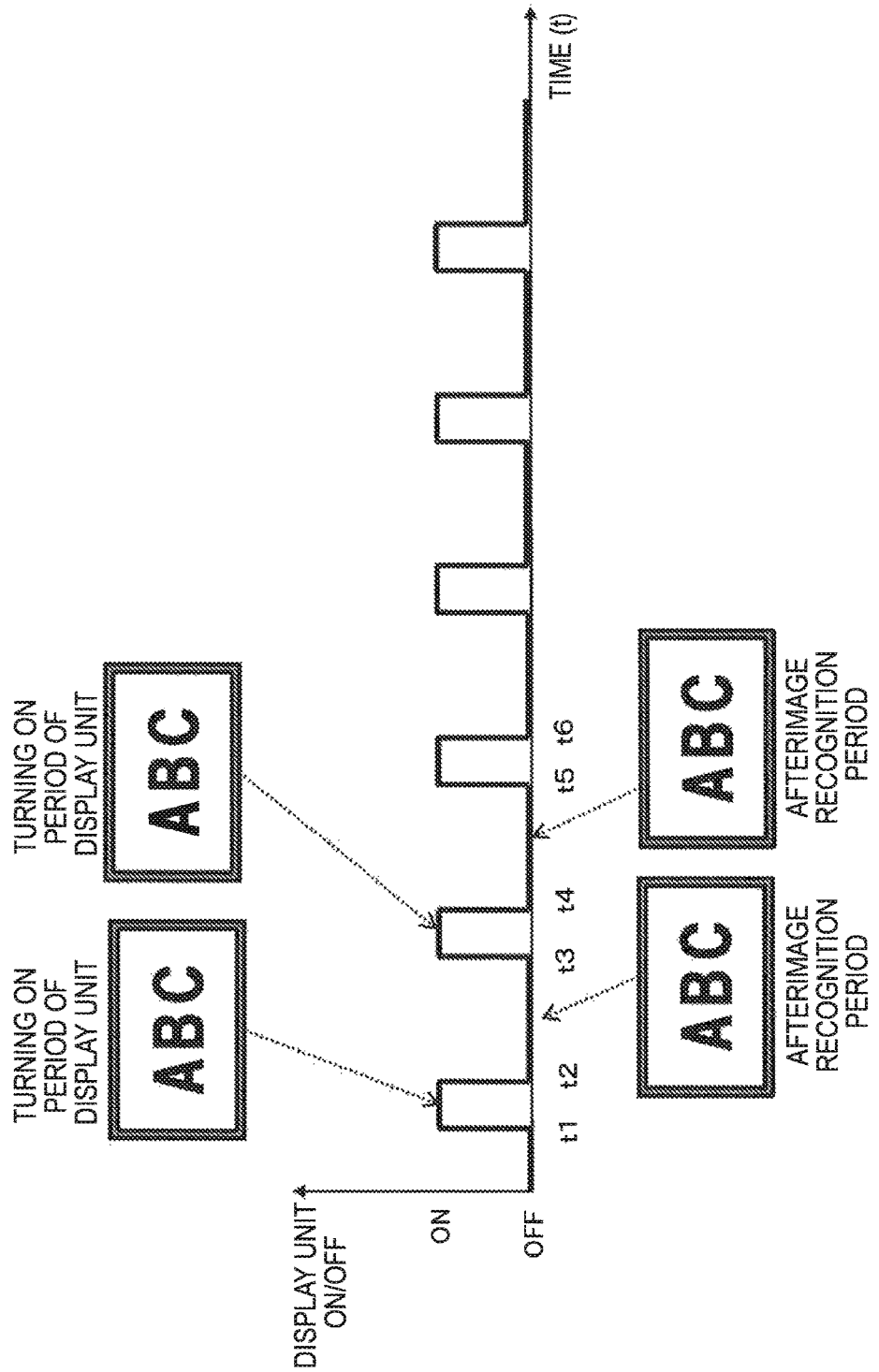
FIG. 27 is a diagram illustrated to describe a specific example of afterimage consideration pulse display.

In FIG. 27, the horizontal axis represents time and the vertical axis represents the ON/OFF setting on the display unit. In one example, in the time period of t1 to t2 or the time period of t3 to t4, the display unit is in the ON state and the information display is executed. On the other hand, the time period of t2 to t3 or the time period t4 to t5, the display unit is in the OFF state and the information display is not executed. However, immediately after the display unit is switched from the ON state to the OFF state, which is the state in which an afterimage occurs in the human eye and the display information, for example, the state of the character [ABC] displayed on the display unit shown in the figure is recognized. In other words, the "afterimage recognition period" of a predetermined period occurs. After the "afterimage recognition period" of the predetermined period is elapsed, the person can recognize that nothing is displayed on the display unit. However, if the display unit is set to the ON state again before this "afterimage recognition period" elapses, the person determines that the display information on the display unit is continuously displayed.

As described above, the afterimage pulse display is the pulse display in which the non-display period (e.g. the times t2 to t3, t4 to t5, and the like shown in the figure) of the display unit is set to a time within the "afterimage recognition period". Execution of such a pulse display allows a person to recognize that the display information on the display unit is continuously displayed. In other words, the effect similar to that of the halt display in the above-described embodiment is achieved.

Moreover, the normal pulse display of the mode (b) is the pulse display in which the non-display period is set to be longer than or equal to the afterimage recognition period, and corresponds to the pulse display described in the above embodiment. In the display control described below, the display on the display unit is switched between these two modes. In other words, the control of switching between the following display modes (a) and (b) is executed.

Figure 28:
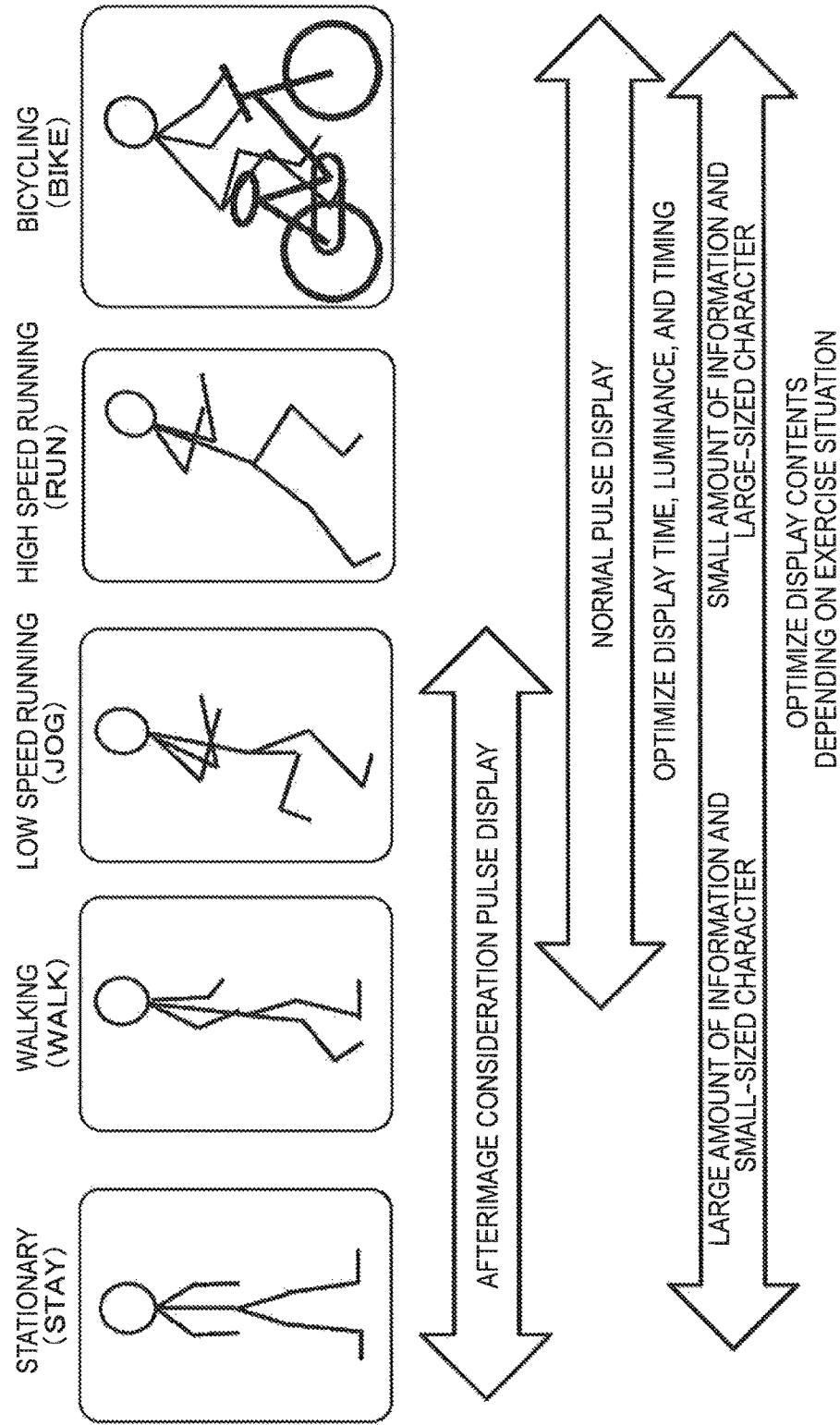
FIG. 28 is a diagram illustrated to describe an example of setting a display mode and display information in each user state.

(a) Afterimage consideration pulse display in which the non-display period is set within the afterimage recognition period, which is the pulse display in which turning on/turning off (ON/OFF) of the backlight of the display unit are repeated (b) Normal pulse display the non-display period is set to be longer than or equal to the afterimage recognition period, which is the pulse display in which turning on/turning off (ON/OFF) of the backlight of the display unit are repeated Specifically, as shown in FIG. 28, in the case where the user state is stationary, walking, and low speed running, the afterimage consideration pulse display is controlled to be performed, and in the case of walking, low speed running, high speed running, and bicycling, the normal pulse display is controlled to be performed.

Figure 29:
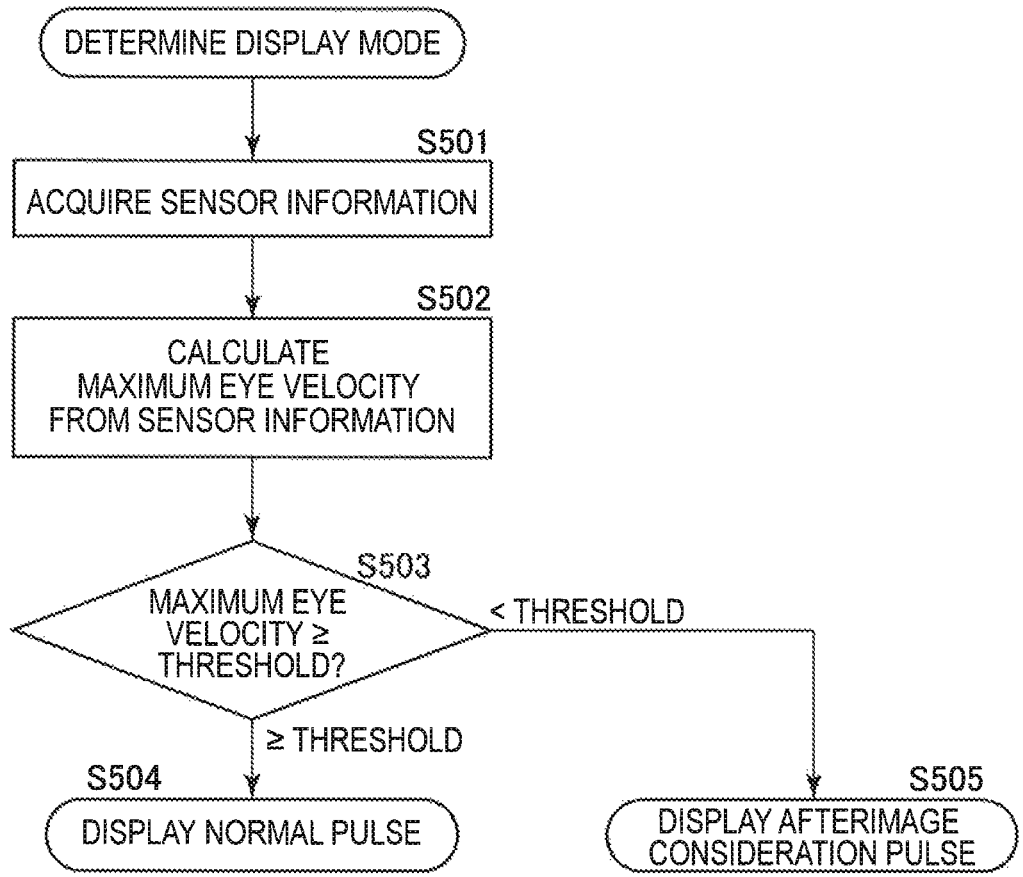
FIG. 29 is a diagram illustrating a flowchart for describing a basic display control procedure in a case where alternate processing is performed depending on whether display on a display device is set to afterimage consideration pulse display or to normal pulse display.

The flowchart shown in FIG. 29 is a flowchart for describing a basic display control procedure in a case where alternate processing is performed depending on whether the display on the display device is the afterimage consideration pulse display or the normal pulse display. The processing of each step will be described.

(Step S501)

In step S501, sensor information associated with a display device such as a head-mounted display is acquired. The display device is provided with various sensors such as a sensor for detecting the movement of the user. The controller acquires these pieces of sensor information. In step S501, specifically, sensor information such as an accelerometer is acquired.

(Step S502)

In step S502, the controller determines the movement of the user based on the acquired sensor information, and calculates the maximum eye movement velocity based on the determined movement of the user. The eye velocity calculation processing is executed as the calculation processing in accordance with the theory described above with reference to FIGS. 7 to 9, in one example.

(Step S503)

Next, in step S503, it is determined whether the maximum eye velocity calculated in step S502 is greater than or equal to a predefined threshold or less than the threshold. The threshold is, in one example, an eye velocity of 2 deg/s, and the determination formula is as follows.

Maximum eye velocity≥2 deg/sec

In the case where the above determination formula is satisfied, that is, if it is determined that the maximum eye velocity calculated in step S502 is larger than or equal to the predefined threshold, the processing proceeds to step S504. In the case where the above determination formula is not satisfied, that is, if it is determined that the maximum eye velocity calculated in step S502 is less than the predefined threshold, the processing proceeds to step S505. The above-described threshold is an example, and various thresholds can be set.

(Step S504)

In the case where the above determination formula is satisfied, that is, if it is determined that the maximum eye velocity calculated in step S502 is larger than or equal to the predefined threshold, the processing proceeds to step S504. Then, the display on the display unit is set to the normal pulse display, that is, the non-display period of the display unit is set to the normal pulse display set to be more than or equal to the afterimage recognition period, and the display processing is executed.

(Step S505)

In the case where the determination formula is not satisfied, that is, if it is determined that the maximum eye velocity calculated in step S502 is less than the predefined threshold, the processing proceeds to step S505. Then, the display on the display unit is set to the afterimage consideration pulse display, that is, the non-display period of the display unit is set to the afterimage consideration pulse display set within the afterimage recognition period, and the display processing is executed.

Moreover, the processing according to the procedure shown in FIG. 29 is repeatedly executed in a periodic manner. Thus, the afterimage consideration pulse display and the normal pulse display are switched appropriately depending on the change in the user's exercise situation. However, if this switching is frequently performed, there is a concern that visibility may be likely to deteriorate. Thus, appropriate hysteresis is given to the switching between the low speed burrs display and the normal pulse display so that the mode is not switched frequently.

Moreover, the eye velocity is preferably measured by directly monitoring eye movement. In a case where the direct measurement of the eye movement fails to be performed, in one example, it may be set to calculate from the following values during exercise (running).

(1) Movement of the body including head, waist, and shoulder, movement of legs and arms, running velocity, movement period, or the like As a specific example, there is described an example of estimating the following value from the measurements by the sensor attached to the head.

"$V_e$: eye moving angular velocity [deg/sec]"

In one example, the following parameters are set.

L: Target viewpoint (assuming as 3.0 m) [m]

A: Constant (0<a<0.3) (assuming as 0.21)

$P_h$: Head position (height change amount) [m]

Under these parameter settings, $V_e$: eye movement angular velocity [deg/sec] an calculated by the following formula.

$$V_e = d(\arctan(P_h/L) - \arctan(P_h/aL))/dt$$

Figure 30:
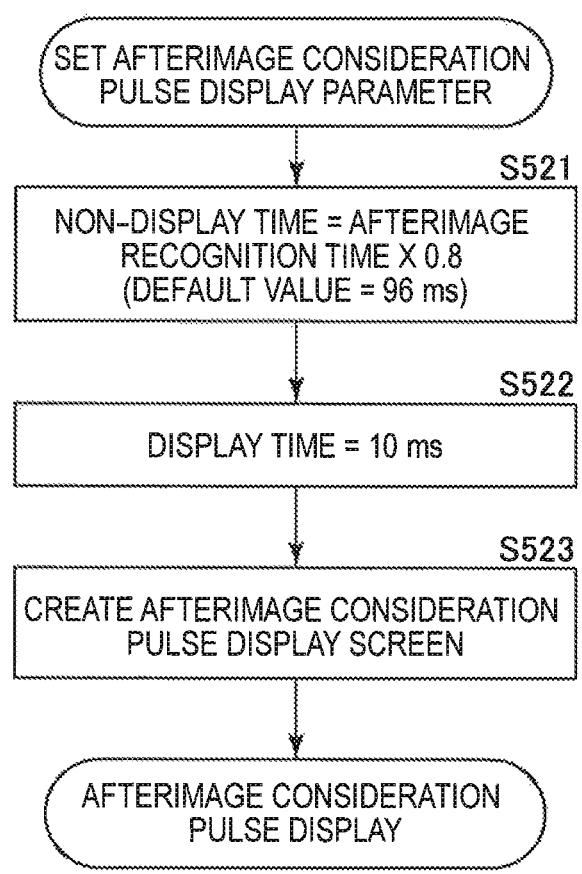
FIG. 30 is a diagram illustrating a flowchart for describing setting of a display parameter and a display control procedure in the case where display on a display device is set to an afterimage consideration pulse display.

FIG. 30 is a flowchart for describing setting of a display parameter and a display control procedure in the case where the display of the display device is set to an afterimage consideration pulse display. The afterimage consideration pulse display is executed as repetitive processing of "display and non-display" for a fixed time. However, when shock (acceleration) is applied such that the vibration width of the ocular lens exceeds the visible limit, it is preferable to set the display operation to be instantaneous pause (display turning off) for safety reason. The processing of each step will be described.

(Step S521)

In step S523, a non-display time (period) is set. The non-display time is calculated, in one example, by the following formula.

Non-display time=afterimage recognition time(period)×0.8

As an example of a specific value, it is possible to set a value (default value)=96 ms obtained by considering typical afterimage recognition time, in one example. Moreover, the afterimage recognition time differs depending on the user, and in the case where the value unique to each user can be measured, the measured value may be set.

(Step S522)

Next, the time per display is set. The display time is set to, for example, 10 ms.

(Step S523)

Next, the afterimage consideration pulse display is created. In one example, the display information composed of map information indicating the current position based on the information obtained from the position sensor, information indicating the physical condition of the user obtained from the sensor for grasping the user's body condition, information on the outside air temperature and the humidity is constructed. Moreover, the display luminance is the luminance of the outside world obtained by the photometer, that is, the luminance determined according to the environmental luminance. Specifically, as described above with reference to FIGS. 19 to 21 and the like, the display information determined according to the environmental luminance is set to a luminance level that can be easily recognized.

Next, in the procedure shown in FIG. 30, the setting value of the non-display period is set to, for example, 96 ms. However, as described above, in one example, in a case where there is a value measured by the user, it is preferable to adjust to be less than or equal to the measured value. In a control example according to the flowchart shown in FIG. 30, the setting is made in consideration of a margin of 20% with respect to the afterimage recognition period. Furthermore, the display time is set to 10 ms in the procedure shown in FIG. 30, but this is an illustrative example. In practice, it is preferable to determine in consideration of luminance of the display element–power consumption characteristics/response speed, external luminance, or the like. Moreover, by adjusting the ON/OFF repetition time to one frame such as video, typical video content can be viewed even at low speed display. In one example, the non-display period=2 ms and the display time=(2 ms per 1 frame) is set.

[12. Exemplary Hardware Configuration of Control Device]

Figure 31:
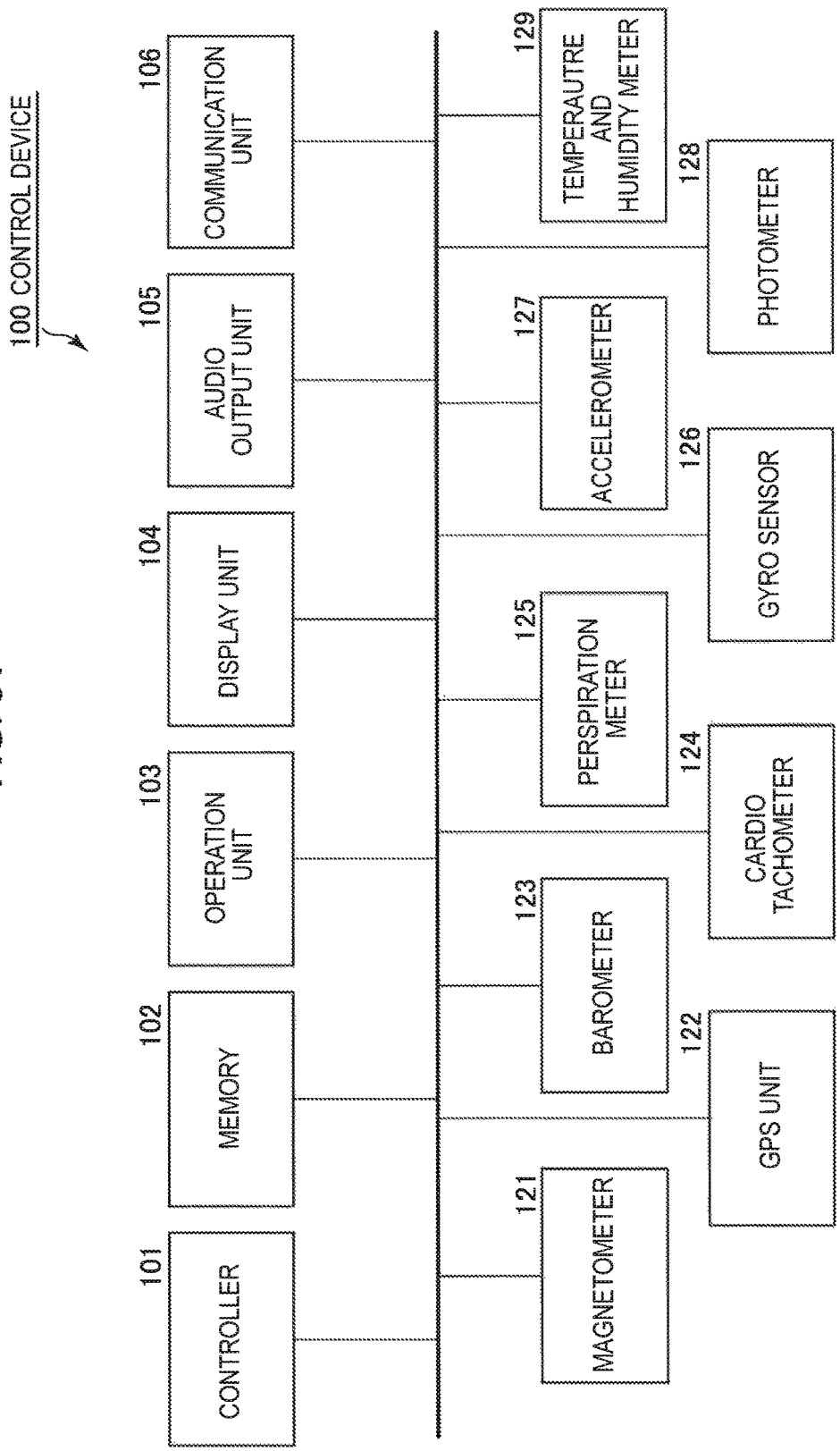
FIG. 31 is a diagram illustrated to describe an exemplary hardware configuration of a control device of the present disclosure.

Next, an exemplary hardware configuration of a control device that executes the above-described processing with reference to FIG. 31 will be described.

The control device 100 is a display device attached to the user's body, such as a head-mounted display, or is a device that executes control of a portable display device. As shown in FIG. 31, the control device 100 is configured to include a controller 101, a memory 102, an operation unit 103, a display unit 104, an audio output unit 105, a communication unit 106, and various sensors.

As the sensors, a magnetometer 121, a GPS unit 122, a barometer 123, a cardio tachometer 124, a perspiration meter 125, a gyro sensor 126, an accelerometer 127, a photometer 128, a temperature and humidity meter 129, and the like are provided. Moreover, the sensors shown in the figure are merely examples, and other sensors may be provided.

The controller 101 is a data processing unit having a program execution function such as a CPU and executes various processes according to a data processing program stored in the memory 102. Specifically, in one example, the processes according to the flowcharts shown in FIGS. 22 to 26 described above are executed.

The memory 102 has data such as content to be outputted through the display unit 104 or the sound output unit 105 and sensor information acquired by each sensor, in addition to the program executed by the controller, which are stored in the memory 102. The operation unit 103 includes, in one example, a power switch, and various operation units such as selection of output data to the display unit 104 and volume operation of audio output.

The display unit 104 is a display unit composed of, in one example, an LCD, or the like, and displays various data under the control of the controller 101. On the basis of the control of the controller 101, display in various modes including the hold display and the pulse display is executed. The audio output unit 105 is, in one example, a speaker, and outputs music, audio information, and the like corresponding to the content displayed on the display unit 105. The communication unit 105 includes a communication unit of wireless, wired and various settings, and exchanges data with an external terminal or the like.

The magnetometer 121 acquires geomagnetic information to be applied to calculation processing of the current position information and the like. Moreover, the sensor information acquired by each sensor is inputted to the controller 101, and various information previously defined by the processing according to the sensor information analysis program stored in the memory 102 is calculated. The geomagnetic information acquired by the magnetometer 121 is inputted to the controller 101 and used for the current position information calculation process and the like.

The GPS unit 122 is also a sensor used for acquiring current position data using GPS satellites, and the information acquired by the GPS unit 122 is input to the controller 101 and used for the current position information calculation process and the like.

The barometer 123 is a sensor for measuring barometric air pressure. The cardio tachometer 124 is a sensor for measuring the heart rate of the user. The perspiration meter 124 is a sensor for measuring the perspiration amount of the user. The gyro sensor 126 is a sensor for detecting an angle and an angular velocity. The accelerometer 127 is a sensor for detecting acceleration. The photometer 128 is a sensor for detecting the illuminance of the outside world. The temperature and humidity meter 129 is a sensor for measuring the temperature and humidity of the outside world.

Detection information of these sensors is input to the controller 102, and is used for construction and control of display information.

[13. Brief Summary of Configuration of Present Disclosure]

The embodiments of the present disclosure have been described in detail with reference to specific embodiments. However, it is obvious that those skilled in the art can make modifications and substitutions of the embodiments without departing from the scope of the present disclosure. That is, the present invention has been disclosed in the form of example, and should not be construed as limited. In order to determine the scope of the present disclosure, it should be referred to the appended claims.

Note that the technology disclosed in this specification can have the following configuration.

(1)

A control device including:

a controller configured to execute display information output control on a user wearable or portable display unit, wherein the controller sets a turning on (ON) period and a turning off (OFF) period and controls switching between afterimage consideration pulse display having the turning off period being set to be within an afterimage recognition period and normal pulse display having the turning off period being set to be longer than or equal to the afterimage recognition period, the turning on (ON) period being an output period of display information to the display unit, the turning off (OFF) period being a non-output period of display information to the display unit.

(2)

The control device according to (1), wherein the controller executes the switching control between the afterimage consideration pulse display and the normal pulse display depending on eye velocity of a user holding the display unit.

(3)

The control device according to (1) or (2), wherein the controller executes the afterimage consideration pulse display in a case where eye velocity of a user holding the display unit is less than a threshold and executes the normal pulse display in a case where the eye velocity is more than or equal to the threshold.

(4)

The control device according to any one of (1) to (3), wherein the controller calculates eye velocity of a user based on movement information of the user inputted from sensor information and executes the switching control between the afterimage consideration pulse display and the normal pulse display depending on the calculated eye velocity.

(5)

The control device according to any one of (1) to (4), wherein the control device includes an accelerometer, and the controller calculates eye velocity of a user using detection information of the accelerometer and executes the switching control between the afterimage consideration pulse display and the normal pulse display depending on the calculated eye velocity.

(6)

The control device according to any one of (1) to (5), wherein the display unit is a head wearable display unit that is worn on a head of a user, and controller calculates eye movement velocity during eye movement generated depending on vertical movement of the head of the user and executes the switching control between the afterimage consideration pulse display and the normal pulse display depending on the calculated eye movement velocity.

(7)

The control device according to any one of (1) to (6), wherein the controller executes pulse display in which one turning on (ON) period is set to be less than or equal to 10 ms.

(8)

The control device according to any one of (1) to (7), wherein the display unit is a display unit having a lens for setting a virtual observation position at a position farther away from an eye of a user than a display surface.

(9)

A control device including:
a controller configured to execute display information output control on a user wearable or portable display unit,
wherein the controller controls switching between hold display in which display information output to the display unit is continuously executed and pulse display serving as intermittent display in which a turning on (ON) period and a turning off (OFF) period are repeated, the turning on (ON) period being an output period of display information to the display unit, the turning off (OFF) period being a non-output period of display information to the display unit.

(10)

The control device according to (9), wherein the controller executes the switching control between the hold display and the pulse display depending on eye velocity of a user holding the display unit.

(11)

The control device according to (9) or (10), wherein the controller executes the hold display in a case where eye velocity of a user holding the display unit is less than a threshold and executes the pulse display in a case where the eye velocity is more than or equal to the threshold.

(12)

The control device according to any one of (9) to (11), wherein the controller calculates eye velocity of a user based on movement information of the user inputted from sensor information and executes the switching control between the hold display and the pulse display depending on the calculated eye velocity.

(13)

The control device according to any one of (9) to (12), wherein the control device includes an accelerometer, and the controller calculates eye velocity of a user using detection information of the accelerometer and executes the switching control between the hold display and the pulse display depending on the calculated eye velocity.

(14)

The control device according to any one of (9) to (13), wherein the display unit is a head wearable display unit that is worn on a head of a user, and controller calculates eye movement velocity during eye movement generated depending on vertical movement of the head of the user and executes the switching control between the hold display and the pulse display depending on the calculated eye movement velocity.

(15)

The control device according to any one of (9) to (14), wherein the controller executes the pulse display in which one turning on (ON) period is set to be less than or equal to 10 ms in executing the pulse display.

(16)

The control device according to any one of (9) to (15), wherein the display unit is a display unit having a lens for setting a virtual observation position at a position farther away from an eye of a user than a display surface.

(17)

A control method executed by a control device for a user wearable or portable display unit, the method including:
setting, by a controller, a turning on (ON) period and a turning off (OFF) period and controlling, by the controller, switching between afterimage consideration pulse display having the turning off period being set to be within an afterimage recognition period and normal pulse display having the turning off period being set to be longer than or equal to the afterimage recognition period, the turning on (ON) period being an output period of display information to the display unit, the turning off (OFF) period being a non-output period of display information to the display unit.

(18)

A control method executed by a control device for a user wearable or portable display unit, the method including:
controlling, by a controller, switching between hold display in which display information output to the display unit is continuously executed and pulse display serving as intermittent display in which a turning on (ON) period and a turning off (OFF) period are repeated, the turning on (ON) period being an output period of display information to the display unit, the turning off (OFF) period being a non-output period of display information to the display unit.

(19)

A program for causing a control device to control a user wearable or portable display unit, the program causing the control device
to set a turning on (ON) period and a turning off (OFF) period and to control switching between afterimage consideration pulse display having the turning off period being set to be within an afterimage recognition period and normal pulse display having the turning off period being set to be longer than or equal to the afterimage recognition period, the turning on (ON) period being an output period of display information to the display unit, the turning off (OFF) period being a non-output period of display information to the display unit.

(20)

A program for causing a control device to control a user wearable or portable display unit, the program causing the control device to control switching between hold display in which display information output to the display unit is continuously executed and pulse display serving as intermittent display in which a turning on (ON) period and a turning off (OFF) period are repeated, the turning on (ON) period being an output period of display information to the display unit, the turning off (OFF) period being a non-output period of display information to the display unit.

Furthermore, the series of processing described in the specification can be implemented by hardware, software, or a combination of both. In the case of implementing the processing by software, it is possible to install a program in which the processing procedure is recorded in a memory within a computer incorporated into dedicated hardware and to execute the program. It is also possible to install a program in a general-purpose computer capable of performing various types of processes and to execute the program. In one example, the program can be recorded previously in a recording medium. In addition to being installed in a computer from the recording medium, the program can also be received through a network, such as a local area network (LAN) or the Internet, and can be installed in a recording medium such as a hard disk or the like that is built into the computer.

Note that the various types of processes described in this specification may be performed not only in a temporal sequence but also in parallel or individually, in accordance with the processing capacity of the device that performs the processing or as necessary. Furthermore, the system in this specification is not limited to being a configuration that logically aggregates a plurality of devices, all of which are contained within the same housing.

INDUSTRIAL APPLICABILITY

As described above, according to the configuration of one embodiment of the present disclosure, the display information output control with improved visibility of the user wearable or portable display unit is implemented. More specifically, a controller that executes display information output control on a user wearable or portable display unit is included. The controller sets a turning on (ON) period that is an output period of display information to the display unit as display information output to the display unit, and a turning off (OFF) period that is a non-output period of display information. The controller controls switching between the afterimage consideration pulse display in which the turning off period is set within the afterimage recognition period and the normal pulse display in which the turning off period is set to be longer than or equal to the afterimage recognition period. The controller executes the switching control between the afterimage consideration pulse display and the normal pulse display depending on the eye movement velocity of the user. The afterimage consideration pulse display is performed if the eye velocity of the user is less than the threshold, but the normal pulse display is performed if it is more than or equal to the threshold. With this configuration, output control of display information with improved visibility of the display unit is implemented.

REFERENCE SIGNS LIST 10 head-mounted display
11 display unit
12 speaker
15 controller
30 display device
31 display surface
32 lens
35 virtual observation position
40 display device
41 display character
100 control device
101 controller
102 memory
103 operation unit
104 display unit
105 audio output unit
106 communication unit
121 magnetometer
122 GPS unit
123 barometer
124 cardio tachometer
125 perspiration meter
126 gyro sensor
127 accelerometer
128 photometer
129 temperature and humidity meter

The invention claimed is:

1. A control device comprising:
a controller configured to execute display information output control on a user wearable or portable display device,
wherein the controller executes the display information output control by
setting a turning on (ON) period and a turning off (OFF) period, and
controlling switching between afterimage consideration pulse display having the turning off period being set to be shorter than an afterimage recognition period and normal pulse display having the turning off period being set to be longer than or equal to the afterimage recognition period, the turning on (ON) period being an output period of display information to the display device, the turning off (OFF) period being a non-output period of display information to the display device,
wherein the controller controls switching between the afterimage consideration pulse display and the normal pulse display according to a determined state of a user of the display device, and
wherein the controller is implemented via at least one processor.

2. The control device according to claim 1,
wherein the controller executes the switching control between the afterimage consideration pulse display and the normal pulse display depending on eye velocity of the user of the display device.

3. The control device according to claim 1,
wherein the controller executes the afterimage consideration pulse display in a case where eye velocity of the user of the display device is less than a threshold and executes the normal pulse display in a case where the eye velocity is more than or equal to the threshold.

4. The control device according to claim 1,
wherein the controller calculates eye velocity of the user of the display device based on movement information of the user inputted from sensor information and executes the switching control between the afterimage consideration pulse display and the normal pulse display depending on the calculated eye velocity.

5. The control device according to claim 1,
wherein the control device includes an accelerometer, and
the controller calculates eye velocity of the user of the display device using detection information of the accelerometer and executes the switching control between the afterimage consideration pulse display and the normal pulse display depending on the calculated eye velocity.

6. The control device according to claim 1,
wherein the display device comprises a head wearable display unit that is worn on a head of the user, and
wherein the controller
calculates eye movement velocity during eye movement generated depending on vertical movement of the head of the user, and
executes the switching control between the afterimage consideration pulse display and the normal pulse display depending on the calculated eye movement velocity.

7. The control device according to claim 1,
wherein the controller executes pulse display in which one turning on (ON) period is set to be less than or equal to 10 ms.

8. The control device according to claim 1,
wherein the display device comprises a lens for setting a virtual observation position at a position farther away from an eye of the user than a display surface of the display device.

9. A control device comprising:
a controller configured to execute display information output control on a user wearable or portable display device,
wherein the controller executes the display information output control by controlling switching between hold display in which display information output to the display device is continuously executed and pulse display serving as intermittent display in which a turning on (ON) period and a turning off (OFF) period are repeated, the turning on (ON) period being an output period of display information to the display device, the turning off (OFF) period being a non-output period of display information to the display device,
wherein the controller controls switching between the hold display and the pulse display according to a determined state of a user of the display device, and
wherein the controller is implemented via at least one processor.

10. The control device according to claim 9,
wherein the controller executes the switching control between the hold display and the pulse display depending on eye velocity of the user of the display device.

11. The control device according to claim 9,
wherein the controller executes the hold display in a case where eye velocity of the user of the display device is less than a threshold and executes the pulse display in a case where the eye velocity is more than or equal to the threshold.

12. The control device according to claim 9,
wherein the controller calculates eye velocity of the user of the display device based on movement information of the user inputted from sensor information and executes the switching control between the hold display and the pulse display depending on the calculated eye velocity.

13. The control device according to claim 9,
wherein the control device includes an accelerometer, and
wherein the controller calculates eye velocity of the user of the display device using detection information of the accelerometer and executes the switching control between the hold display and the pulse display depending on the calculated eye velocity.

14. The control device according to claim 9,
wherein the display device comprises a head wearable display unit that is configured to be worn on a head of the user, and
wherein the controller calculates eye movement velocity during eye movement generated depending on vertical movement of the head of the user and executes the switching control between the hold display and the pulse display depending on the calculated eye movement velocity.

15. The control device according to claim 9,
wherein the controller executes the pulse display in which one turning on (ON) period is set to be less than or equal to 10 ms in executing the pulse display.

16. The control device according to claim 9,
wherein the display device comprises a lens for setting a virtual observation position at a position farther away from an eye of the user than a display surface of the display device.

17. A control method executed by a control device for a user wearable or portable display device, the method comprising:
setting, by at least one processor of the control device, a turning on (ON) period and a turning off (OFF) period; and
controlling, by the at least one processor, switching between afterimage consideration pulse display having the turning off period being set to be shorter than an afterimage recognition period and normal pulse display having the turning off period being set to be longer than or equal to the afterimage recognition period, the turning on (ON) period being an output period of display information to the display device, the turning off (OFF) period being a non-output period of display information to the display device,
wherein switching between the afterimage consideration pulse display and the normal pulse display is controlled according to a determined state of a user of the display device.

18. A control method executed by a control device for a user wearable or portable display device, the method comprising:
controlling, by at least one processor of the control device, switching between hold display in which display information output to the display device is continuously executed and pulse display serving as intermittent display in which a turning on (ON) period and a turning off (OFF) period are repeated, the turning on (ON) period being an output period of display information to the display device, the turning off (OFF) period being a non-output period of display information to the display device,
wherein switching between the hold display and the pulse display is controlled according to a determined state of a user of the display device.

19. A non-transitory computer-readable medium having embodied thereon a program, which when executed by a control device causes the control device to control a user wearable or portable display device according to a method, the method comprising:
setting a turning on (ON) period and a turning off (OFF) period; and controlling switching between afterimage consideration pulse display having the turning off period being set to be shorter than an afterimage recognition period and normal pulse display having the turning off period being set to be longer than or equal to the afterimage recognition period, the turning on (ON) period being an output period of display information to the display device, the turning off (OFF) period being a non-output period of display information to the display device, wherein switching between the afterimage consideration pulse display and the normal pulse display is controlled according to a determined state of a user of the display device.

20. A non-transitory computer-readable medium having embodied thereon a program, which when executed by a control device causes the control device to control a user wearable or portable display device according to a method, the method comprising:

switching between hold display in which display information output to the display device is continuously executed and pulse display serving as intermittent display in which a turning on (ON) period and a turning off (OFF) period are repeated, the turning on (ON) period being an output period of display information to the display device, the turning off (OFF) period being a non-output period of display information to the display device, wherein switching between the hold display and the pulse display is controlled according to a determined state of a user of the display device.

* * * * *